US012437270B2

(12) United States Patent
Nassimi et al.

(10) Patent No.: US 12,437,270 B2
(45) Date of Patent: Oct. 7, 2025

(54) SYSTEM AND METHOD FOR ONLINE COLLABORATION AND SYNCHRONIZED SCHEDULING

(71) Applicants: Isaac Nassimi, Carlsbad, CA (US); John Girard, Cardiff by the Sea, CA (US); John Vernon Logan, Bayboro, NC (US); Scott Isgitt, Encinitas, CA (US)

(72) Inventors: Isaac Nassimi, Carlsbad, CA (US); John Girard, Cardiff by the Sea, CA (US); John Vernon Logan, Bayboro, NC (US); Scott Isgitt, Encinitas, CA (US)

(73) Assignee: LoopCo IP LLC, Bayboro, NC (US)

( * ) Notice: Subject to any disclaimer, the term of this patent is extended or adjusted under 35 U.S.C. 154(b) by 0 days.

(21) Appl. No.: 18/110,875

(22) Filed: Feb. 16, 2023

(65) Prior Publication Data

US 2023/0281568 A1    Sep. 7, 2023

Related U.S. Application Data

(60) Provisional application No. 63/396,763, filed on Aug. 10, 2022, provisional application No. 63/311,009, filed on Feb. 16, 2022.

(51) Int. Cl.
*G06Q 10/1093* (2023.01)
(52) U.S. Cl.
CPC ................. *G06Q 10/1095* (2013.01)
(58) Field of Classification Search
CPC ............. G06Q 10/1095; G06Q 10/109; G06Q 10/1093
See application file for complete search history.

(56) References Cited

U.S. PATENT DOCUMENTS

| | | | |
|---|---|---|---|
| 2004/0039629 A1* | 2/2004 | Hoffman | G06Q 30/06 705/1.1 |
| 2008/0065447 A1* | 3/2008 | Evanchik | G06Q 10/1093 705/7.18 |

(Continued)

OTHER PUBLICATIONS

E. A. R. Khan, O. H. Alatiyyah and K. A. Aljadaan, "A Service Oriented Architecture based Comprehensive Smart Calendar for scheduling and managing real-time events," 2018 21st Saudi Computer Society National Computer Conference (NCC), Riyadh, Saudi Arabia, 2018, pp. 1-4, (Year: 2018).*

*Primary Examiner* — Amber A Misiaszek
(74) *Attorney, Agent, or Firm* — Olivo IP Law Group, P.C.; John W. Olivo, Jr.

(57) ABSTRACT

The present invention is a system and method for online collaborative workspaces and live online meetings with the capability to schedule and calendar events with synchronization and customization. Multiple projects can be opened, all with their own individual hub and with customizable widgets for what every individual project needs. The present invention facilitates live online video meetings that can be recorded for future playback. Third-party applications can be synced to the present invention to keep every item for the project in one central place for all collaborators. The system consists of circuitry that is configured to work as a synchronization service that maintains a database. Cross-functional calendaring ensures that all clients may schedule meetings without the concern of overlaps or a lack of availability. The database also shows the availability of specific individuals or organizations for an array of calendaring forms, allowing users to customize them according to their needs and services.

1 Claim, 75 Drawing Sheets

(56) References Cited

U.S. PATENT DOCUMENTS

| | | | |
|---|---|---|---|
| 2008/0140498 A1* | 6/2008 | Setty | G06Q 10/109 |
| | | | 705/7.18 |
| 2008/0201196 A1* | 8/2008 | Rowland | G06Q 10/06311 |
| | | | 705/7.13 |
| 2010/0190474 A1* | 7/2010 | Rajguru | H04W 12/08 |
| | | | 707/610 |
| 2016/0275458 A1* | 9/2016 | Meushar | G06Q 10/109 |
| 2019/0273627 A1* | 9/2019 | Whalin | H04W 4/021 |
| 2022/0263675 A1* | 8/2022 | Cupala | G06Q 10/101 |
| 2022/0321548 A1* | 10/2022 | Pati | H04L 63/04 |

* cited by examiner

① Organization ② Users ③ Groups ④ Services ⑤ Notification Templates ⑥ Booking Forms

Invite Users
Add email addresses and assign roles, then will automatically send the email notification for invites Email Address

[ Email Address ]

Role

[ Select Role ⌄ ]

Admin
Manager
Member

[ Add more user ]

*sample view if your already add more user*

Email Address

[ sample@email.com ]

Role

[ Member ⌄ ]

Email Address

[ Email Address ]

Role

[ Select Role ⌄ ]

[ Add more user ]

[ Back ]  [ Next ]

| | |
|---|---|
| Time Author | 👁 ⟲ ⊗ ✕ |

Meeting Name

User Name

Date - Time Monday, August 22, 2022 | 10:30 - 11:00 PM

| | |
|---|---|
| Customer Name | Customer Name |
| Email Address | Email Address |
| Location | Phone Call or Online Meeting |
| | Phone Number or Meeting Link |
| Assign To | Specialist Name |
| Notes | Notes |

Figure 24C

| | |
|---|---|
| Time Author | 👁 ⟲ ⊗ ✕ |

Meeting Name

Group - Service

Date - Time Monday, August 22, 2022 | 10:30 - 11:00 PM

| | |
|---|---|
| Customer Name | Customer Name |
| Email Address | Email Address |
| Location | Phone Call or Online Meeting |
| | Phone Number or Meeting Link |
| Assign To | Specialist Name |
| Notes | Notes |

SYSTEM AND METHOD FOR ONLINE COLLABORATION AND SYNCHRONIZED SCHEDULING

CROSS REFERENCE TO RELATED APPLICATIONS

This application claims the benefit of U.S. Provisional Application Ser. No. 63/311,009, filed Feb. 16, 2022. This application also claims the benefit of U.S. Provisional Application Ser. No. 63/396,763, filed Aug. 10, 2022. Both of which are incorporated herein by reference.

BACKGROUND OF THE INVENTION

Online collaboration on projects is a prominent feature in today's world. With applications like Google Docs, Zoom, Github, Hubspot, there are many different ways to collaborate, all allowing users to do something different. However, there is not a central place for all these collaborations to be worked on together.

There exists the ability to collaborate on documents with Google Docs. There also exists the ability to have live online meetings with other collaborators with Zoom. These applications are useful collaboration tools, but all exist on separate applications. This creates an opportunity for a singular application to connect all these third-party applications along with any other document or tools necessary for a collaborative project to be completed. With this singular application, there also exists a need for all information and data to be synced in real time between all collaborators.

The creation of the internet has called for new methods and approaches to utilizing a variety of instruments that have been digitized with new technology. Calendars, in specific, have proven quite useful for the day-to-day operations of individuals and businesses alike. Personal calendars are used to manage an individual's calendaring activities and are often paired with alarm functions that help ensure a user is present and punctual.

Often there are limitations with personal or business calendars that require users to manually add other users to a shared calendar. One of these issues is a lack of transparency in terms of everyone's availability; for example, a shared calendar might allow users to add agendas, meetings, and programs but they it does not show an overview of everyone's availability, just the single invite that is dedicated to the event. These limitations that come with electronic and shared calendars are apparent to anyone with familiarity with these systems.

Almost anyone can create an event with a desired time, but not every platform has the capacity to effectively and efficiently select a time that works for everyone, regardless of their role in a company as a client, colleague, or customer. Previous methods have created links and forms at the individual level, but they have yet to venture its use out into the realms of customer service and client relations.

The present systems and method help create a reliable and diligent platform for individuals, businesses, and organizations to cross-functionally collaborate on scheduling meetings using a system and method that highlights the availability of attendees. This helps individuals visualize a direct overview of an availability form so that calendaring and scheduling is more structured and cohesive.

By way of example and not of limitation, the platform can create a case for subscribers to create a generic customer form for their website that shows scheduling and availability, or they may create multiple agent and specialist interactions and assign different customer forms, or, in another instance, they may allow a user to create a unique link for personal use.

SUMMARY OF THE INVENTION

The present invention pertains to a collaborative workspace for projects and online meetings through the integration of various widgets. A project will be opened in the present invention and will be the central hub for all collaborations. Within the present invention, different projects can be opened, and each will have their own hub. The hub on the platform of the present invention can be customized with different widgets based on individual project needs.

In one embodiment, the present invention facilitates real-time audio and video meetings, with recording and transcription capability, synchronized navigation, managed content sharing, and real-time offline user collaboration. Additional capabilities include a chat feature, a data repository, cloud storage and file sharing. The present invention also provides in-app notifications, a task manager, and third-party application integration such as Customer Relationship Management (CRM). The present invention allows for enhanced project management and communication.

Live online video meetings can be done on the present invention and will be recorded for future playback in the Time Travel feature. Any notes taken online or offline during these meetings will also be recorded into a widget. Documents can also be uploaded to the platform of the present invention using a file widget. Any edits made in these documents can be recorded and shared between all collaborators. A "ToDo" task list can be created in a widget to easily keep track of what tasks need to be done.

The present invention can be synced to third-party applications, like Google Docs and Zoom, or through third party integration with applications such as HubSpot, to create one central place for everything the project needs. This allows for easy access by all collaborators on all aspects of the project. All data or specific data can be synced between all collaborators.

In another embodiment, subscribers can create generic customer forms for their website. For example, if an individual wanted to book a session or meeting with a business or client, they could choose a contact from a drop down and then be forwarded to either the next available time, or, alternatively, a future date where they can view every available time slot. This allows potential clients to book and schedule meetings with a visual representation of availability. A client is then prompted to enter details, such as their first and last names, email address, phone numbers, point of contacts, and a message—which may contain more information regarding the scheduled meeting, such as the topic or relevant notes and documents. This page will also confirm the name of the individual or business that is meeting with them; alongside the time and time zone and service being offered. Lastly, they accept to terms and conditions, push notifications, and then confirm the meeting. They may also go back and change their desired meeting time or service. A successful notice will indicate that the event and meeting details are sent to the customer's inbox.

In another embodiment, subscribers may create multiple agent or specialists and assign different customer forms. For example, if a customer wants to speak to a sales representative, they may choose a time that works for them and enter all the appropriate details, allow notifications, and then confirm a meeting with an agent. If clients do not wish to schedule a meeting with a representative, they would have the option to contact customer support, or utilize whatever alternative point of contact that a business or individual might provide.

In one embodiment, the user can connect multiple calendars to a single account. The user's overall availability will be calculated by the present invention by taking into account which time slots across all connected calendars are showing as available and which time slots are showing as busy or booked. For example, the user connects 2 calendars. Calendar 1 shows user availability at 1 pm, 3 pm, and 5 pm. Calendar 2 shows user availability at 1 pm and 5 pm, with a scheduled event in the 3 pm time slot. When a client tries to book time the user's calendar, they will only be given a choice to book time with the user at 1 pm or at 5 pm because the 3 pm slot is booked on Calendar 2. This is applicable regardless of how many calendars are connected by the user.

In another embodiment, when a user sets up the present invention, they can choose which calendar they want all appointments to be synched to regardless of how many calendars they have connected. The chosen calendar will provide a single place for the user to see all of their appointments and bookings. The user's availability will be calculated based on all available time slots across all of their connected calendars and will be taken into account when presenting a user's available time slots to a client or customer.

In another embodiment, the present invention allows for "round robin" distribution of appointments. Upon a Client selecting a date to book an appointment, the present invention will fetch all the users who have that day or date's schedules available in their availability profile. Upon a client selecting a time, the present invention will check if that list of users has existing appointments booked on the selected date. The present invention will then check all events in all the connected calendars to check for scheduling conflicts. A user will be considered unavailable during any times where a booking or event is already scheduled, and those times will be removed from the user's availability. Whichever user has the least number of appointments so far for that day will be automatically selected and the appointment will be booked for them. If there is more than one user available, there will be a random selection of the next available user.

Lastly, in another embodiment, there is an option to create a unique link for individual, personal use. To further illustrate, an individual may have a calendar of all their available dates for a meeting. A client can then select a timeslot among these dates, provide their name, contact information and a message regarding the context of the meeting and then confirm it. Upon confirmation, they will receive an email with the details.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein:

FIGS. 20A-D show the user onboarding process of the present invention.

FIGS. 21A-B show the dashboard and user account of the present invention.

FIGS. 22A-D show the organization management interface of the present invention.

FIGS. 23A-B show the admin management dashboard of the present invention.

FIGS. 24A-D show the admin management appointments calendar interface of the present invention.

FIGS. 25A-D show the personal user account interface of the present invention.

FIGS. 26A-G show the super admin interface of the present invention.

DETAILED DESCRIPTION OF THE PREFERRED EMBODIMENT

Figure 1:
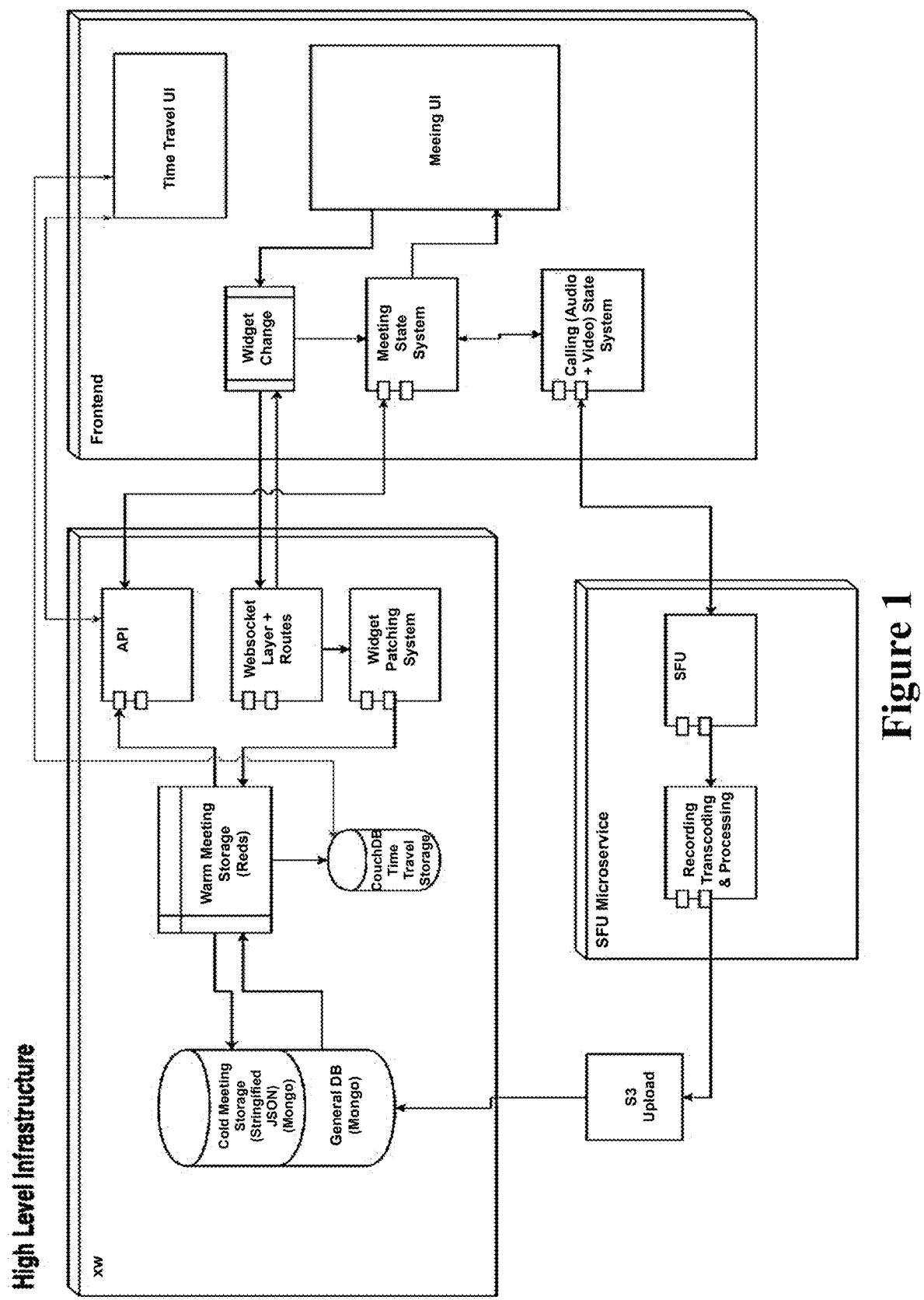
FIG. 1 is a diagram of the infrastructure of the present invention.

FIG. 1 is a diagram of the infrastructure of the present invention. The program begins with the Cold Meeting Storage (Stringified JSON) (Mongo) which goes into the Warm Meeting Storage (Redis) which goes back into the Cold Meeting Storage (Stringified JSON) (Mongo). That then goes back into the Warm Meeting Storage (Redis) which goes into both the CouchDB Time Travel Storage and the API. There is the Websocket Layer+Routes which goes into the Widget Patching System and back into the Warm Metting Storage (Redis). These all create the widgets in the program for the Time Travel UI and Meeting UI. The Meeting UI goes into the Widget Change, while the Meeting State System goes into the Meeting UI and the Calling (Audio+Video) State System. The SFU and Calling (Audio+Video) State System go into each other. The SFU goes into the Recording Transcoding & Processing which goes into the S3 Upload of the program.

Figure 2:
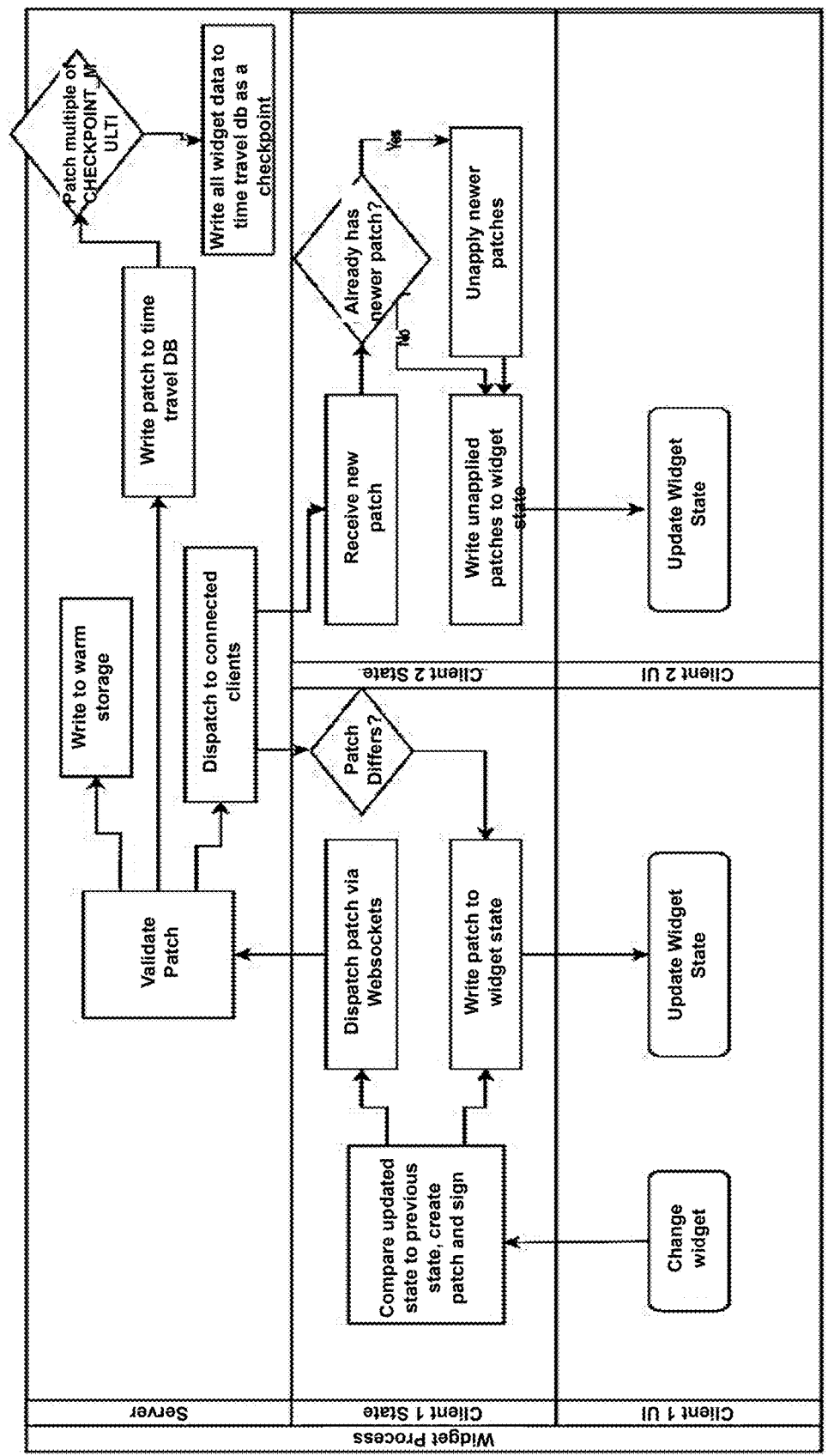
FIG. 2 is a diagram of the widget patching process of the present invention.

FIG. 2 is a diagram of the widget patching process of the present invention. In the Server section, the Validate Patch which goes into the Write to warm storage, Write patch to time travel DB, and Dispatch to connected clients. From the Write patch to time travel DB, it goes into the Patch multiple of CHECKPOINT_MULT and then into the Write all widget data to time travel db as a checkpoint, which creates the server to create a widget. From that point, it goes into the Client 1 State and Client 2 State. When a Client creates a widget, a compare updated state to previous state, create pach and sign is done. From there it is a Dispatch patch via Websockets and also Write patch to widget state. When dispatched to connected clients, in the Client 1 State, the patch differs and goes into the Write patch to widget state. This leads to the Client 1 UI where there is an Updated widget state or a change in widget occurs, which leads back to the Compare updated state to previous state, create patch and sign in Client 1 State. In the Client 2 State, a new patch is received and if there is already a newer patch then an Unapply newer patches occurs which then goes into the Write unapplied patches to widget state. If there is not Already a newer patch, then it goes into Write unapplied patches to widget state. This all leads to the Client 2 UI where an Updated Widget State is.

Figure 3:
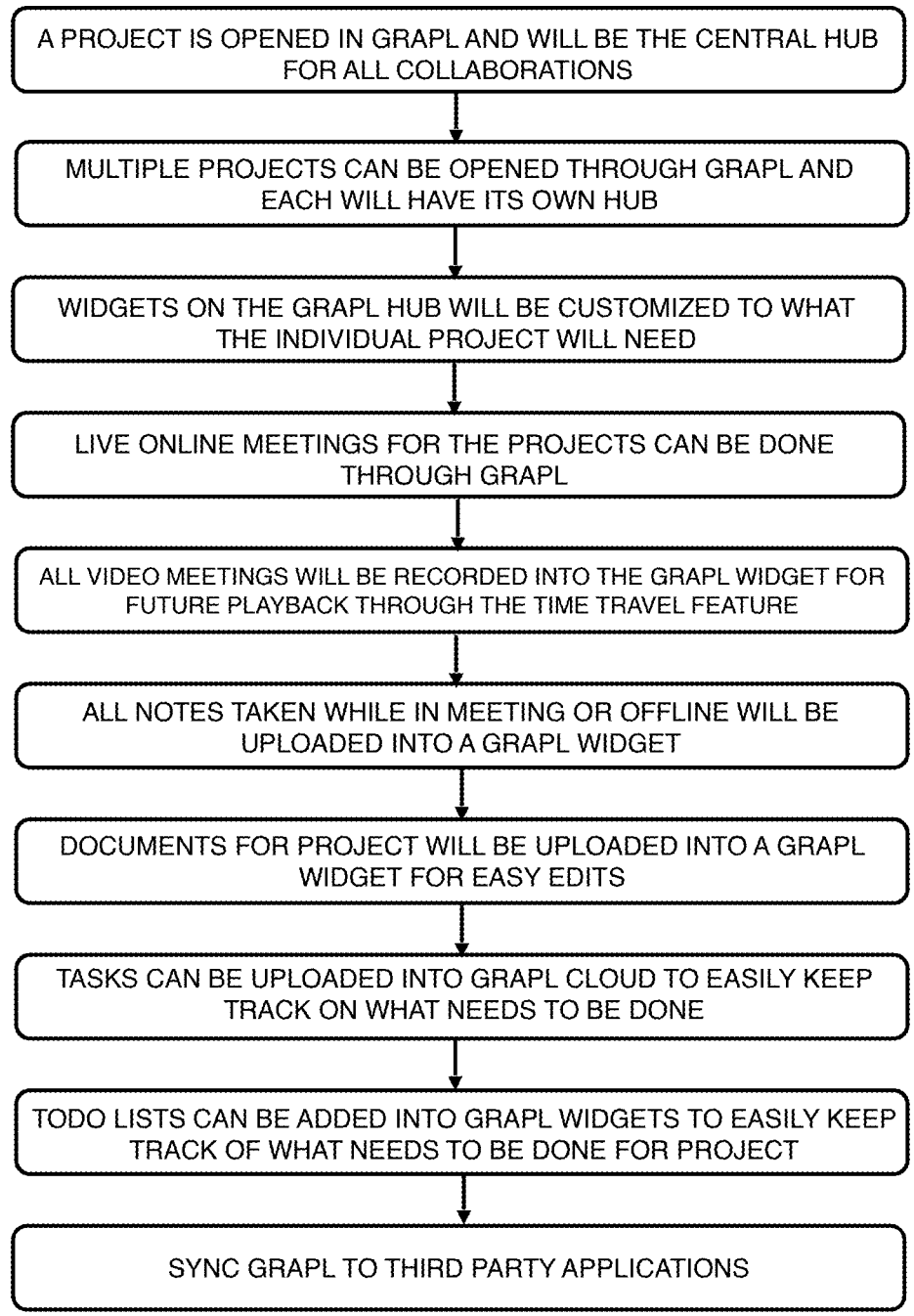
FIG. 3 is an overview of the present invention explaining the possible widgets and applications.

FIG. 3 is an overview of the present invention. A project is opened in the platform of the present invention and will be the central hub for the project and all collaborations made by everyone in the project. Multiple projects can be opened within the present invention, but each will have their own customized hub. All of the widgets on the present invention hub can be customized to what each individual project needs. Live online meetings can be done within the present invention. Every meeting can be recorded using a widget for future playback through the Time Travel feature. All notes taken online and offline during video meetings will also be uploaded using multiple widgets. All documents for the project can be uploaded into the present invention's widgets for easy editing between all collaborators. A "ToDo" task list can be uploaded into the present invention's widgets, which can easily keep track of what still needs to be done for the project. The present invention can be synced to third-party applications, like Zoom, Google Docs, Hubspot, or Github, to share and keep track of every document done for the project, all on singular hub on the present invention.

Figure 4:
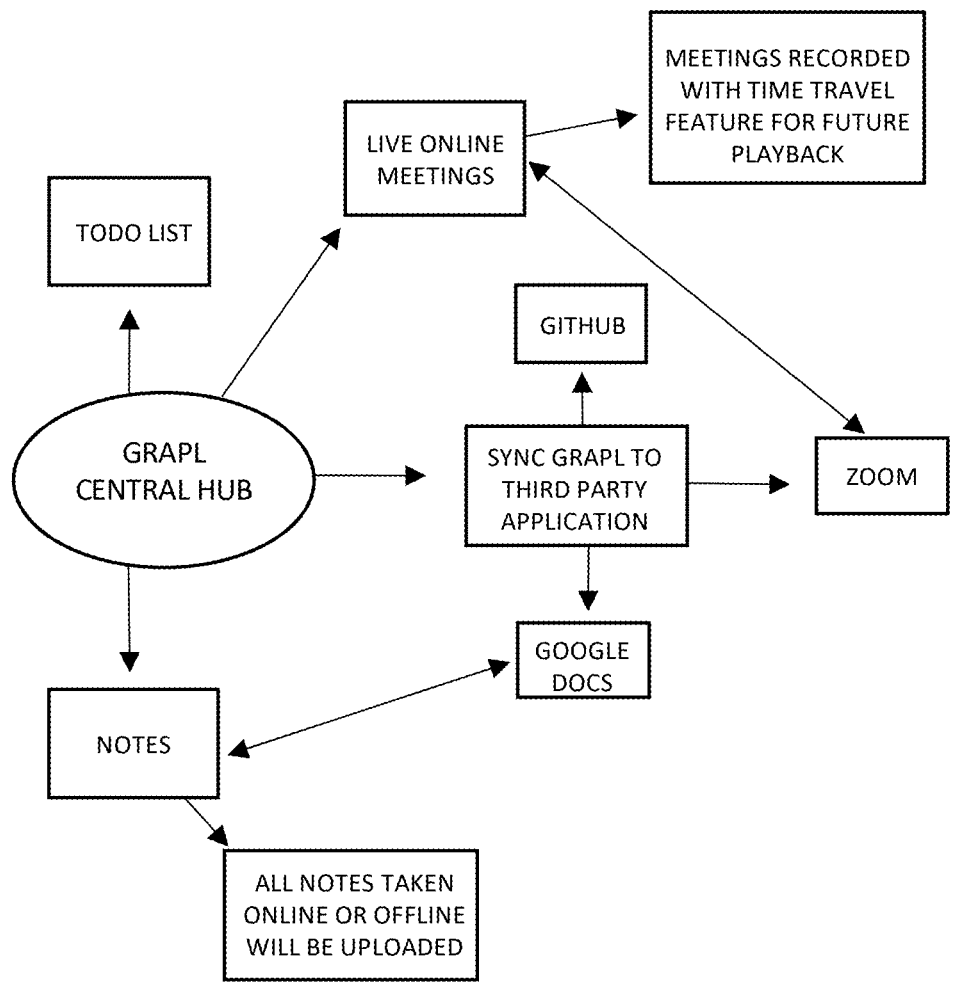
FIG. 4 is a diagram of the central hub and its connections of different widgets and applications.

FIG. 4 is a diagram showing the flow of widgets on the central hub of the platform of the present invention. One widget that can be added into the central hub is a "ToDo" task list, which can keep track of what needs to be done for the project. Another widget that can be added is a place for all online video meetings. In this widget, a sync to a third-party meeting application, such as Zoom, can be added. The Time Travel feature can also be integrated to the online meetings widget, to allow for future playback of all online meetings. A notes widget can also be added to keep track of all notes and documents taken online and offline. A third-party application, such as Google Docs, can be synced to this widget to keep track of all notes and documents collaborated on. A widget to sync the platform of the present invention to third-party applications can also be uploaded to easily pick and choose which third-party applications will be synced and used for each project.

Figure 5:
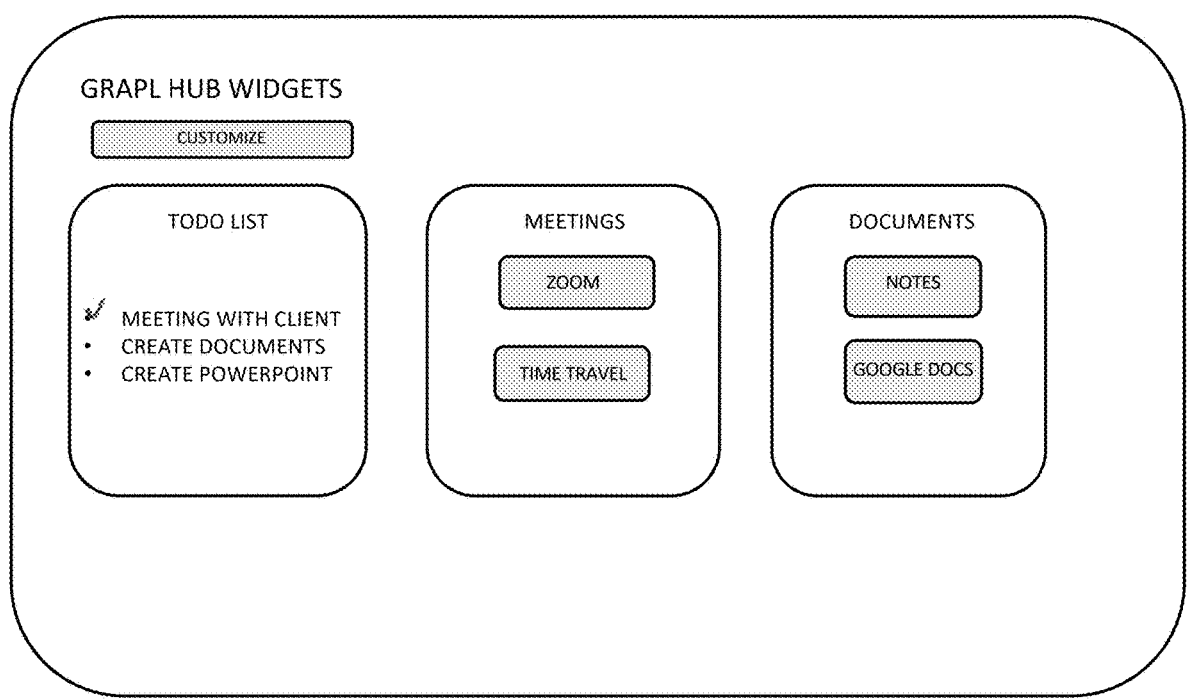
FIG. 5 is a diagram of an example of the hub and customizable widgets.

FIG. 5 is a diagram showing an example of a hub on the platform of the present invention and the customizable widgets within that hub. As shown in FIG. 5, each hub has the ability to customize different widgets for what each individual project needs. These widgets can include a "ToDo" task list, meetings widget, and documents widget. On the "ToDo" task list widget, tasks can be kept tracked of and checked off when a task is done. On the meetings widget, a sync to a third-party application, such as Zoom, can be found here. There can also be a Time Travel feature that allows future playback of the video meetings. On the documents widget, a place for any notes taken online and offline by all collaborators can be found. Also, a sync to Google Docs can be found here.

Figure 6:
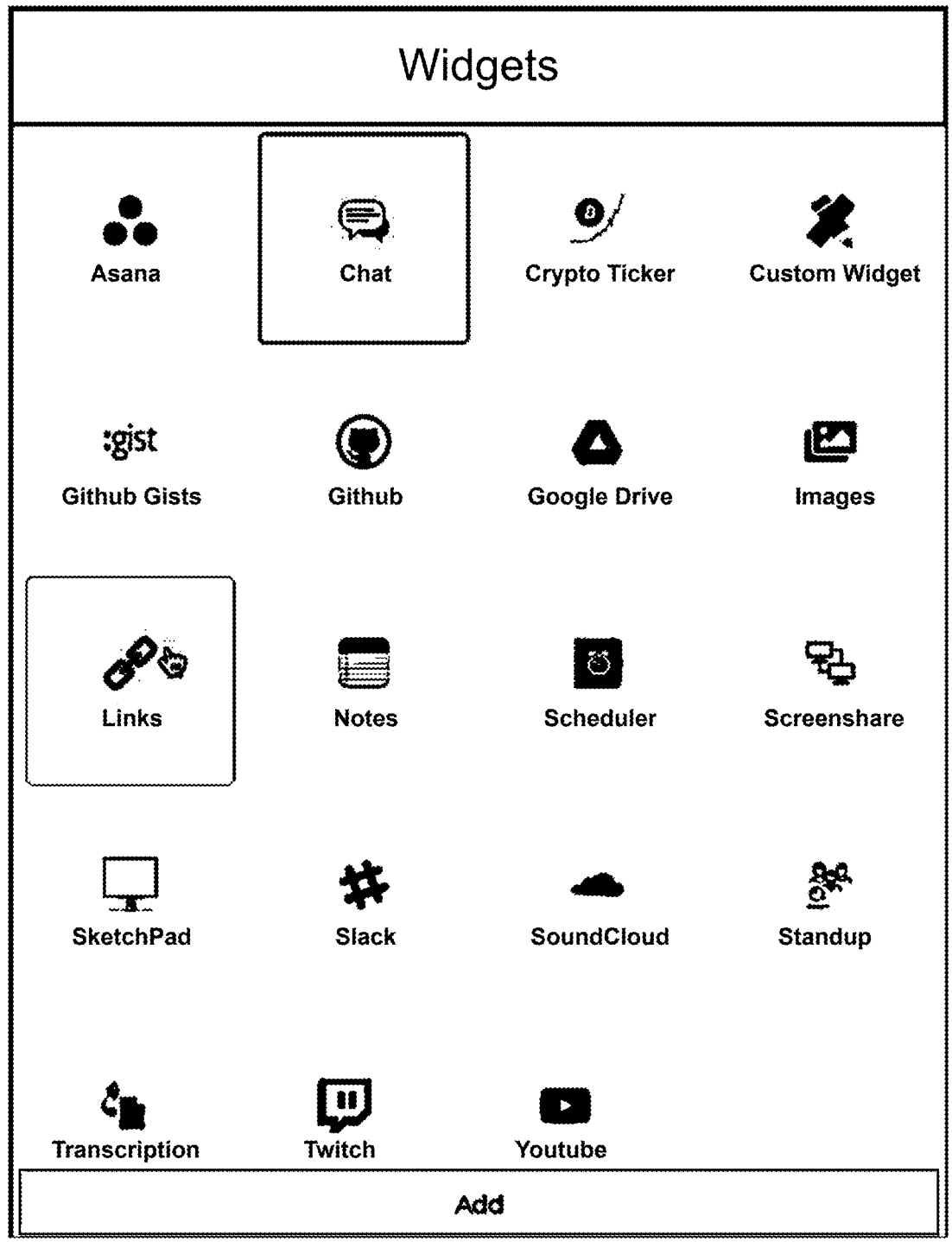
FIG. 6 is an image of the widgets of the present invention.

FIG. 6 is an image of the widgets of the present invention. These widgets include third party applications that are synced, like Asana, Crypto Ticker, Github Gists, Google Drive, SoundCloud, etc. There is also a widget that allows one to create custom widgets for whatever the project needs.

Figure 7A:
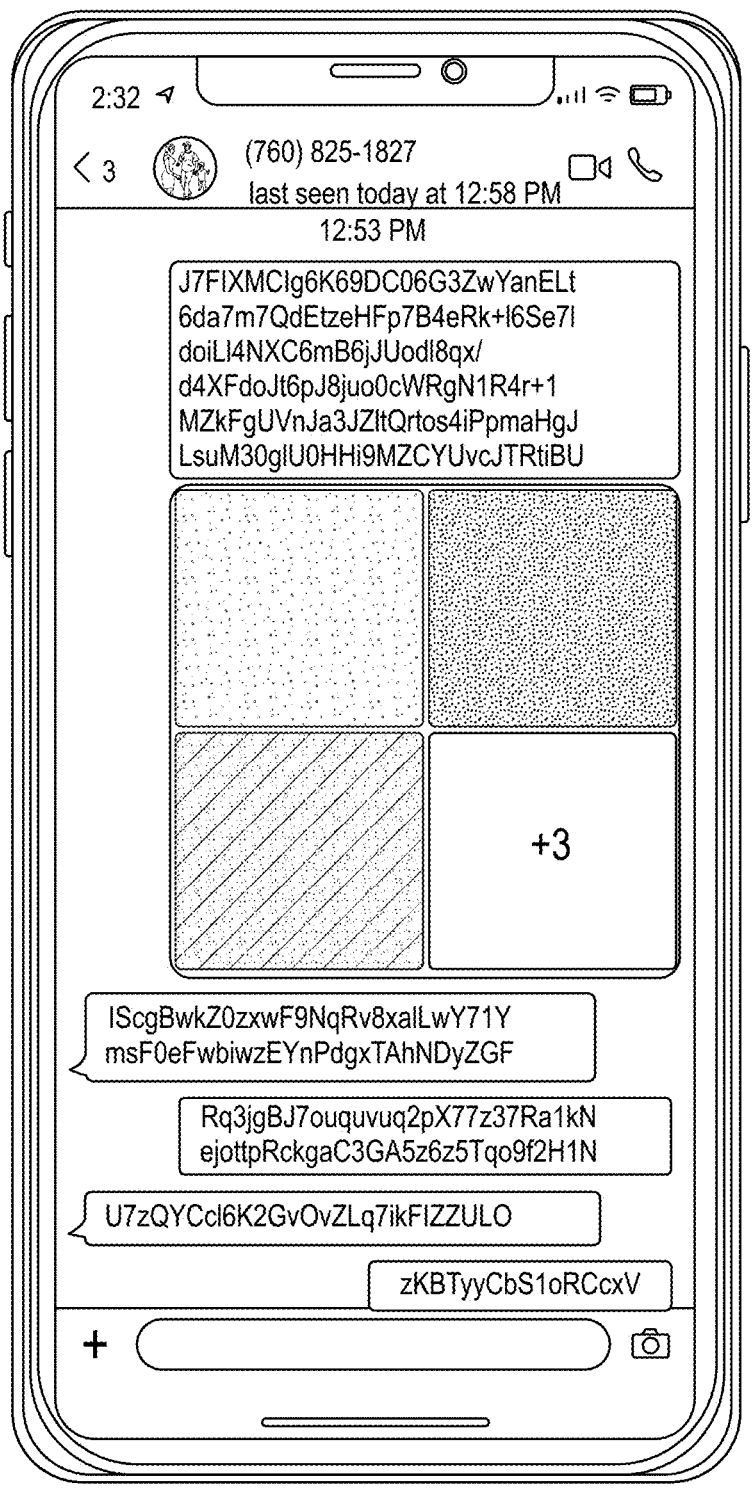
FIGS. 7A-B is an image of the widgets of the present invention as rendered on a smartphone.
Figure 7B:
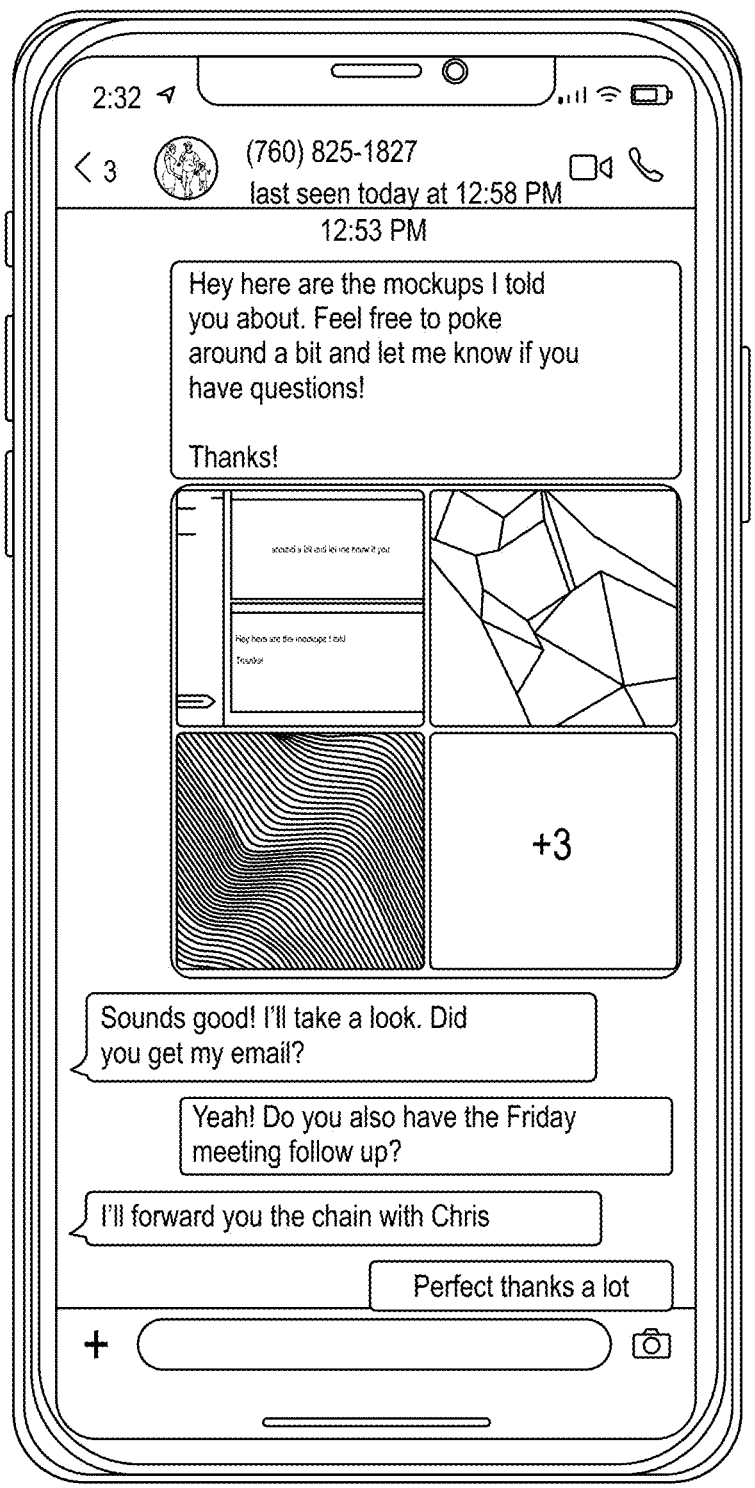

FIGS. 7A-B is an image of the widgets of the present invention as rendered on a smartphone. These images are examples of a chat between two collaborators and the pictures sent between them.

Figure 8:
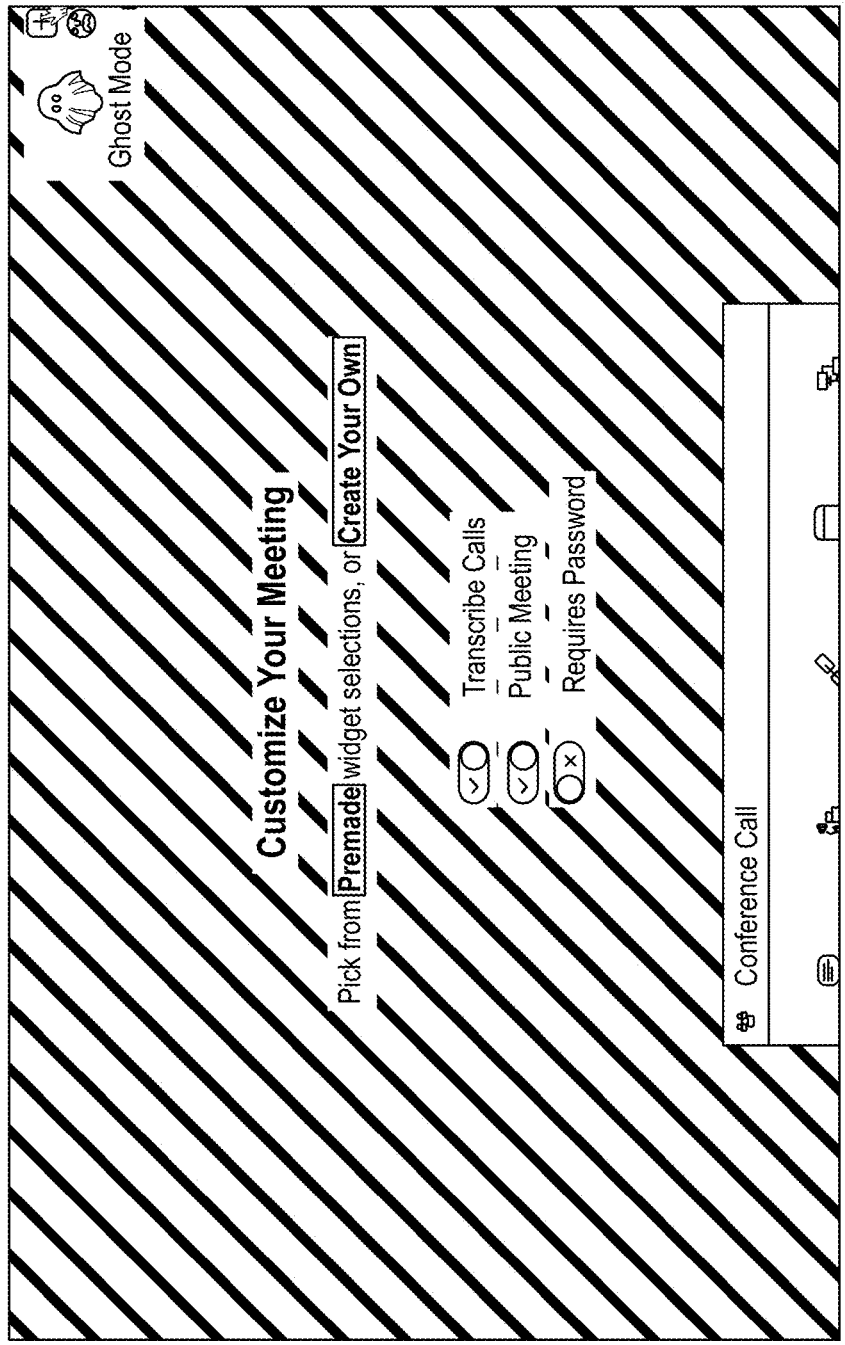
FIG. 8 is an image of the platform meeting function of the present invention.

FIG. 8 is an image of the platform meeting function of the present invention. There is the option to use Premade widget selections on the meeting can transcribe calls, create a public meeting, or require a password for collaborators to join the meeting. You can also create your own selections based on what the meeting needs.

Figure 9A:
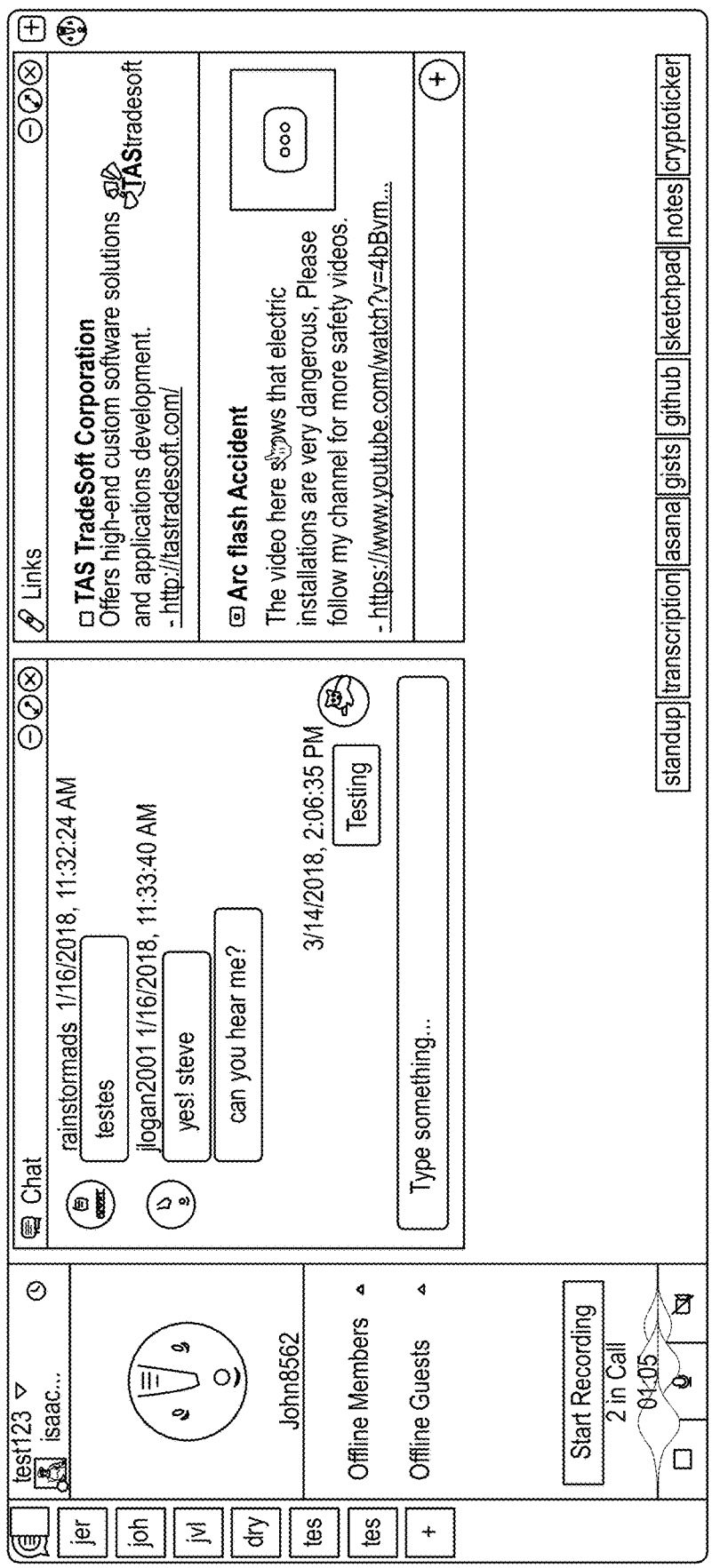
FIGS. 9A-C are images of the platform video functions of the present invention.
Figure 9B:
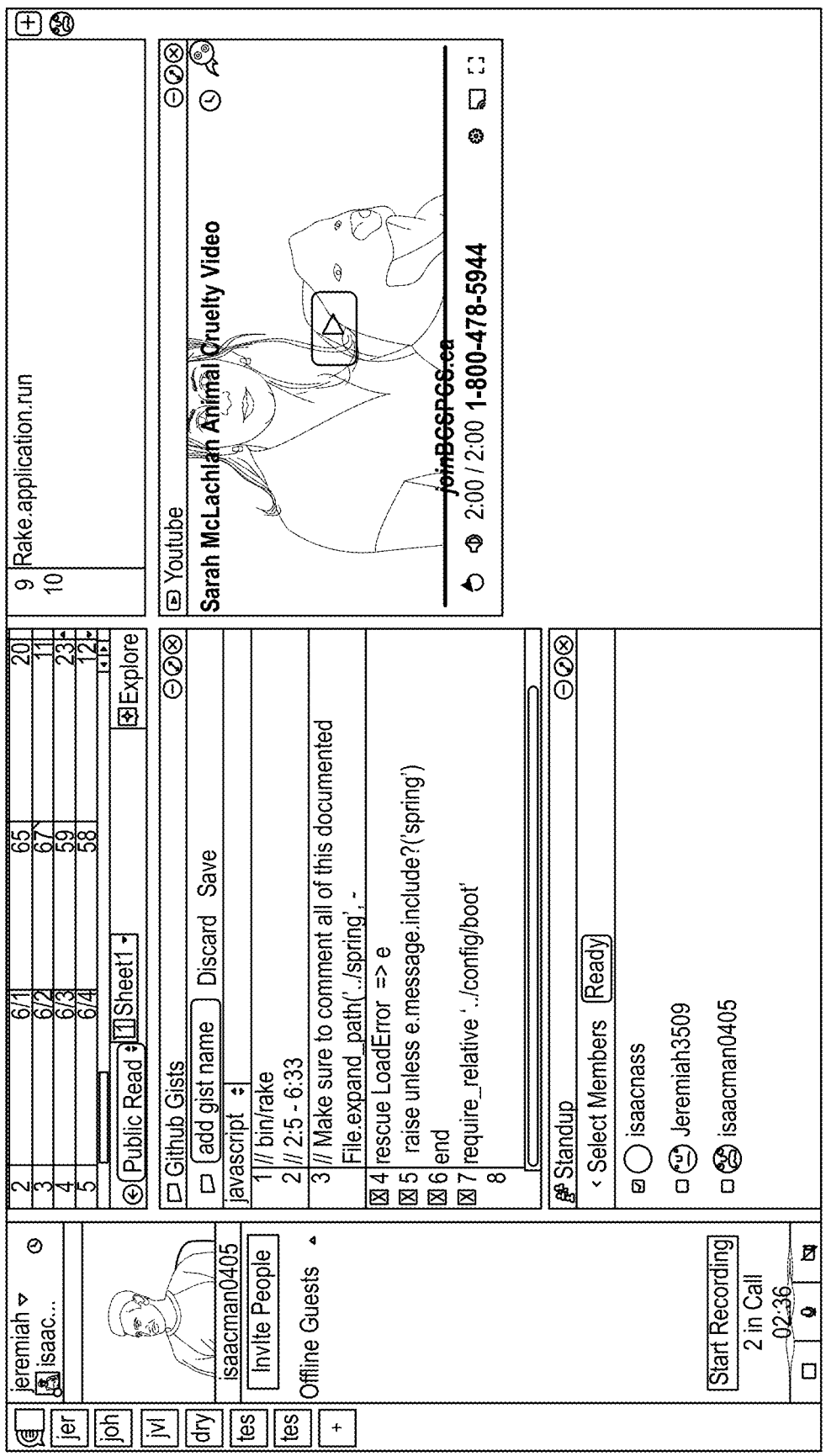
Figure 9C:
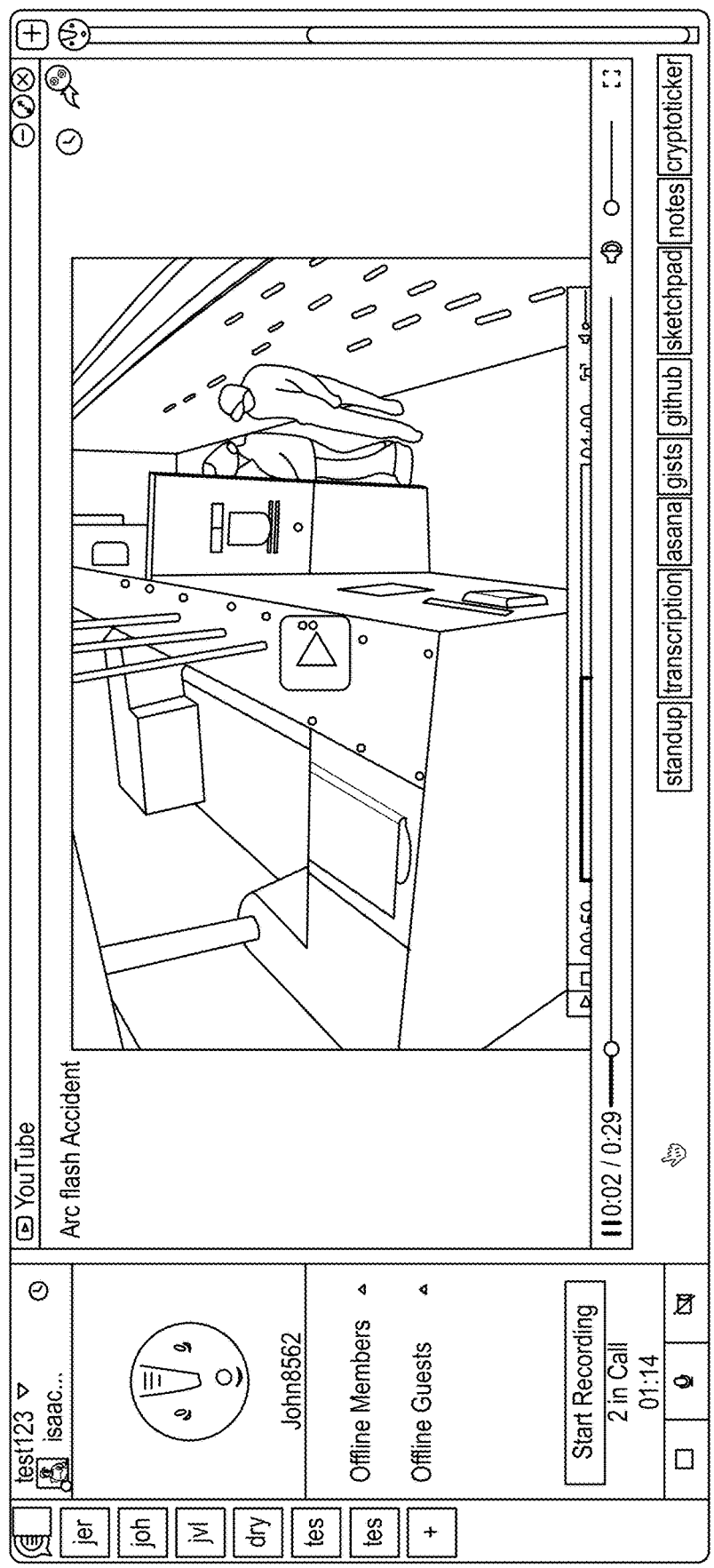
Figure 10A:
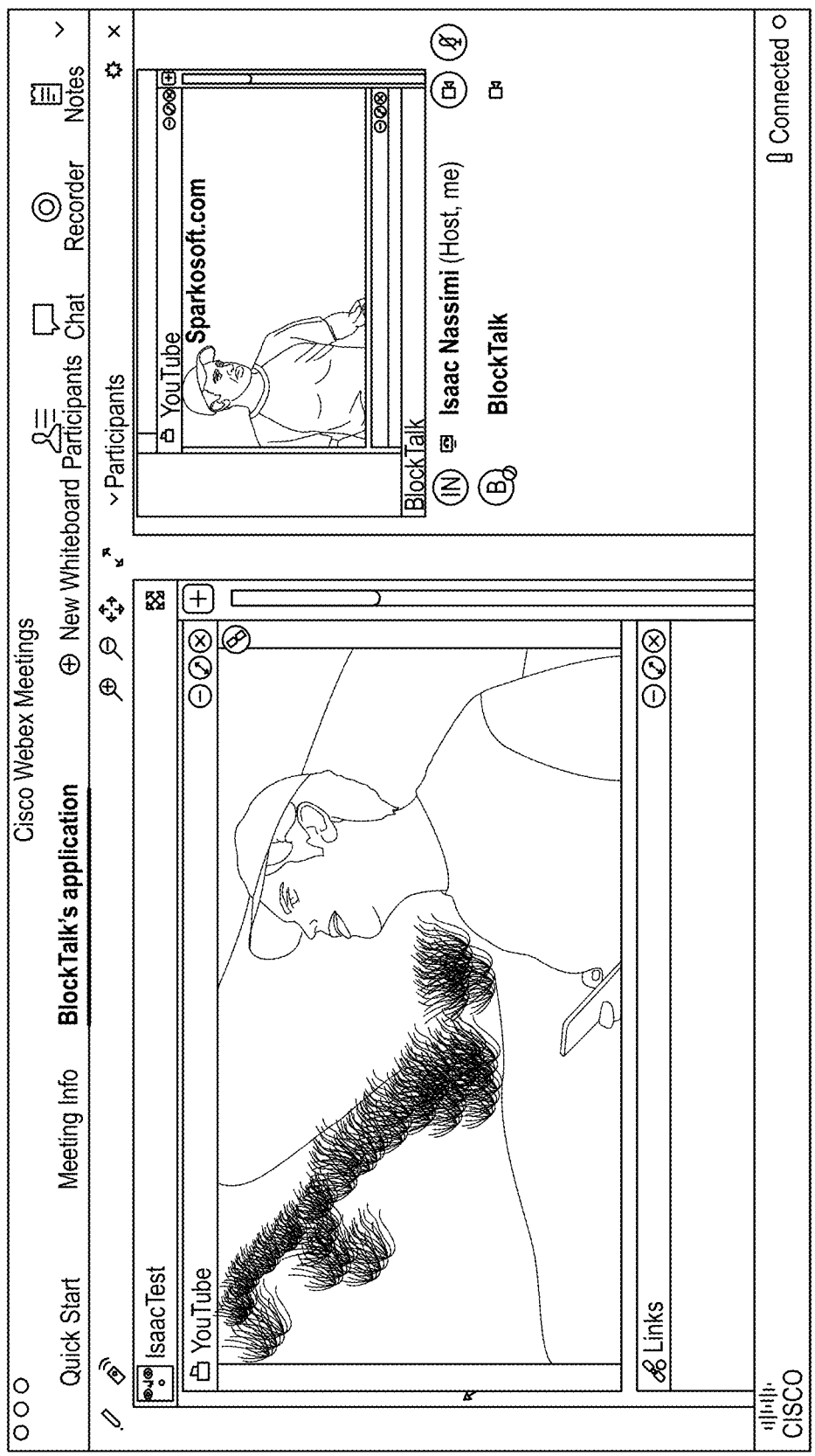
FIGS. 10A-D are images of the external meeting system integration of the present invention.
Figure 10B:
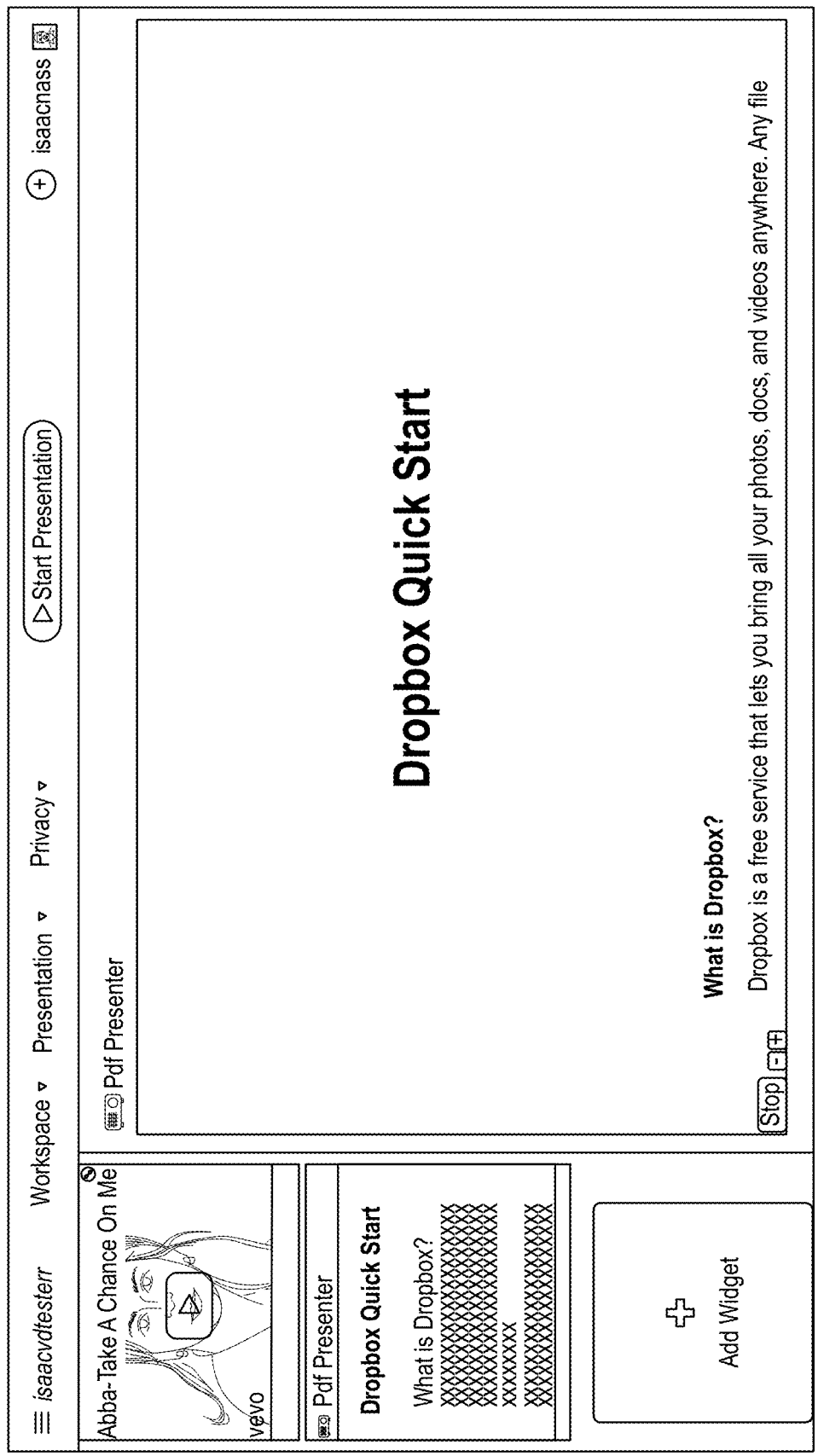
Figure 10C:
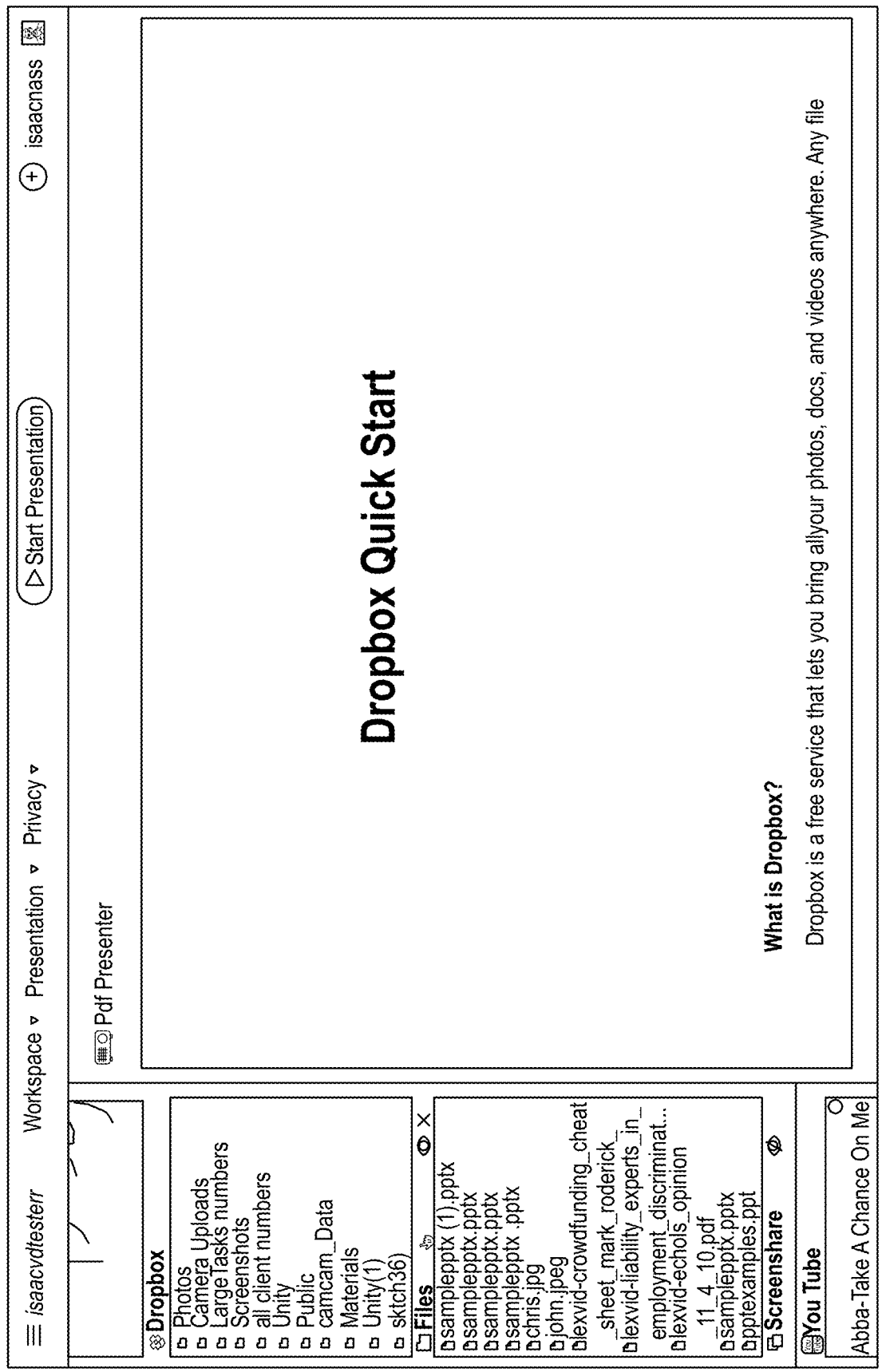
Figure 10D:
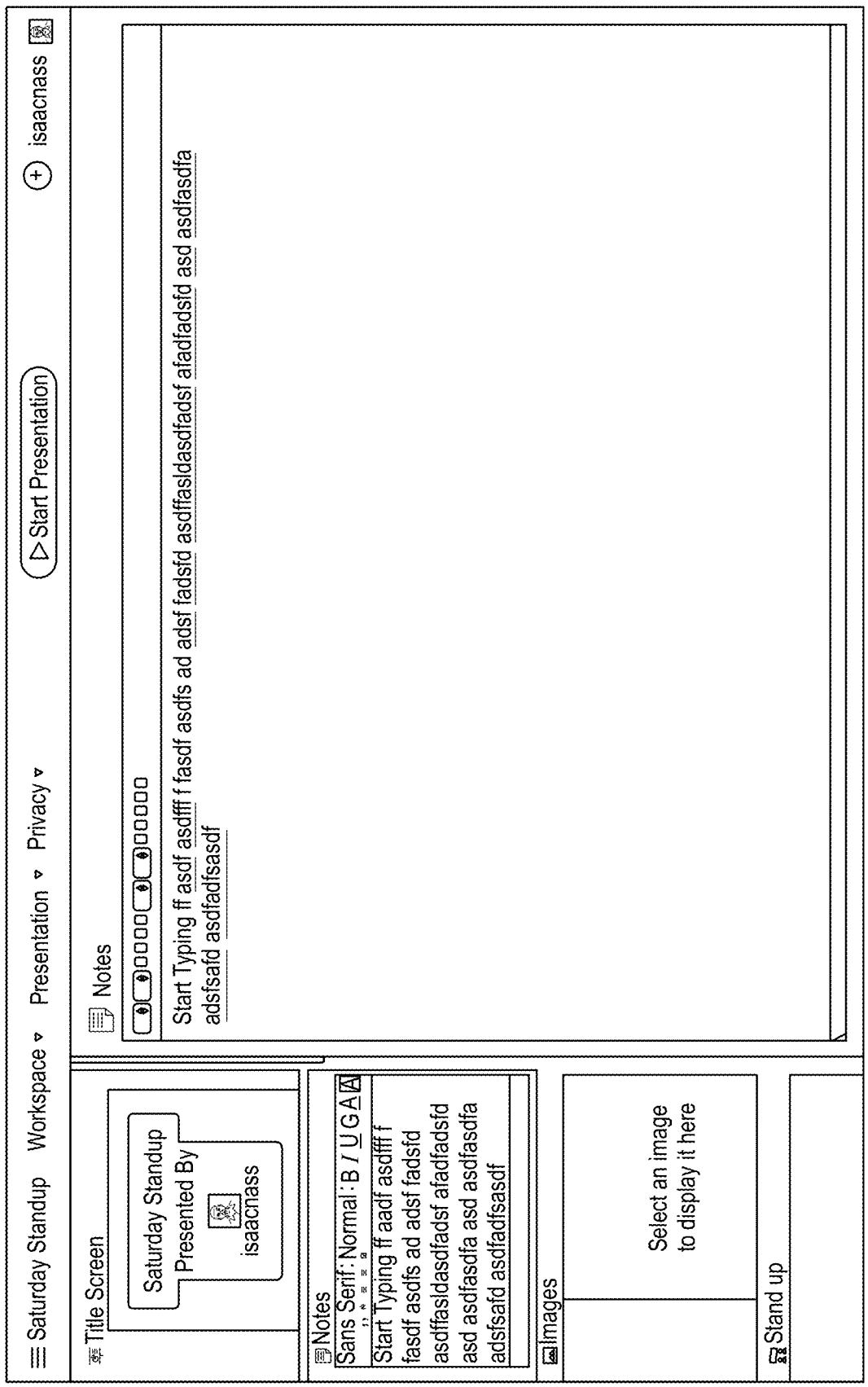

FIGS. 9A-C are images of the platform video functions of the present invention. On the video functions, there is the option to record the video, chat with others, and send links to all collaborators. There is also the ability to use the sync of third party applications, like Github Gists, Standup, and YouTube, to send items from those applications easily while on the video call.

FIGS. 10A-D are images of the external meeting system integration of the present invention. On this, a collaborator can share items with others, like sharing a YouTube video, Dropbox, or Notes from one collaborator's screen to others.

Figure 11A:
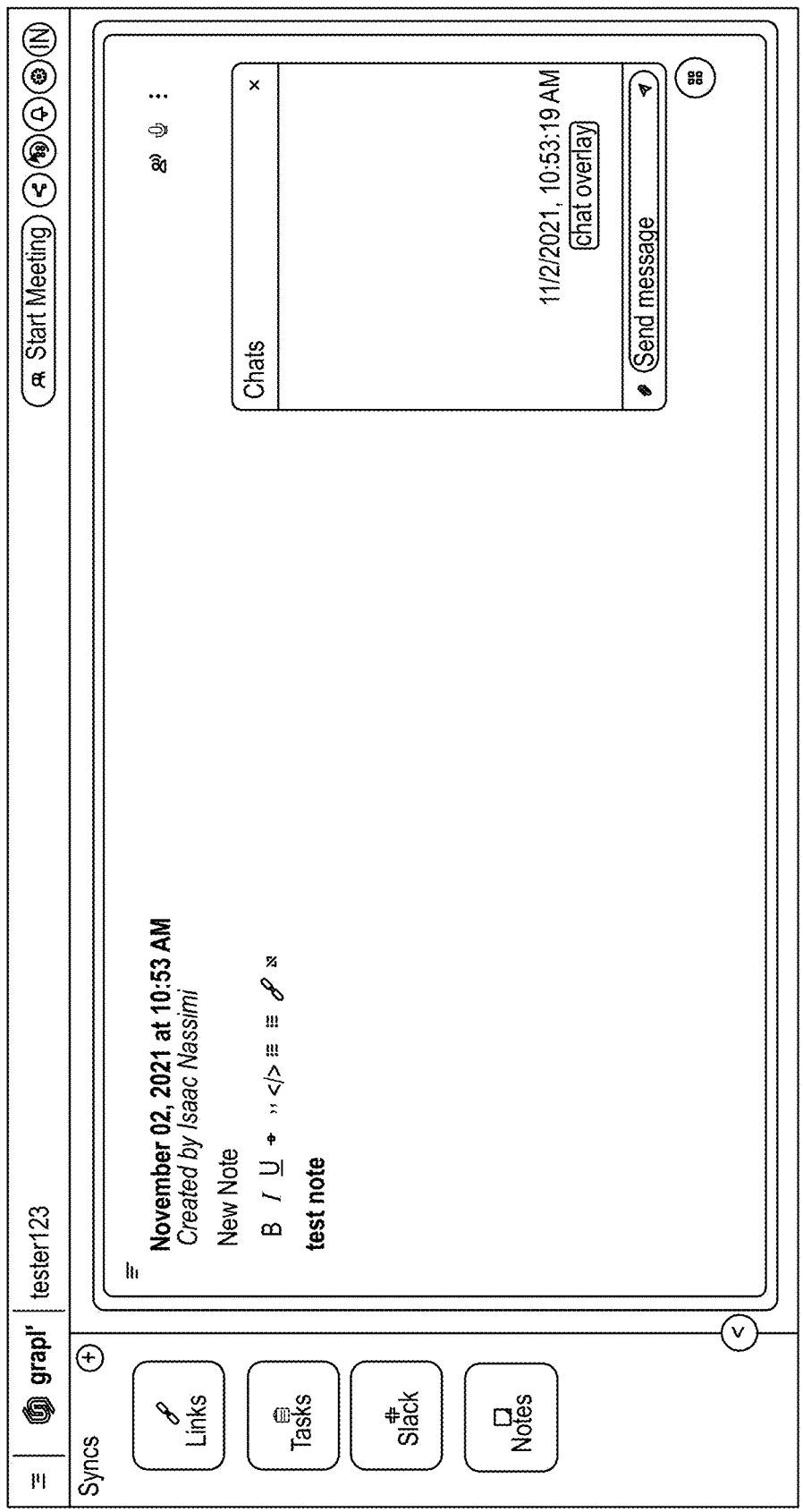
FIGS. 11A-B are images of the platform of the present invention.
Figure 11B:
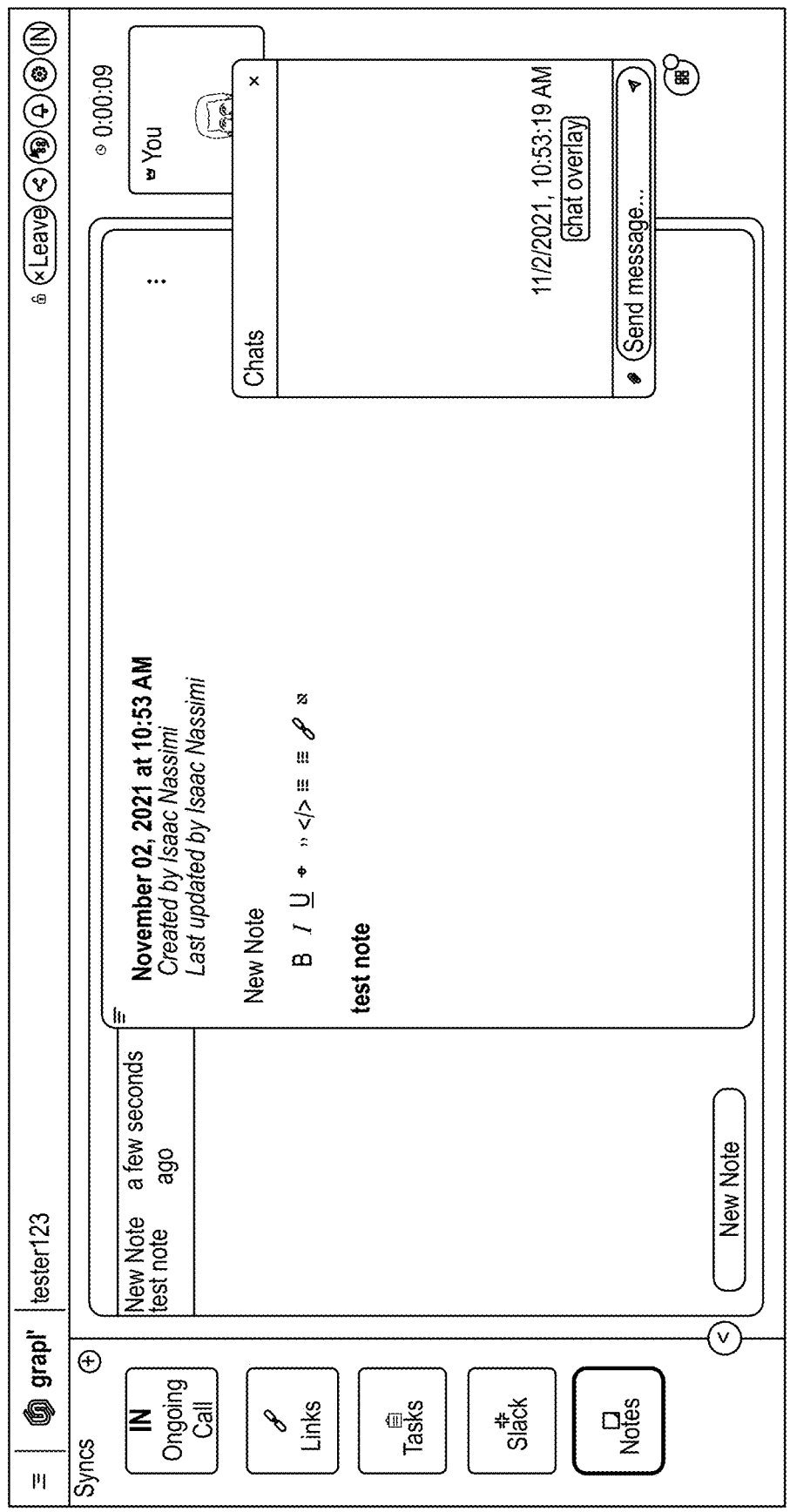

FIGS. 11A-B are images of the platform of the present invention. These images show the options of creating notes in the widgets or creating notes while a call is going on.

Figure 12A:
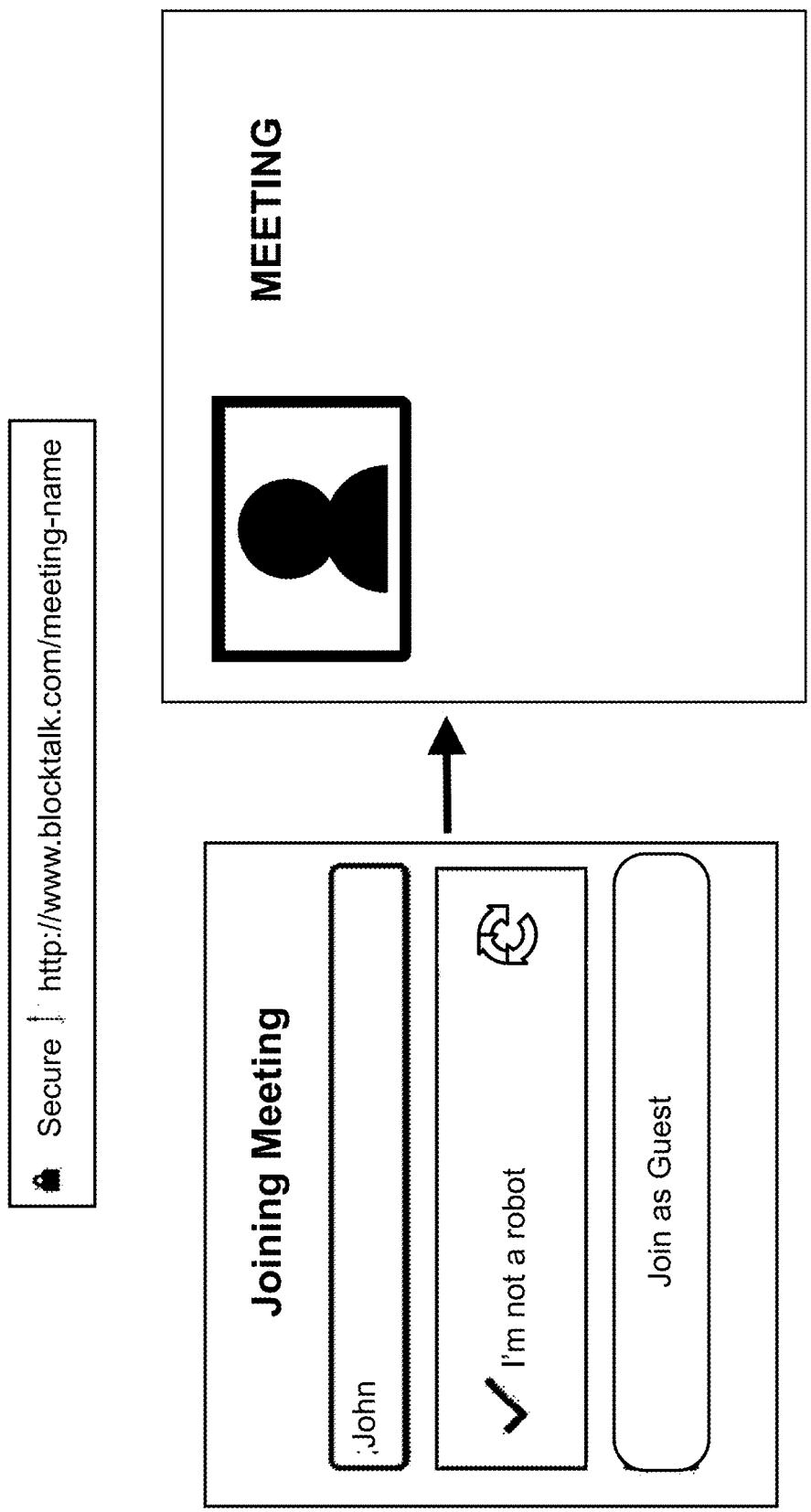
FIGS. 12A-H show various features of the present invention.

FIGS. 12A-H show various features of the present invention. FIG. 12A is a screenshot showing the ability for the user to instantly create and join online meetings using the present invention. The user can also use a Uniform Resource Locator (URL) link to instantly create create a meeting which can be joined by anyone, with or without an account. Through the present invention, new and existing users can initiate video calls in as little as ten seconds.

Figure 12B:
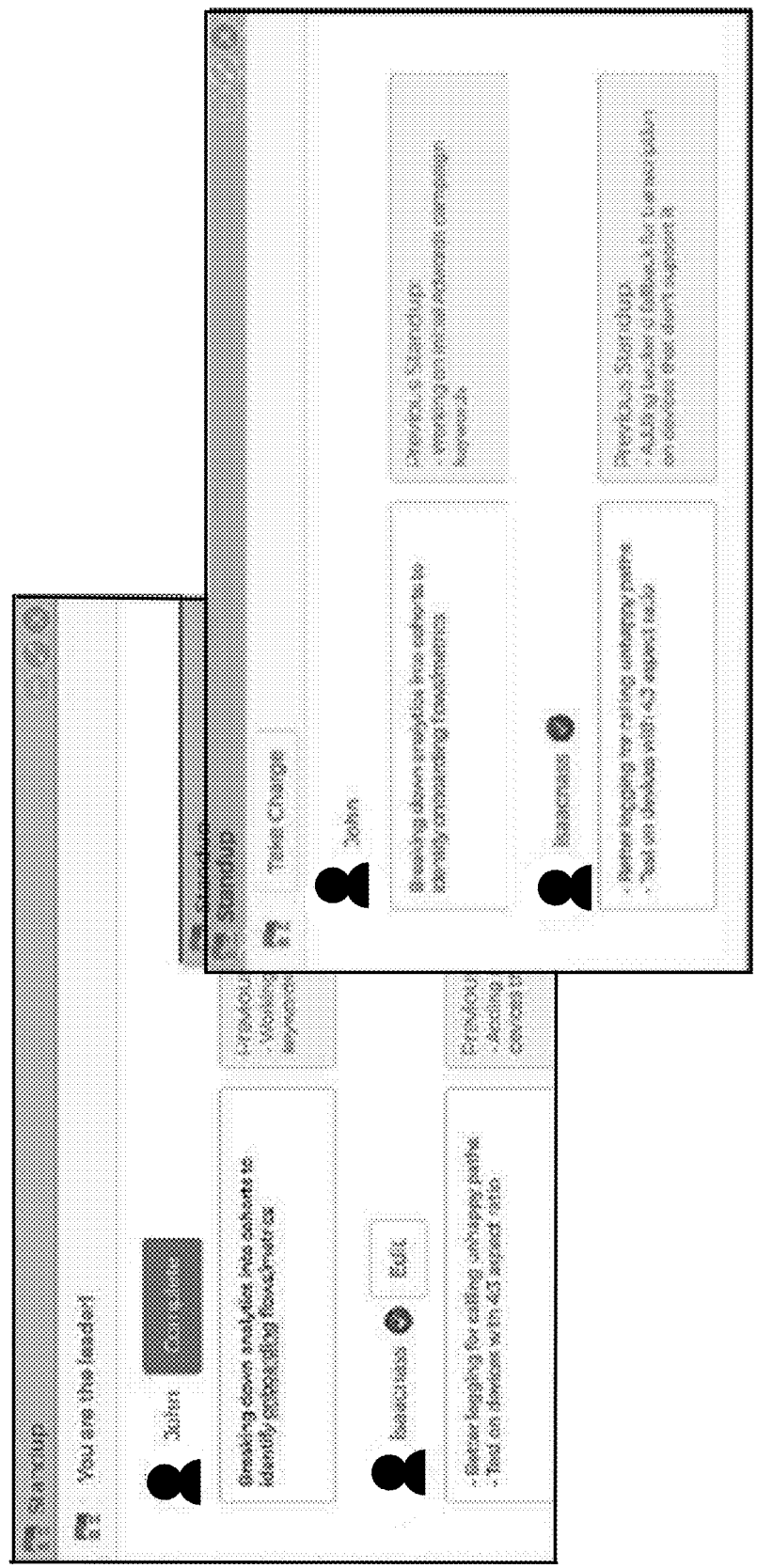

FIG. 12B is a screenshot showing how widgets can be added and integrated into online meetings instantly. All data is synced in real-time, allowing for seamless collaboration tailored to any use case.

Figure 12C:
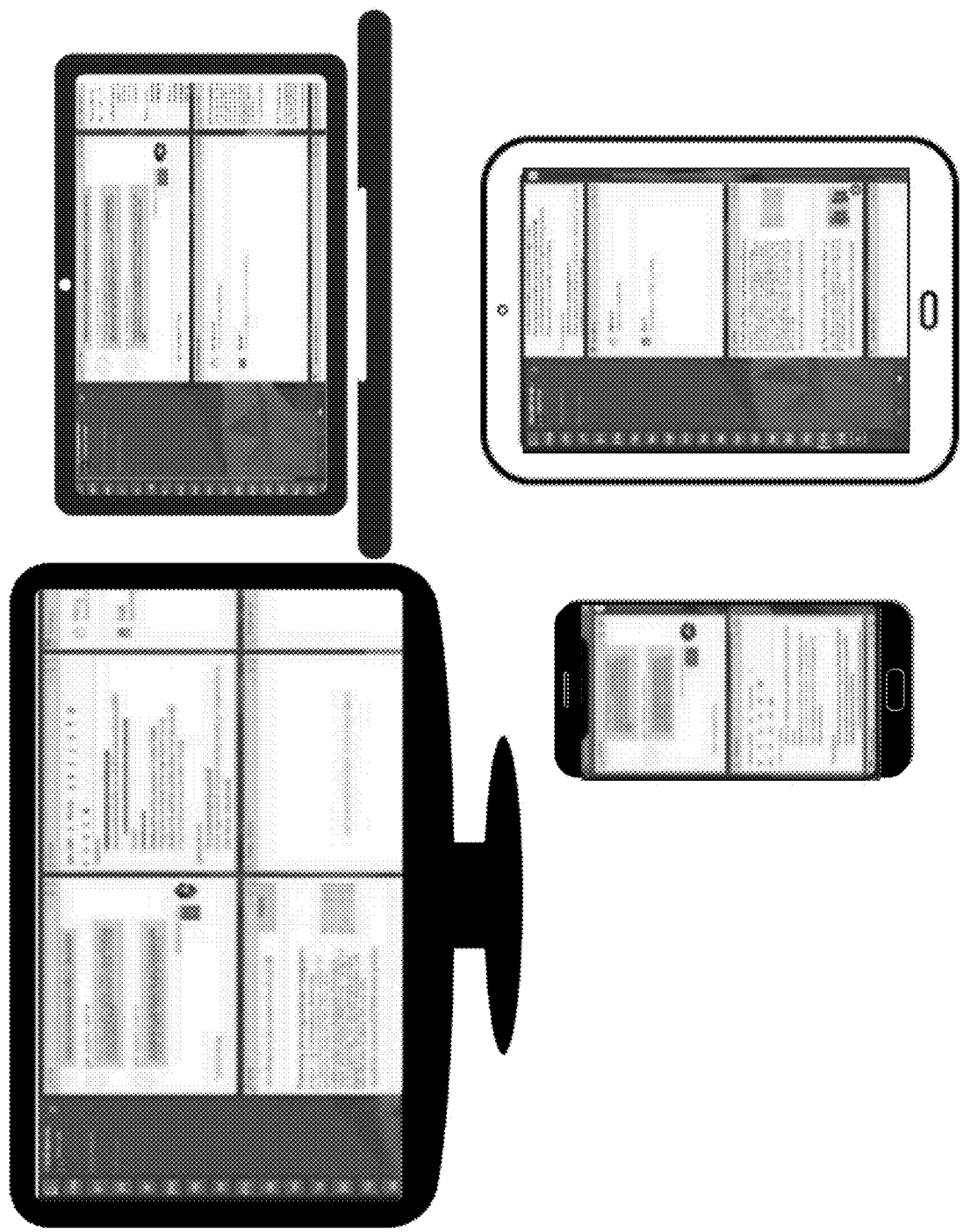

FIG. 12C is an image showing how the present invention can be used across a multiple variety of operating systems and devices. This can include: desktop computers; laptop computers; tablets; and smartphones. The widgets intelligently reorient themselves to naturally fit every platform. All user data is persistent and can be picked up exactly as it was on any device.

Figure 12D:
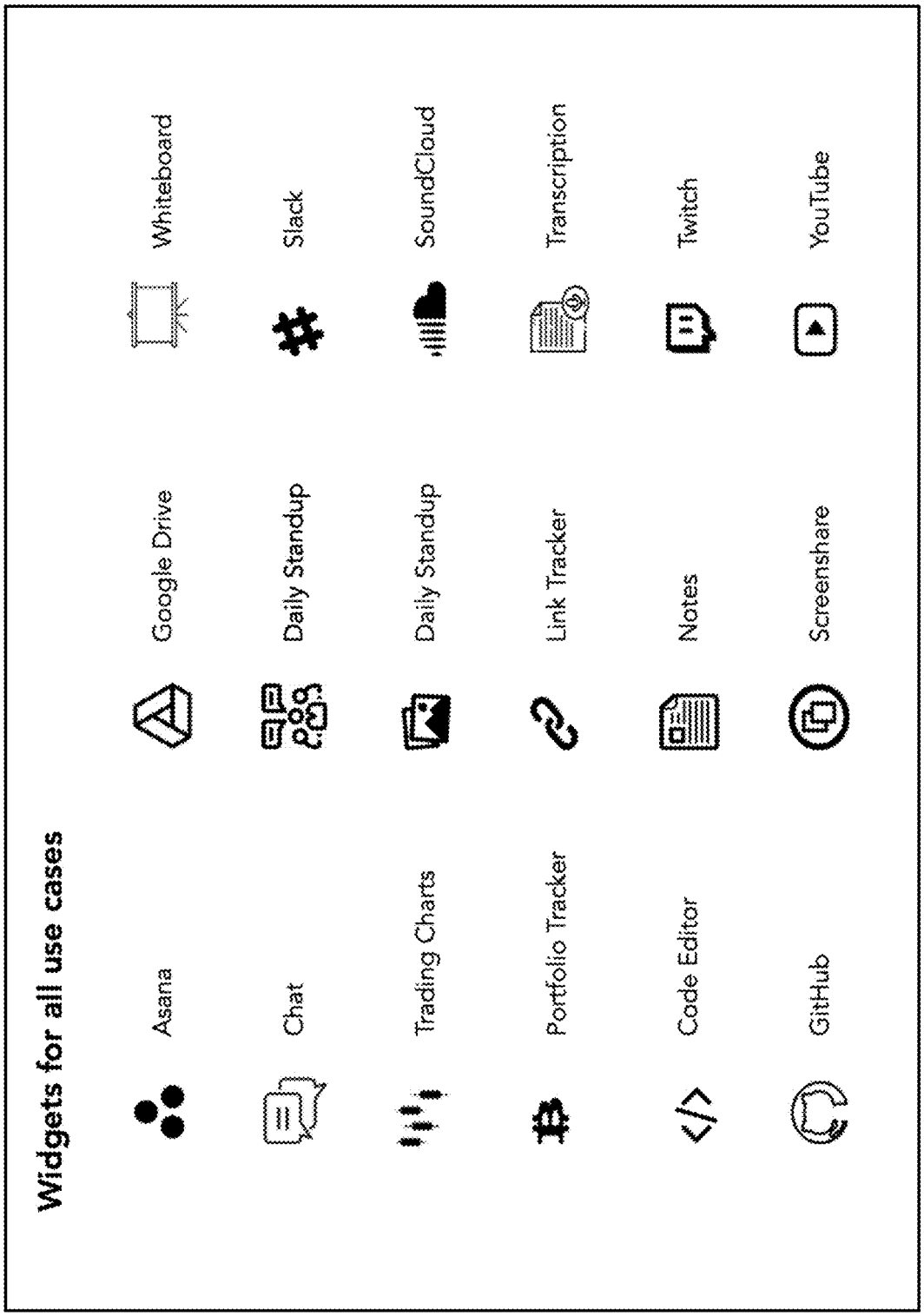

FIG. 12D shows examples of the many different types of widgets for all use cases of the present invention.

Figure 12E:
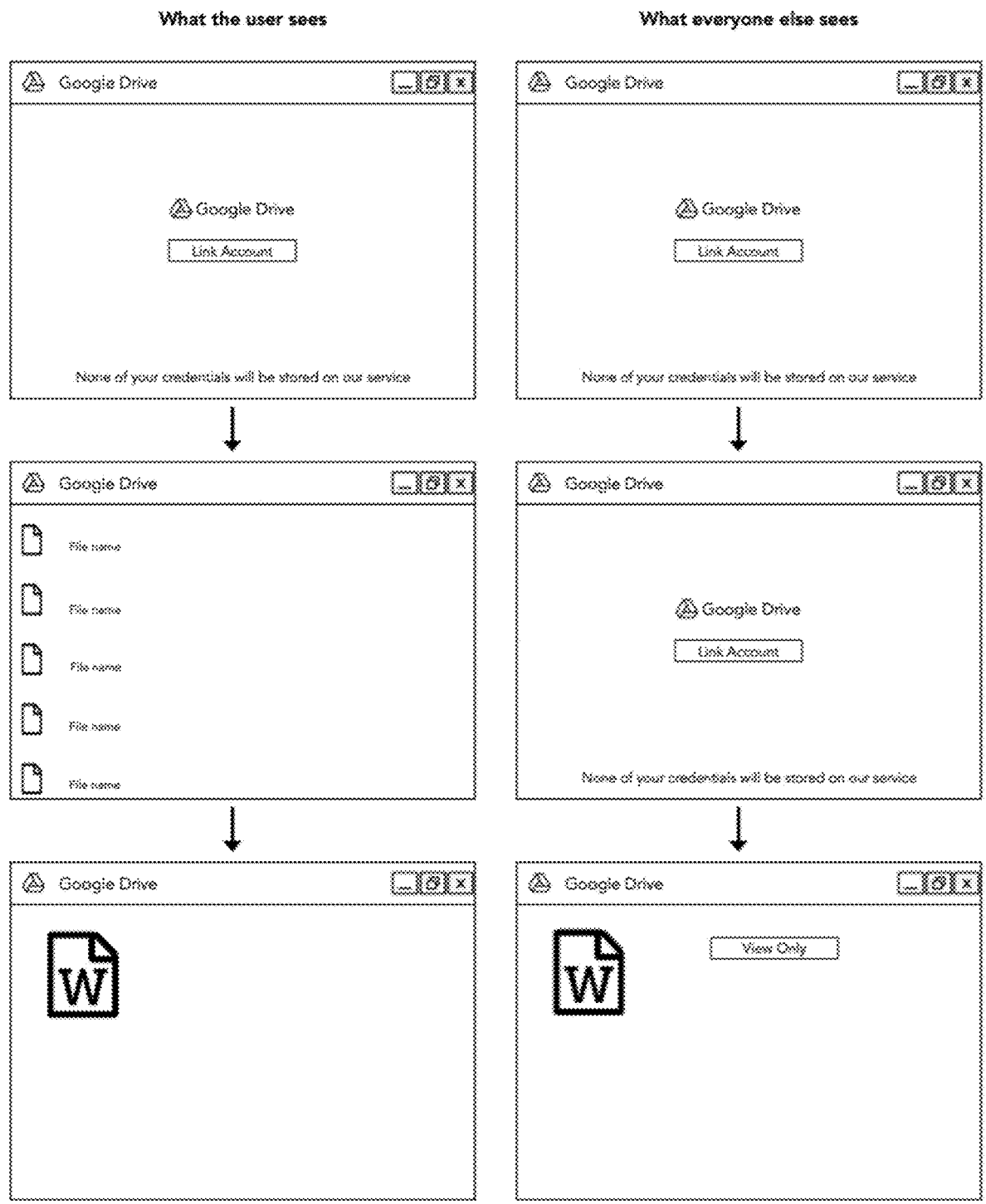

FIG. 12E shows the user integrations of the present invention. Widgets can be used to easily add third-party authorization privileges without any unwanted data exposure. The user can control what content is viewable to other users on the platform of the present invention.

Figure 12F:
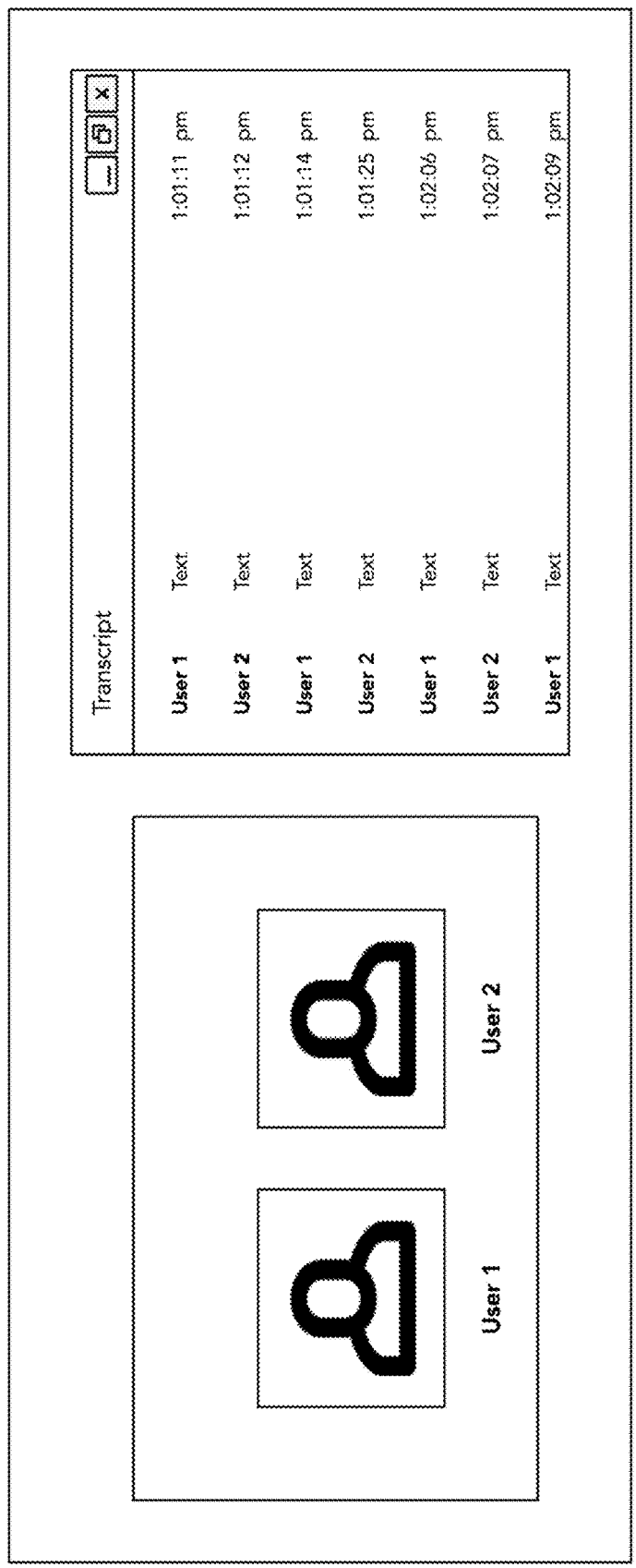

FIG. 12F is a screenshot of the recording and transcription features of the present invention. Meeting attendees can have their individual audio transcribed in real-time, creating an actual script of the conversation. The calls or meetings are automatically recorded, and users have the ability to have their videos stitched together into a mosaic.

Figure 12G:
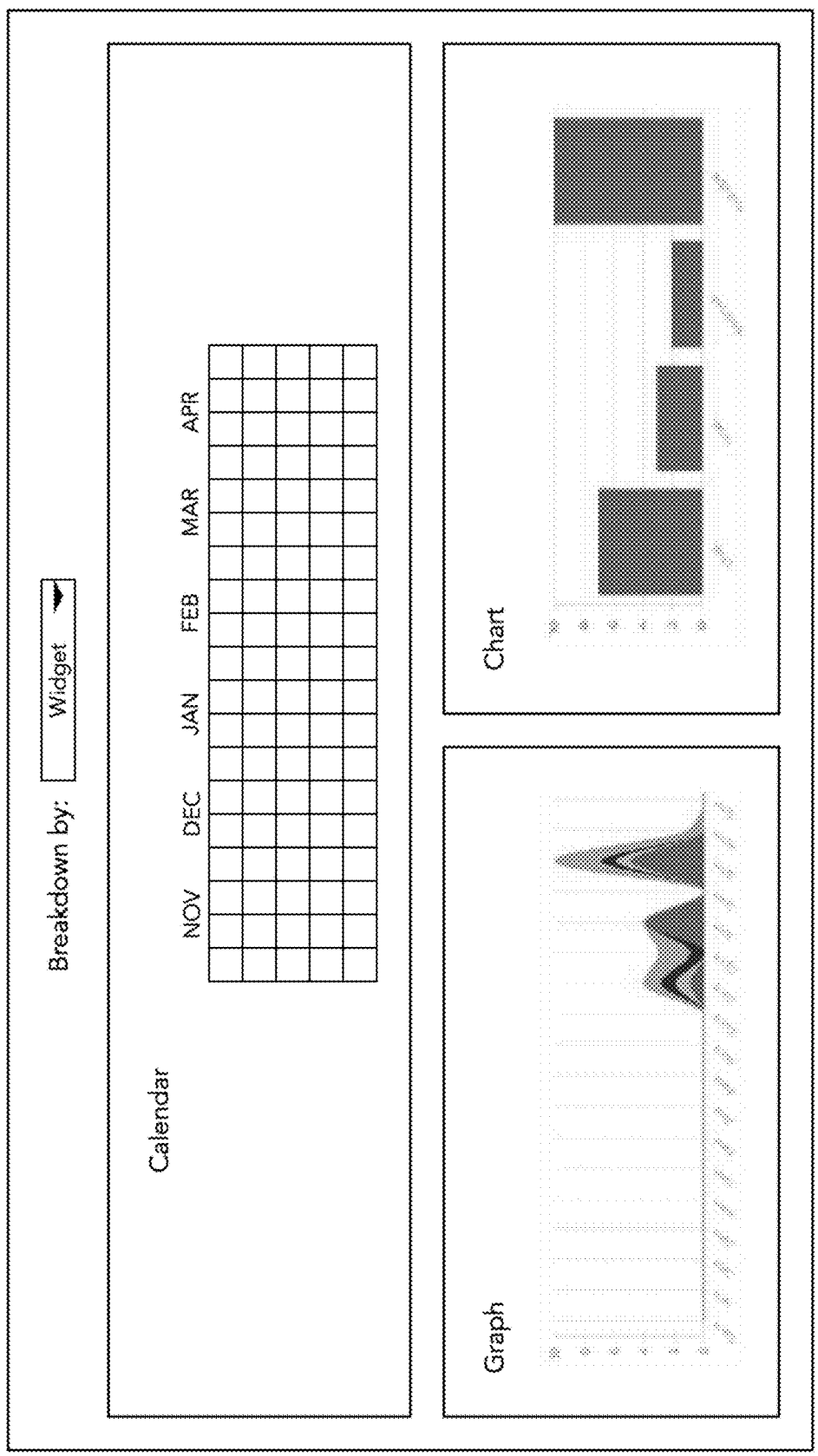

FIG. 12G is a screenshot of the time travel feature of the present invention. All meetings are searchable by their actions, transcriptions, and recordings. Analytics and reporting provide an auditing system for each meeting through the platform of the present invention. The platform also allows for encrypted "ghost" meetings to be securely searchable by the user.

Figure 12H:
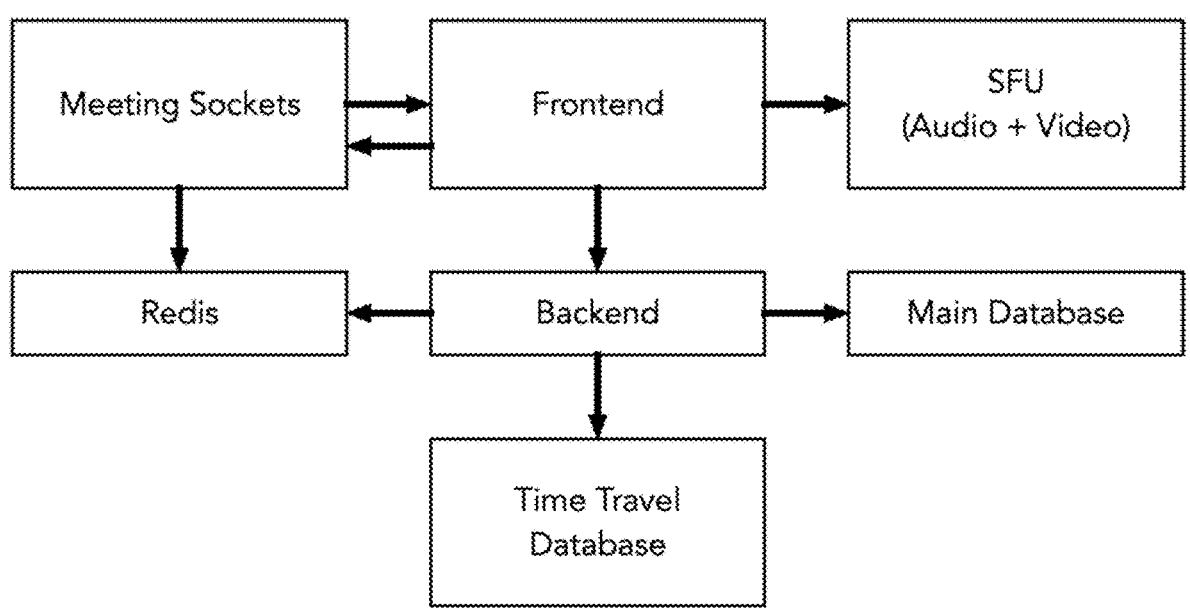

FIG. 12H is a diagram showing integrations of faster processing and platform speed, security and scalability of the present invention. The application stack is split into multiple services, each of which may be elastically load balanced, keeping server costs as low as possible. An incremental token system keeps authentication schemes simple and secure.

Figure 13:
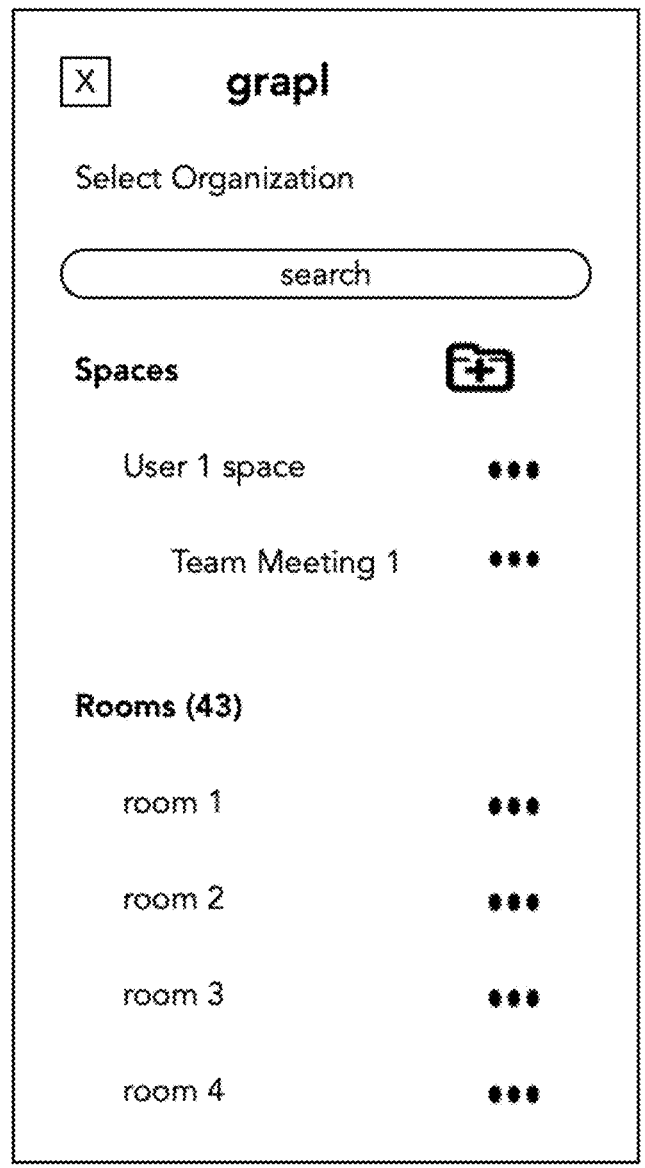
FIG. 13 shows admin portal of the present invention.

FIG. 13 shows admin portal of the present invention. This portal is used for organizations to manage clients and internal users, with organization of rooms and spaces that enable enhanced workflow between all entities and relationships.

Figure 14A:
FIGS. 14A-D show the new user onboarding process of the present invention
Figure 14B:
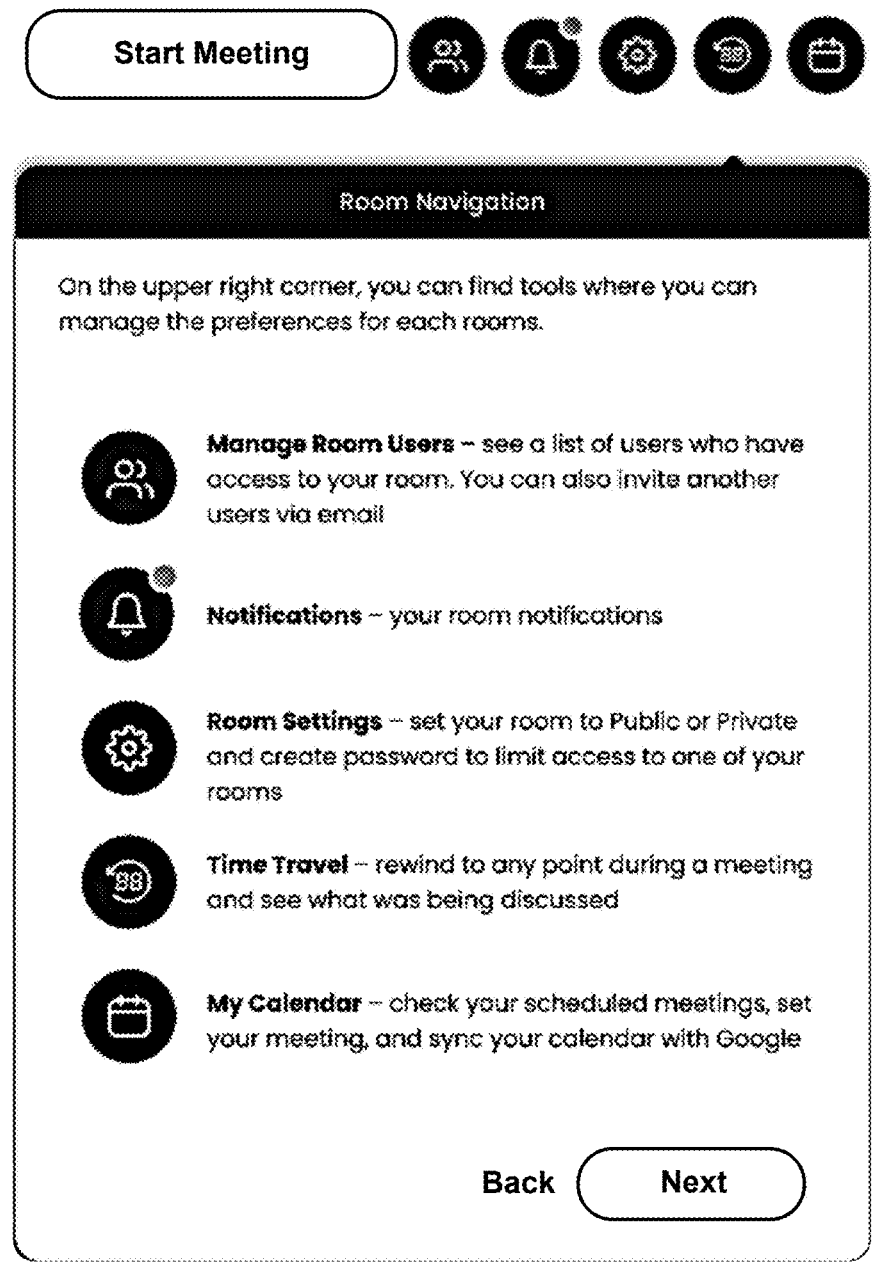
Figure 14C:
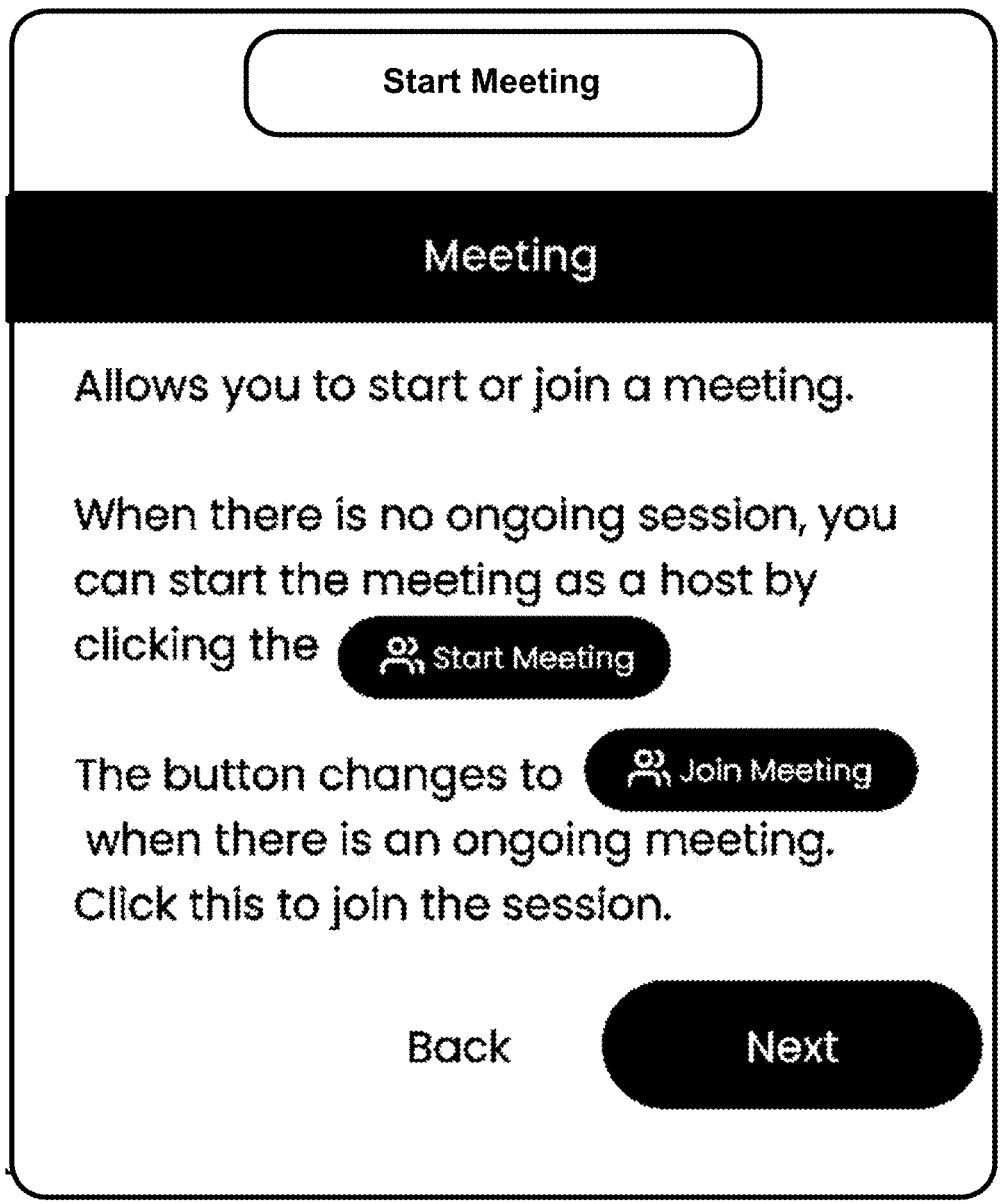
Figure 14D:
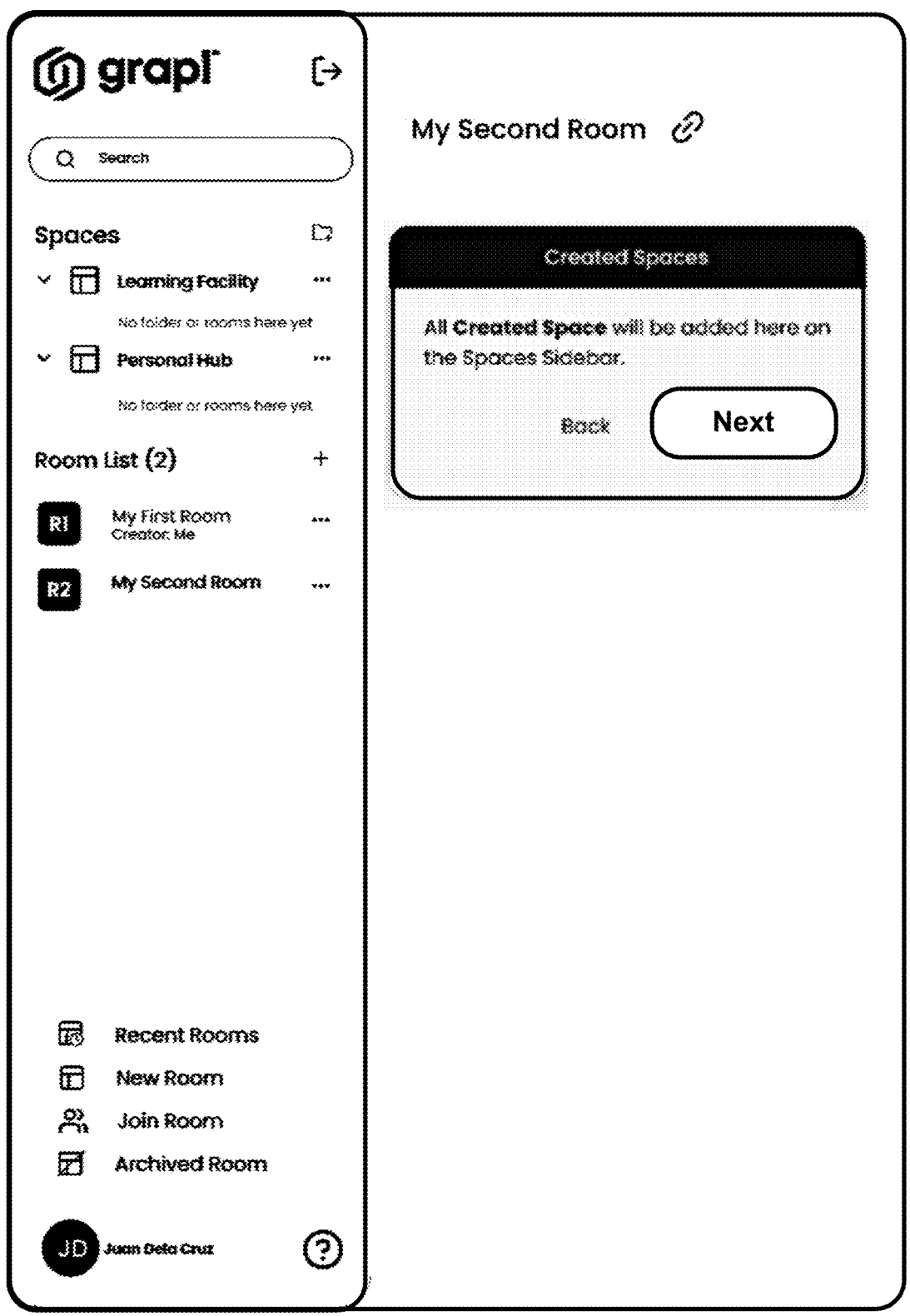

FIGS. 14A-D show the new user onboarding process of the present invention. which explains how to set up a Room, organize your Rooms with Spaces and add Tools and Integrations to your Room. FIG. 14A shows the overview of the user room, including the tools sidebar and meeting options. FIG. 14B shows the room management interface. FIG. 14C shows the user meeting interface. FIG. 14D shows the user spaces and rooms sidebar of the present invention.

Figure 15A:
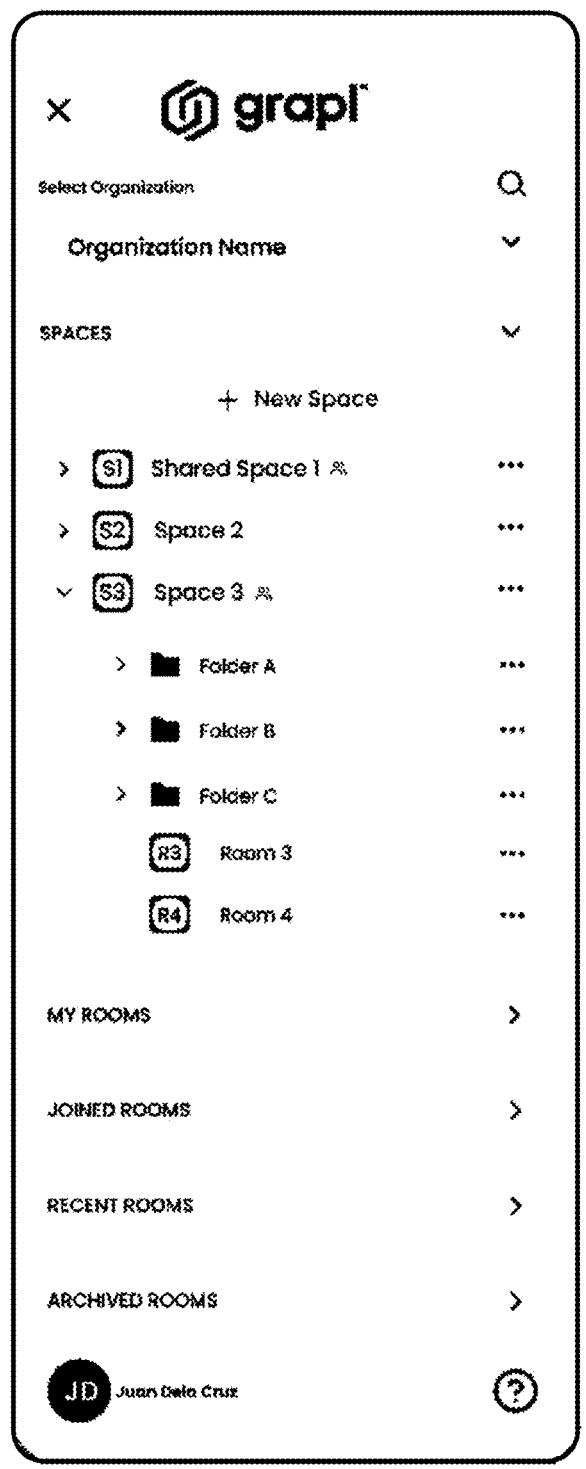
FIGS. 15A-B show the shareable spaces, folders and rooms navigation of the present invention.
Figure 15B:
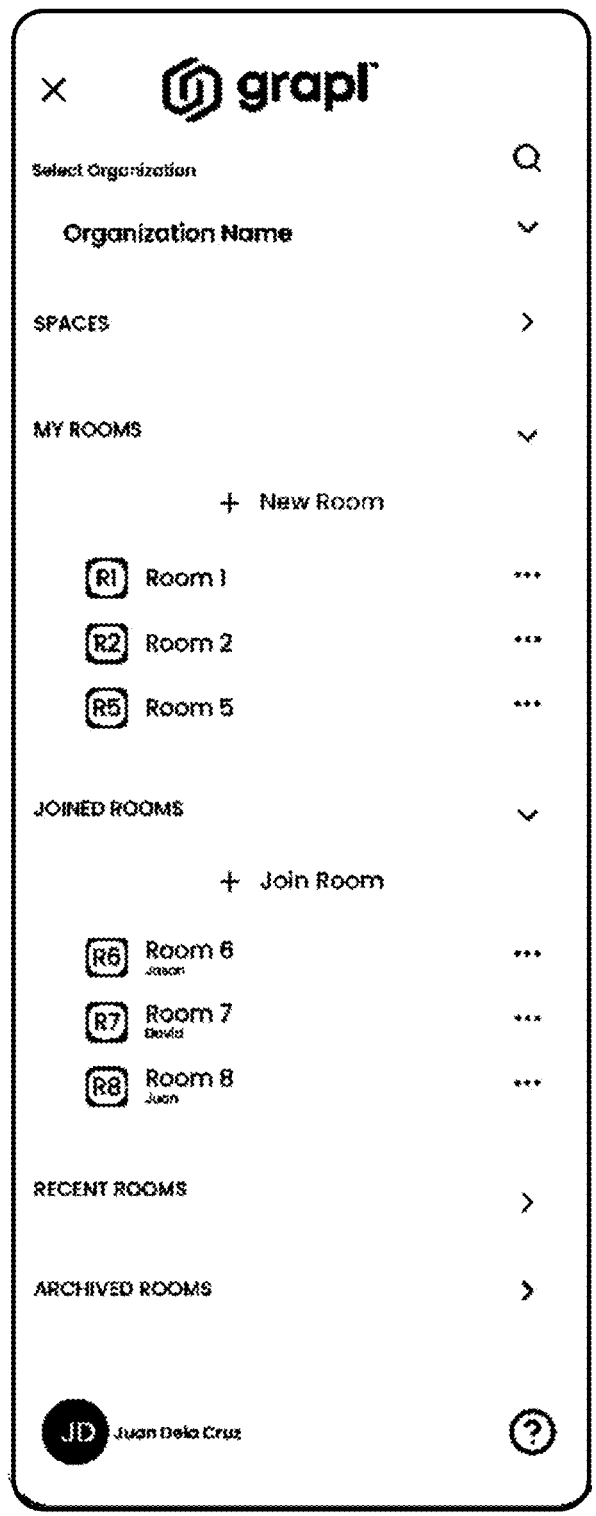

FIGS. 15A-B show the shareable spaces, folders and rooms navigation of the present invention. The present invention allows for enhanced organization of workflow through the implementation of rooms and spaces interfaces, in order to keep track of relationships as well as recording, transcribing and time travel. FIG. 15A shows the spaces sidebar interface of the present invention. FIG. 15B shows the rooms sidebar interface of the present invention.

Figure 16A:
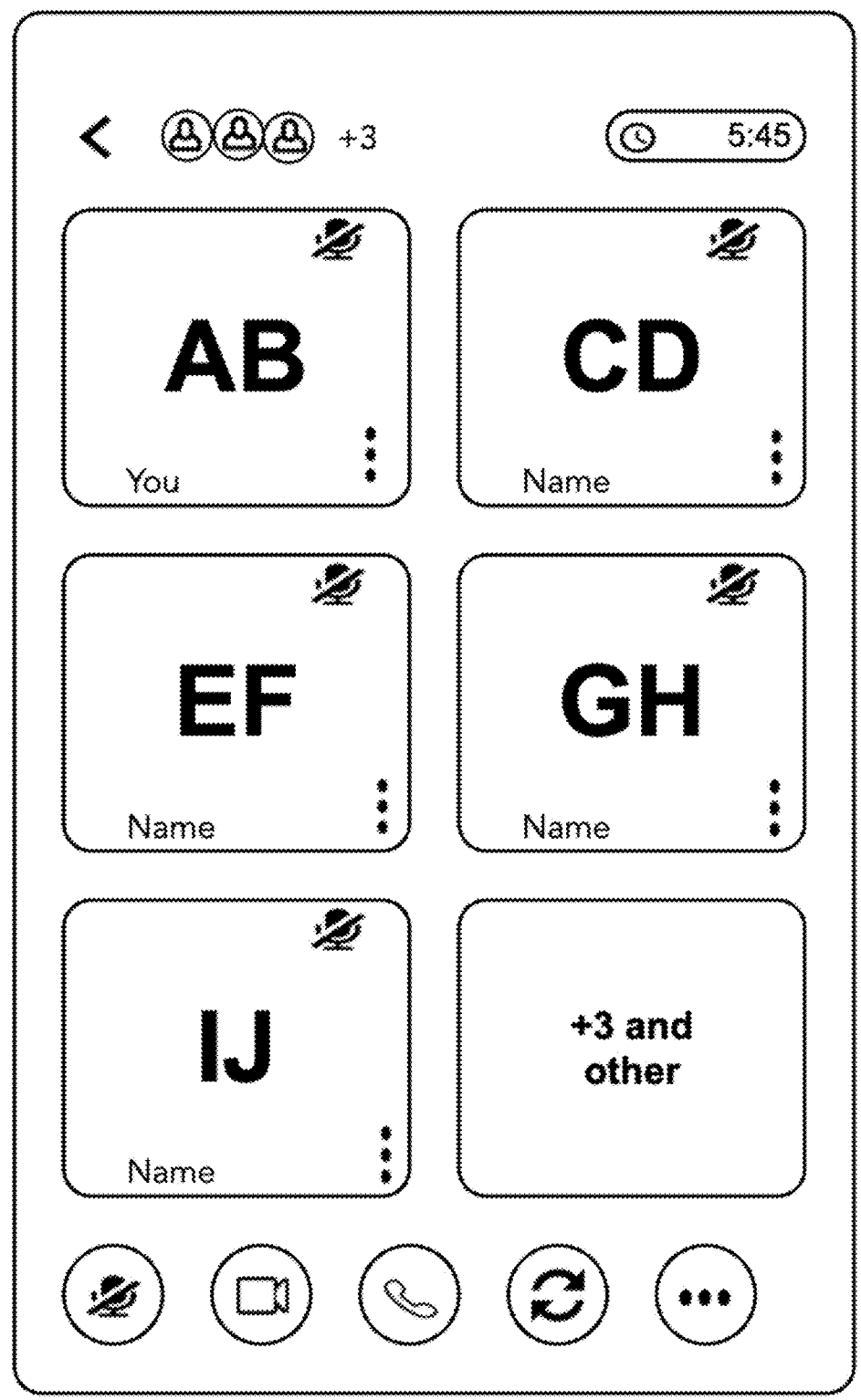
FIGS. 16A-G show the mobile application of the present invention.
Figure 16B:
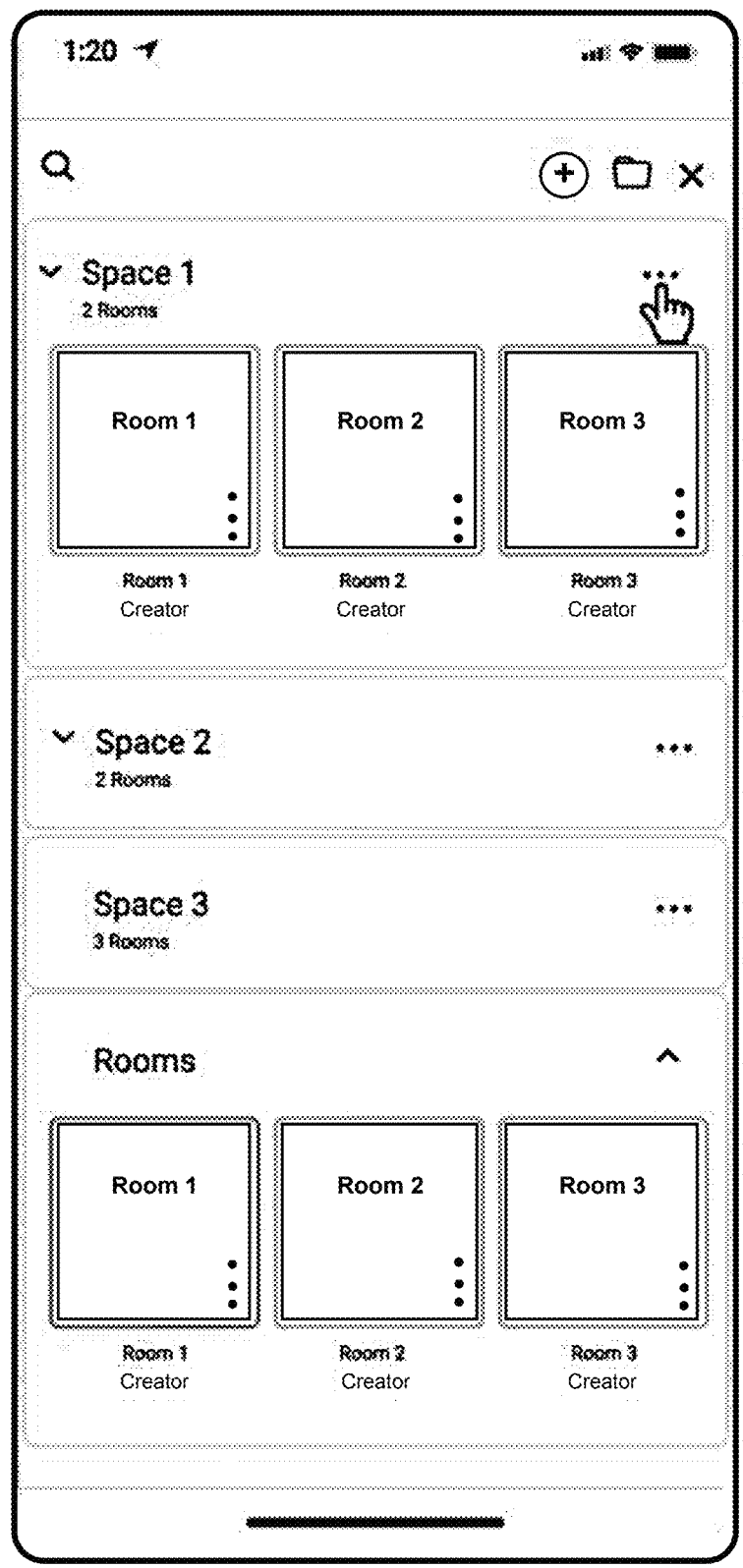
Figure 16C:
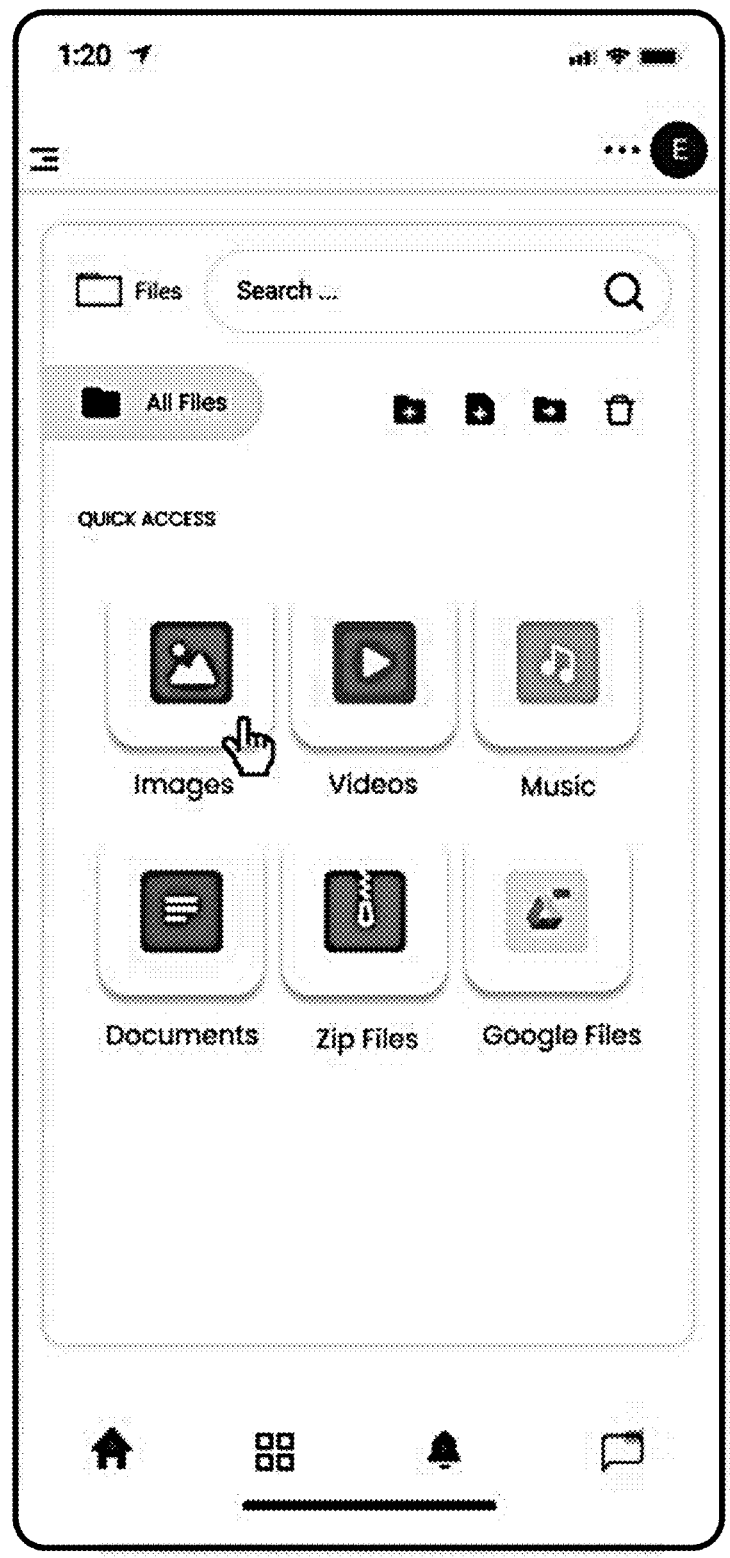
Figure 16D:
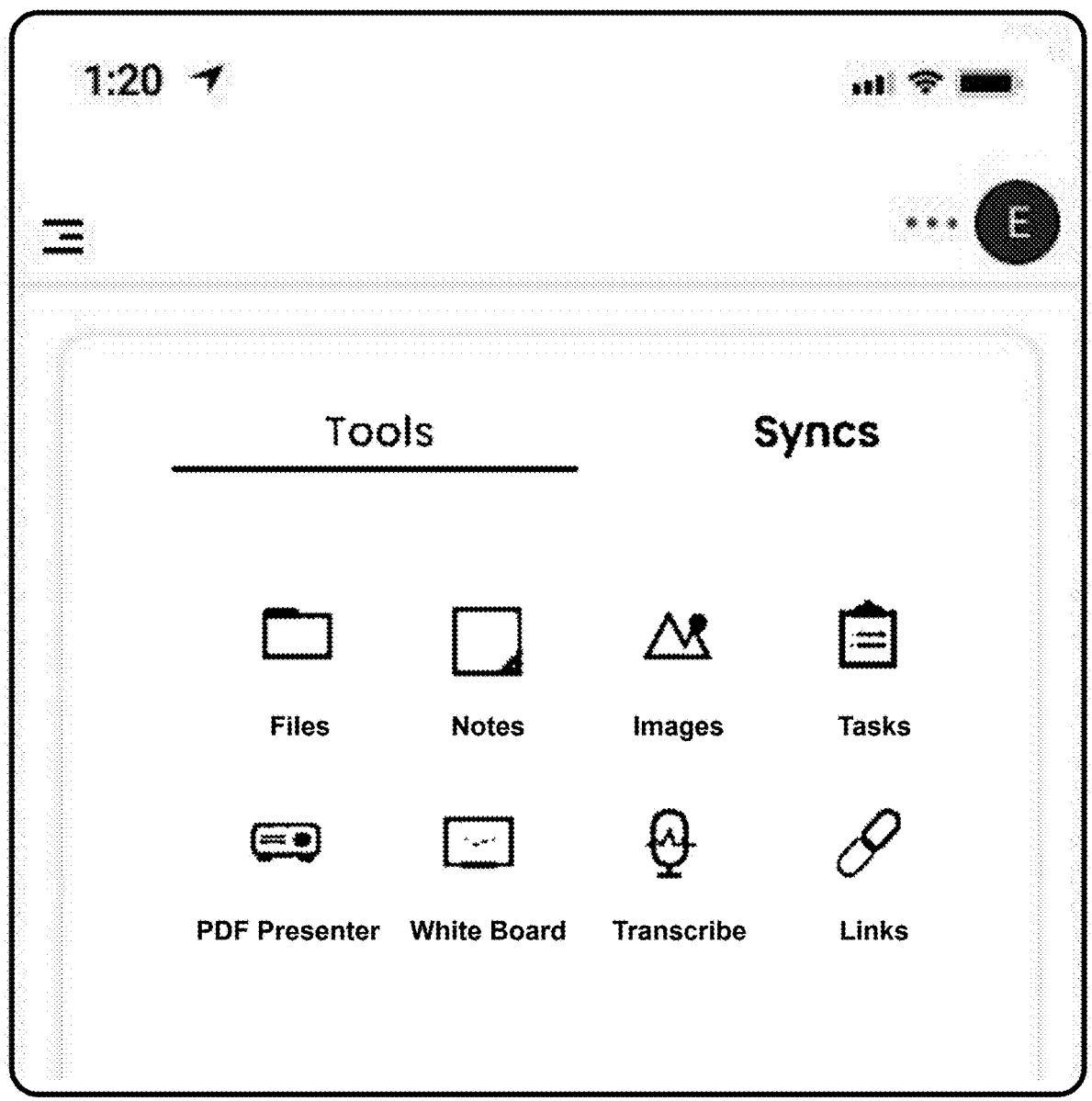
Figure 16E:
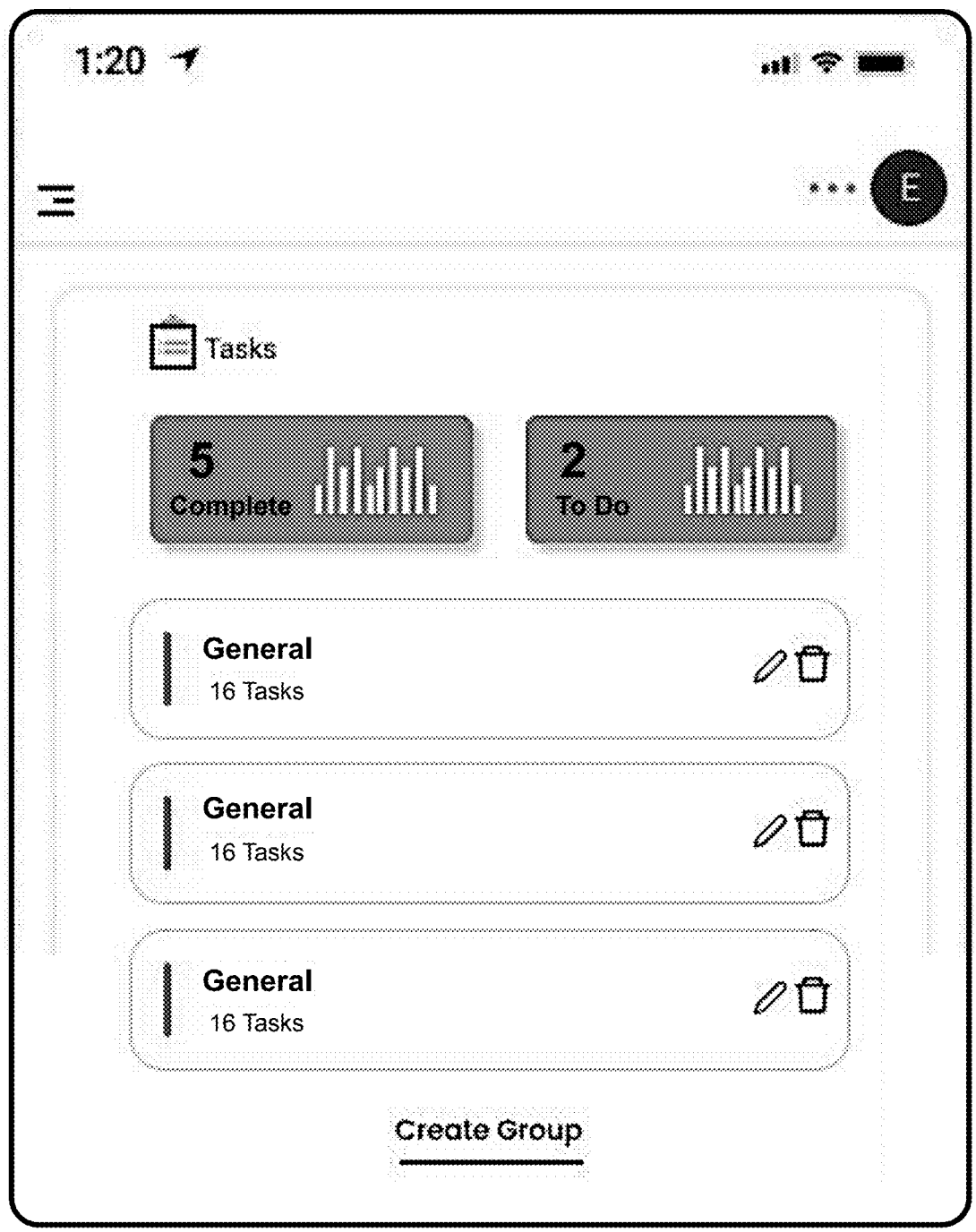
Figure 16F:
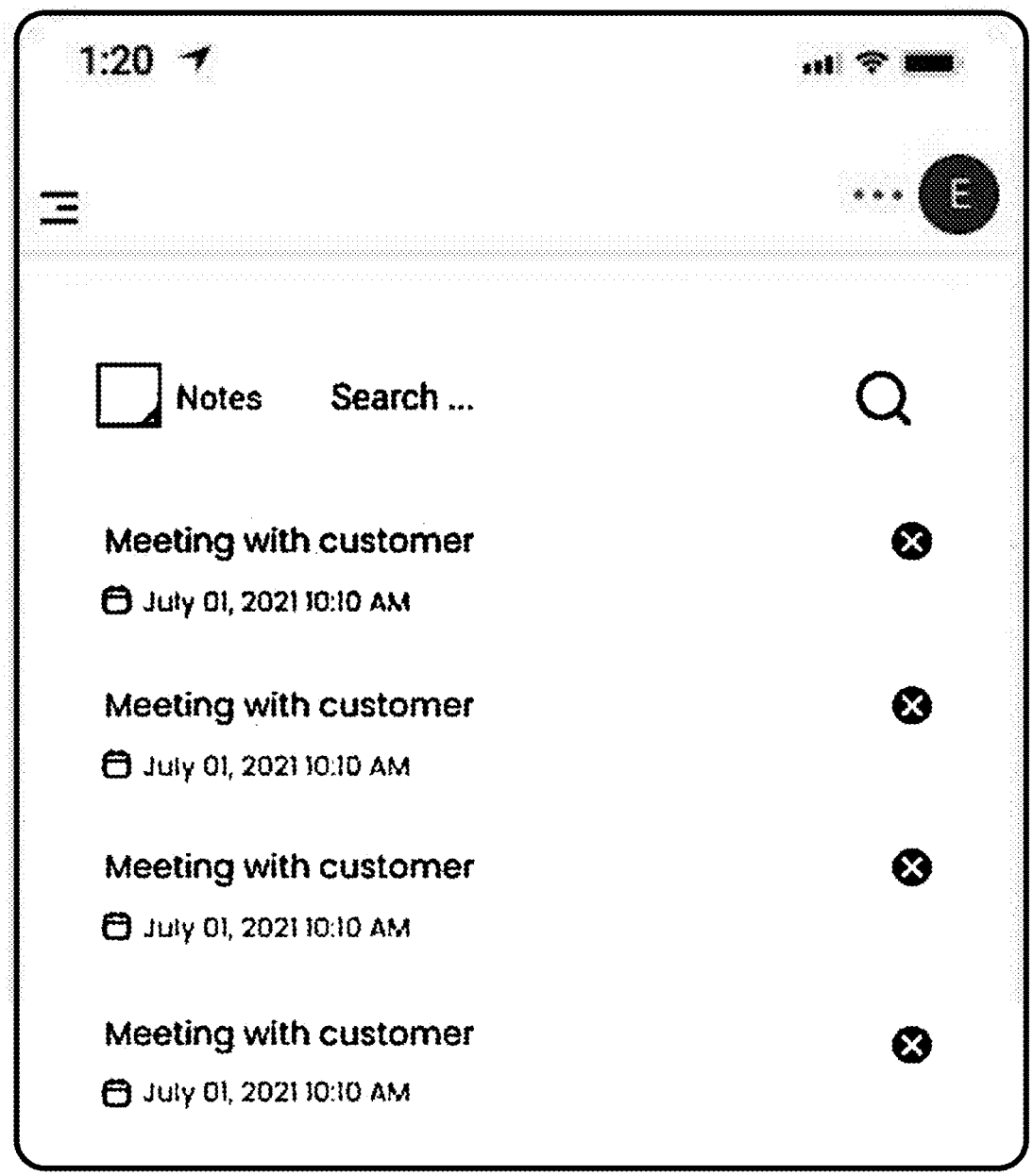
Figure 16G:
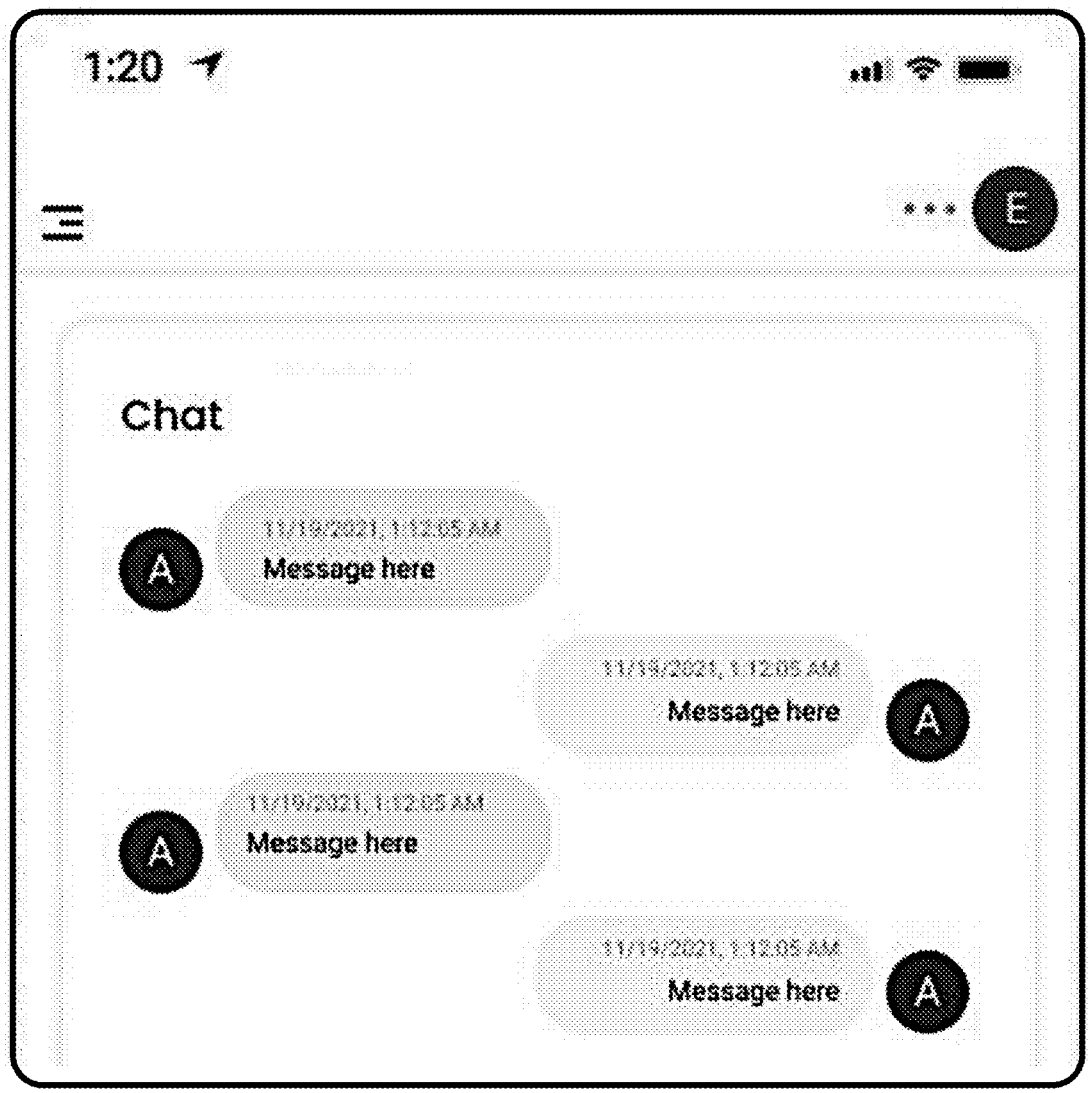

FIGS. 16A-G show the mobile application of the present invention. The user mobile application integrates to the user account to provide multi-platform synchronization across all devices. FIG. 16A shows the mobile meeting interface of the present invention. FIG. 16B shows the rooms and spaces interface of the present invention. FIG. 16C shows the user account file repository of the present invention. FIG. 16D shows the user syncs and tools interface of the present invention. FIG. 16E shows the user tasks tool of the present invention. FIG. 16F shows the user notes tool of the present invention. FIG. 16G shows the chat tool of the present invention, to allow for seamless communication between users.

Figure 17A:
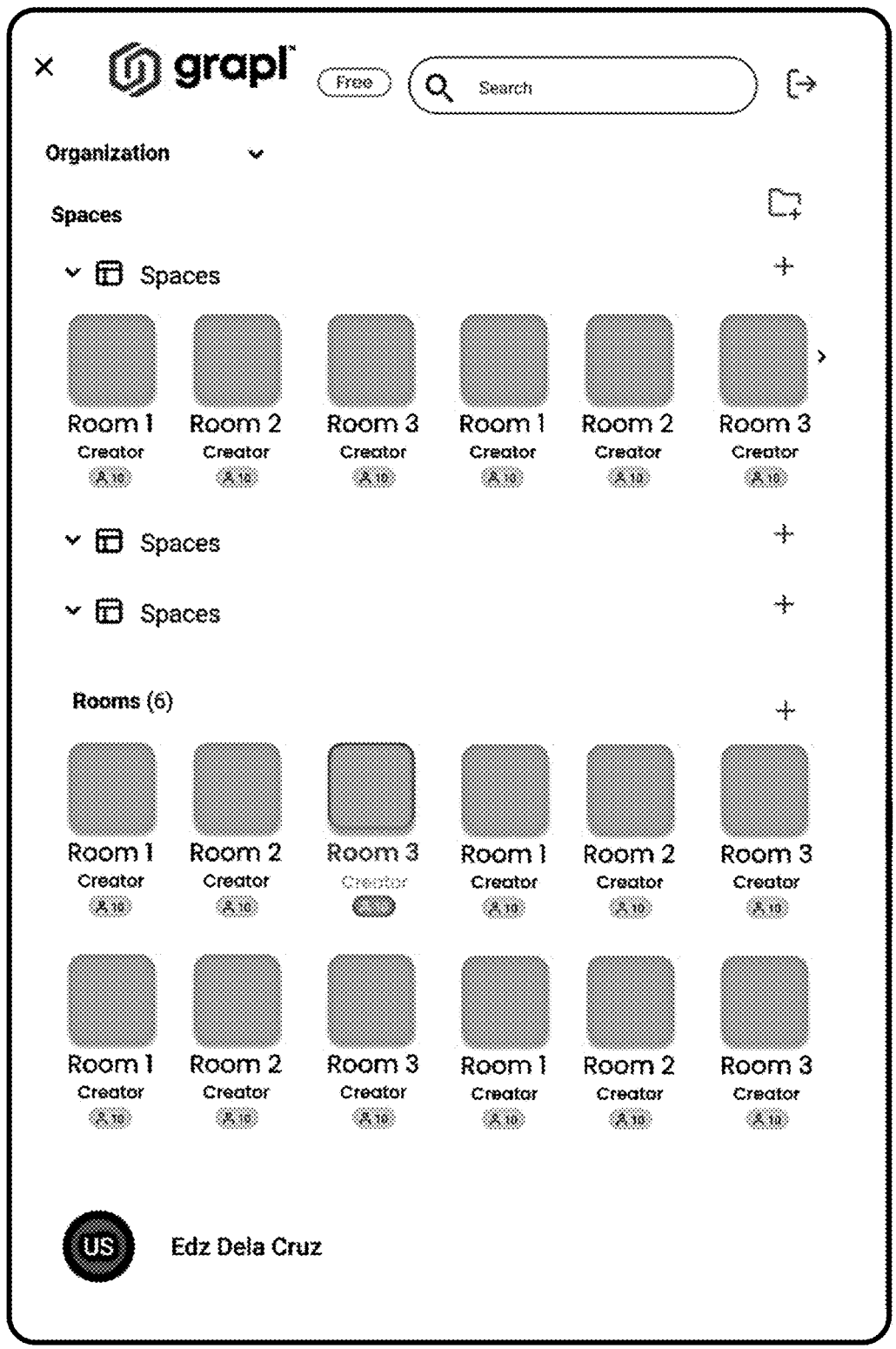
FIGS. 17A-F show the tools, syncs and integrations of the present invention.
Figure 17B:
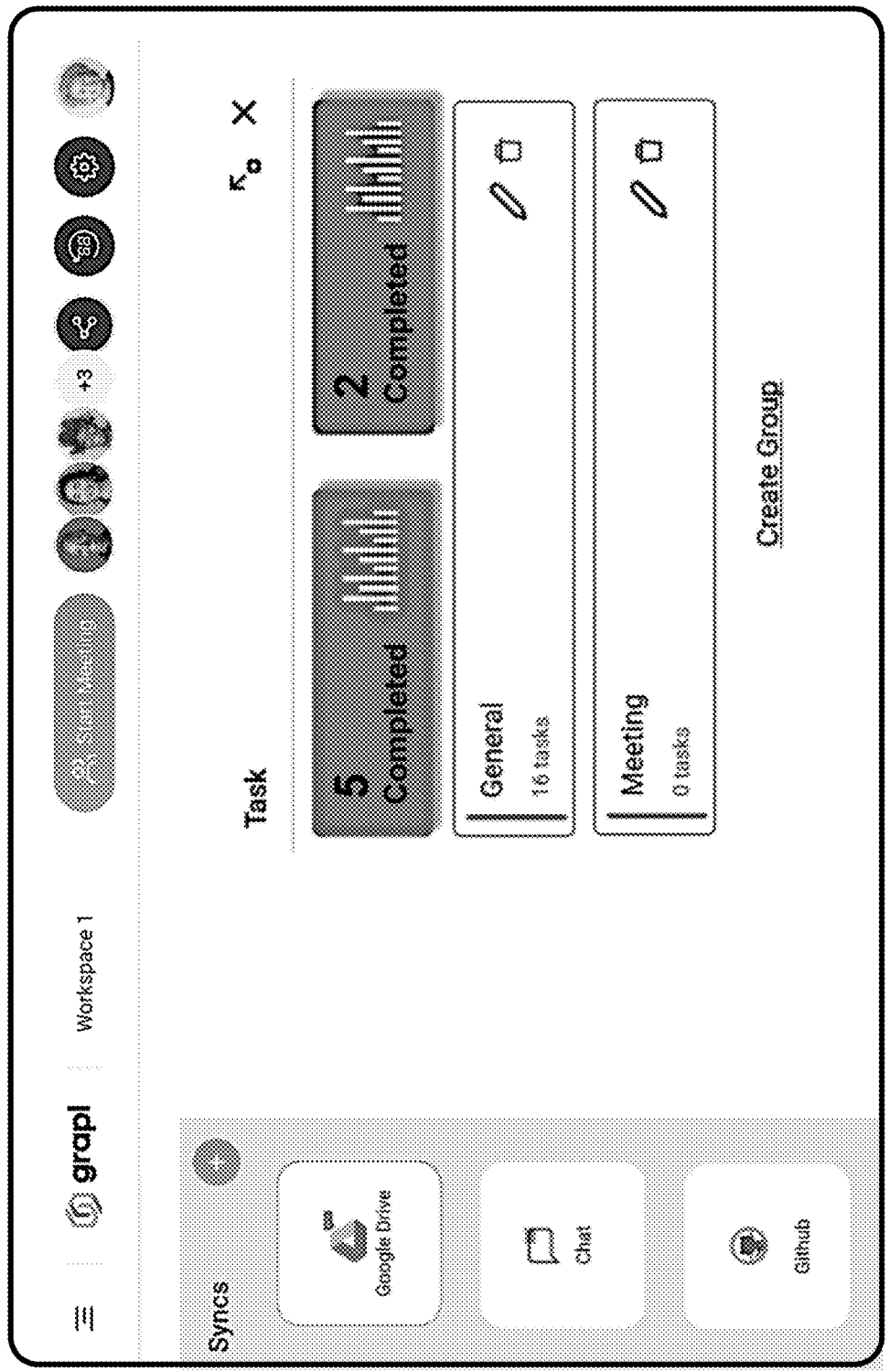
Figure 17C:
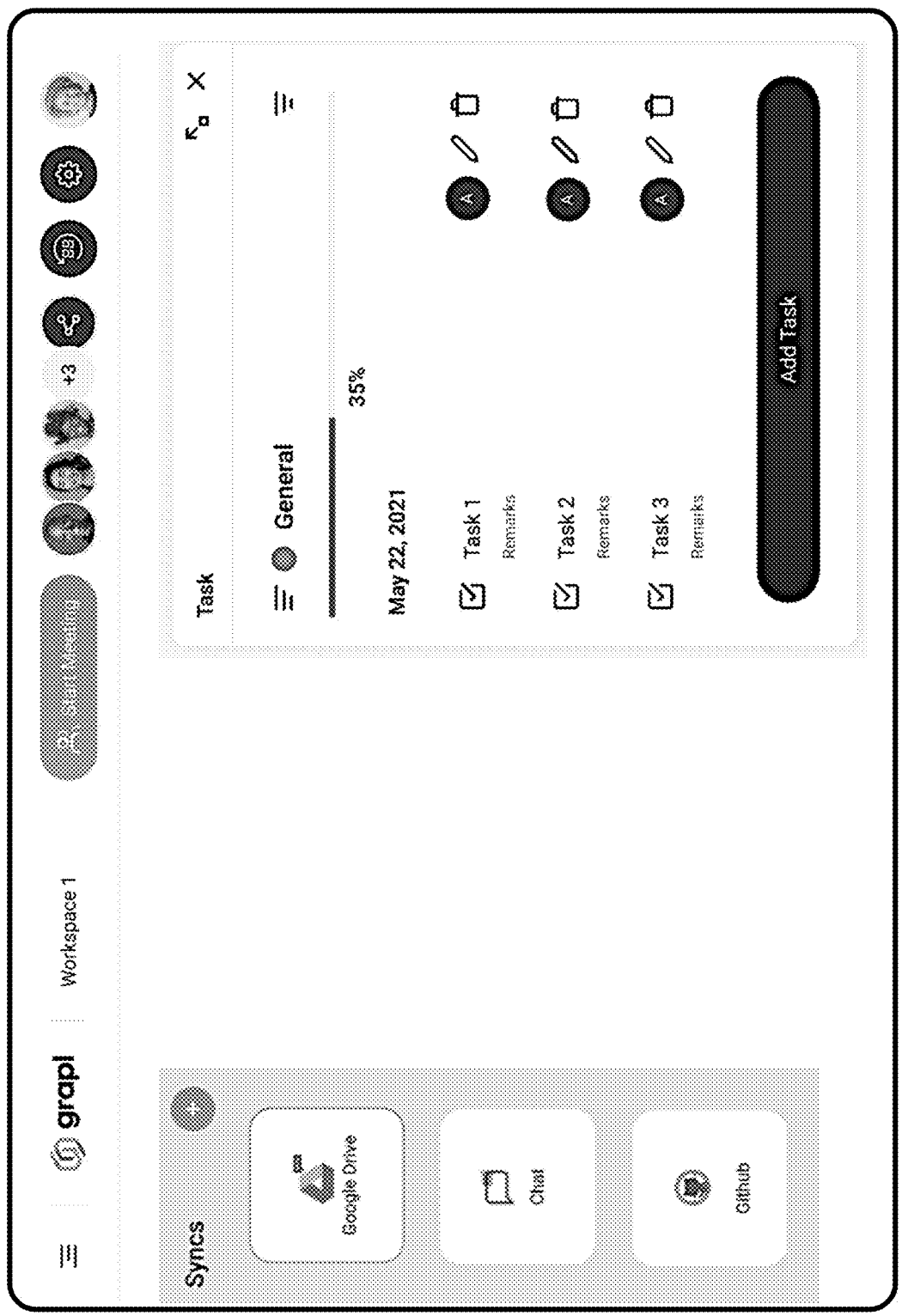
Figure 17D:
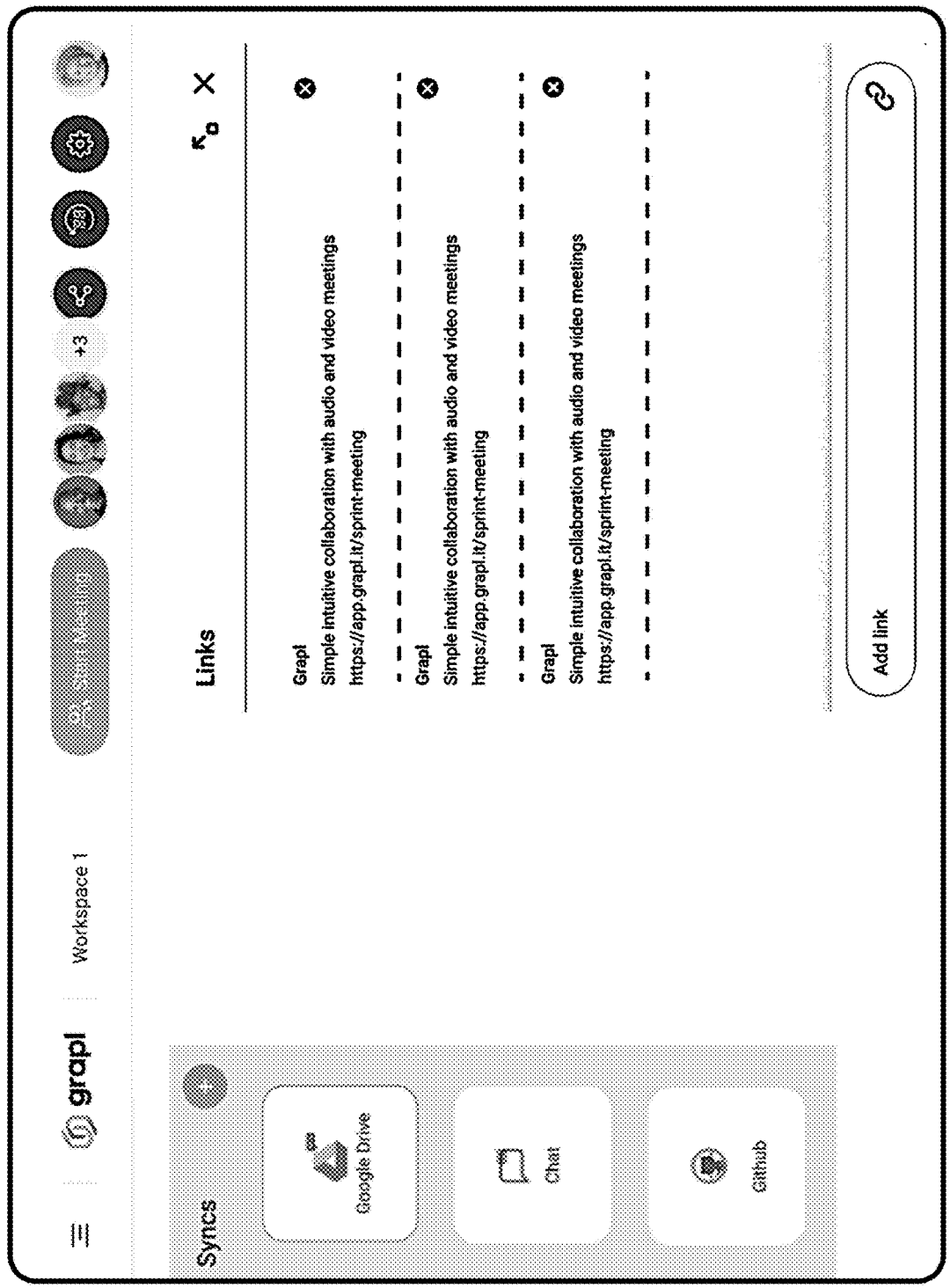
Figure 17E:
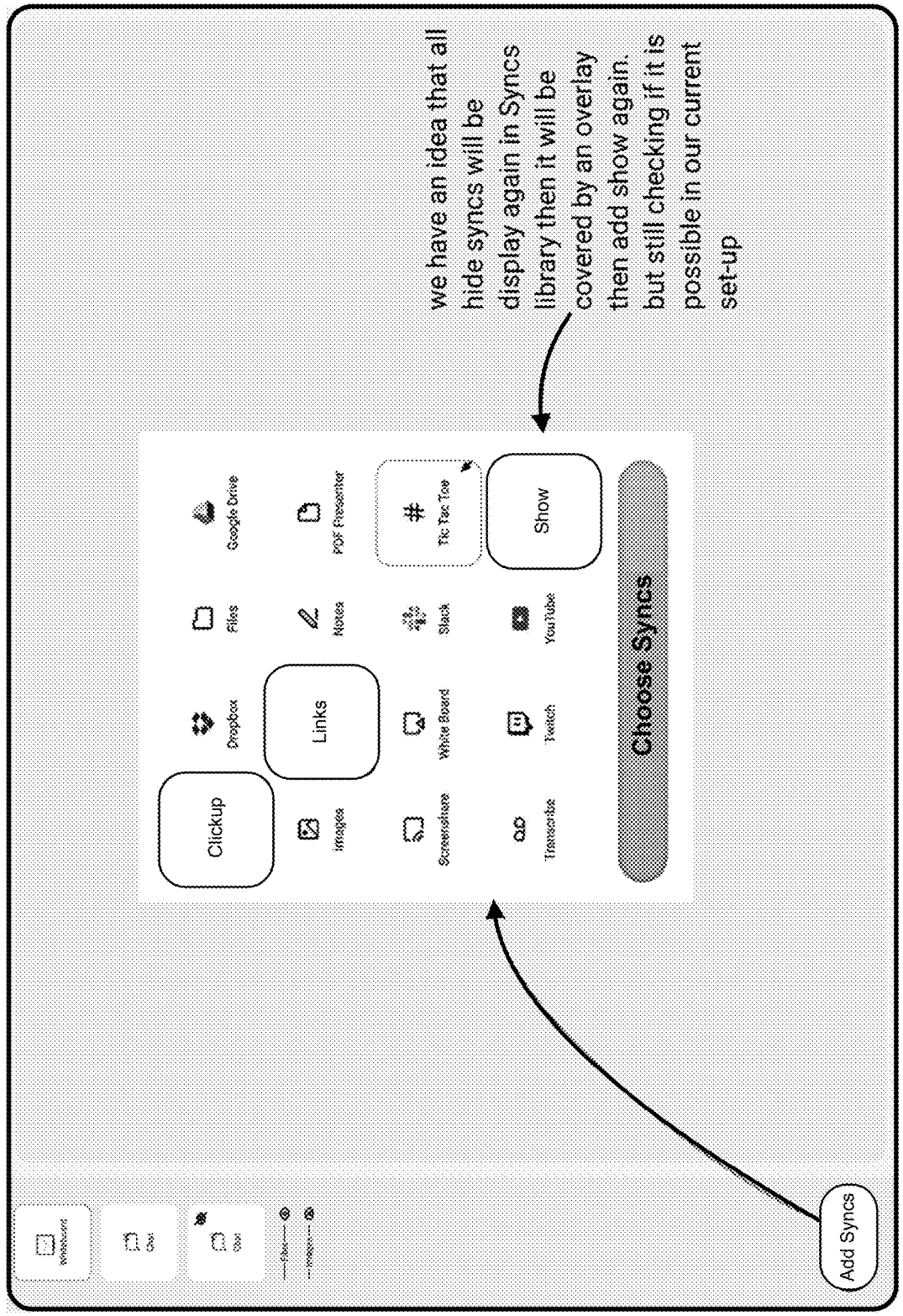
Figure 17F:

FIGS. 17A-F show the tools, syncs and integrations of the present invention. FIG. 17A shows an overview of the user tools interface, including user rooms and spaces. FIG. 17B shows the user group task integration tool of the present invention. FIG. 17C shows the user task tool of the present invention. FIG. 17D shows the user links interface of the present invention. FIG. 17E shows the syncs tool of the present invention. FIG. 17F shows the integrations menu of the present invention.

Figure 18A:
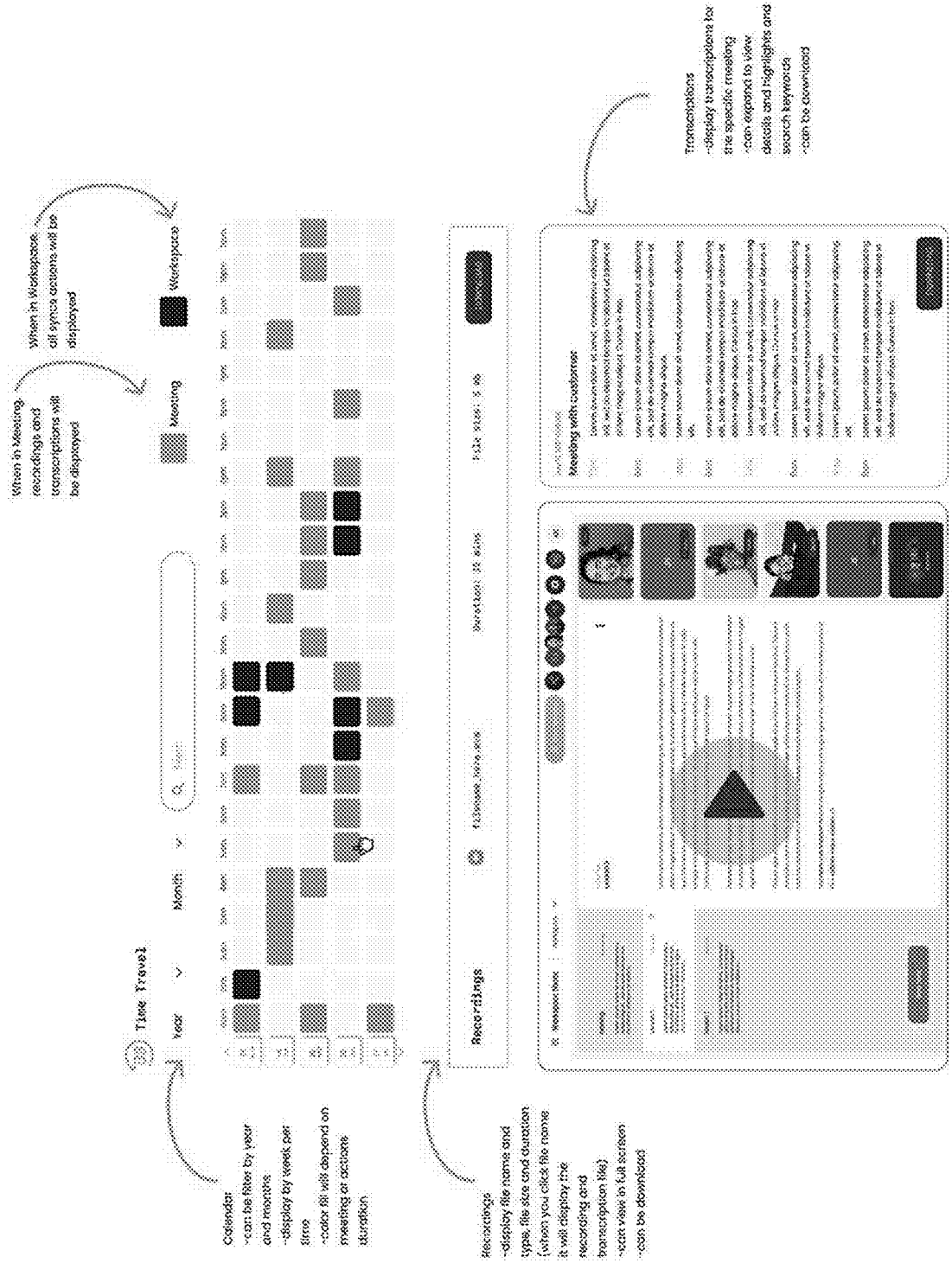
FIGS. 18A-C show the time travel tool of the present invention.
Figure 18B:
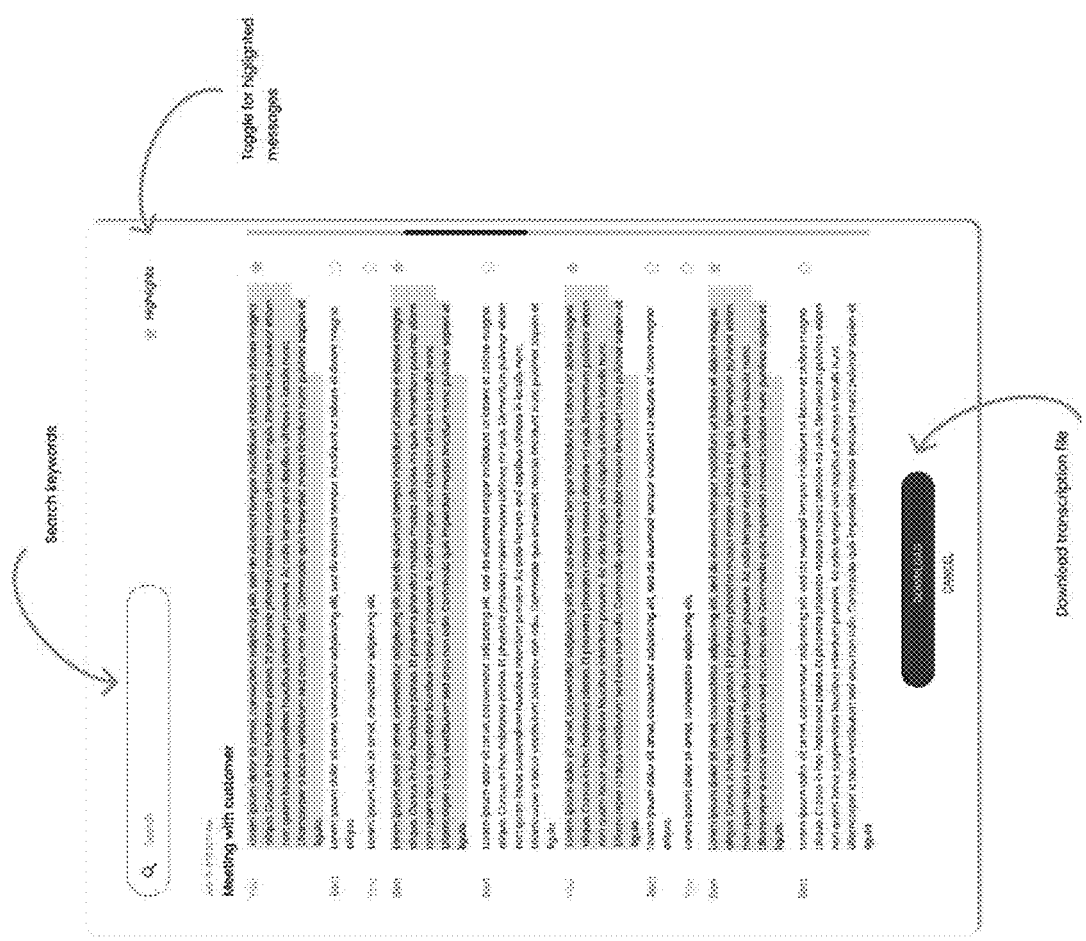
Figure 18B:
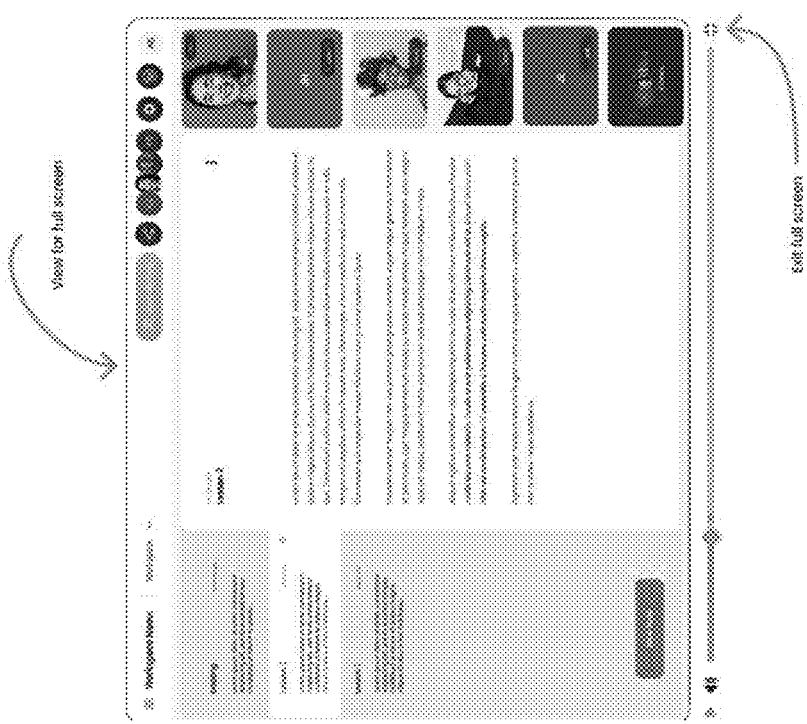
Figure 18C:
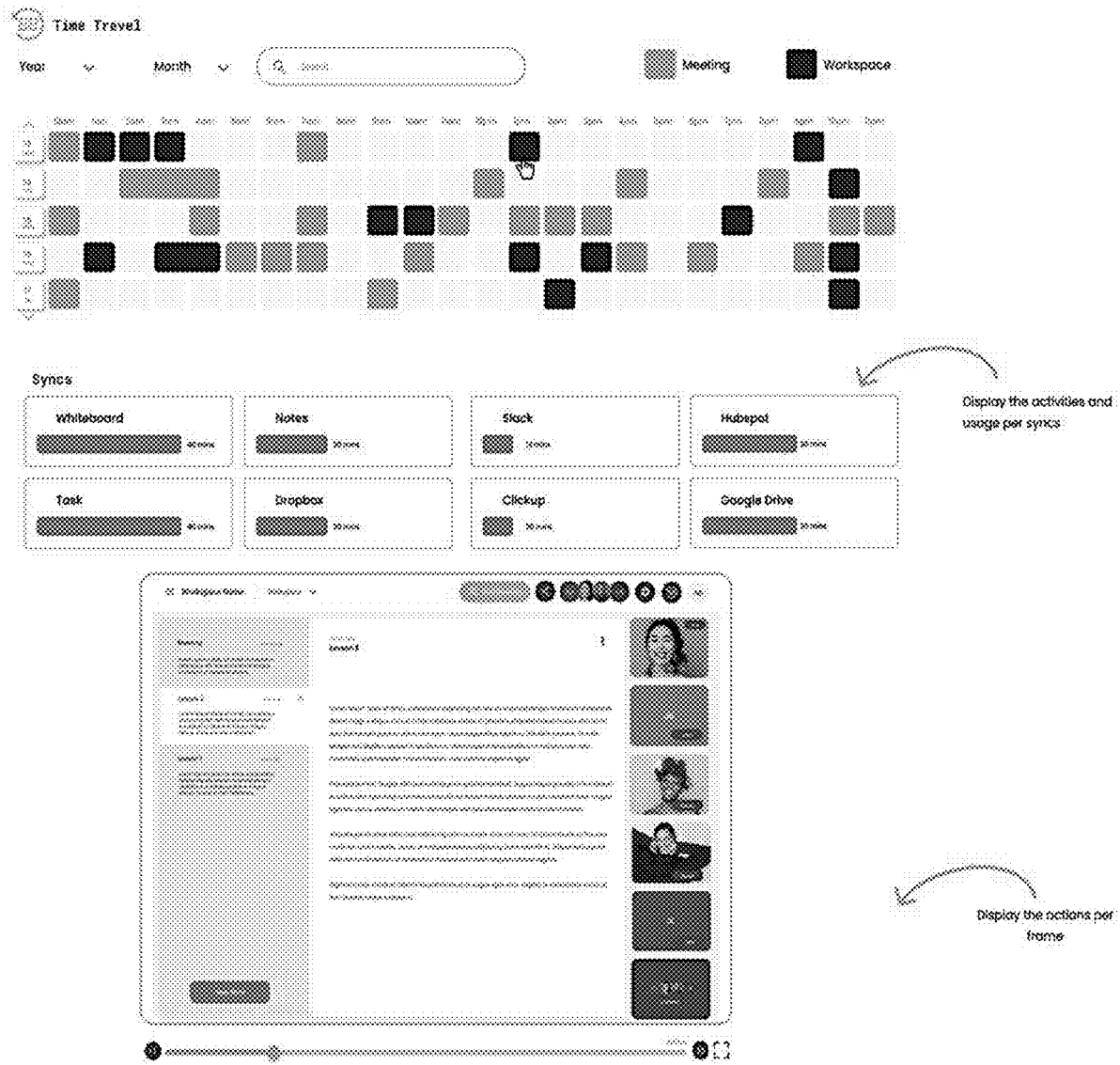

FIGS. 18A-C show the time travel tool of the present invention. FIG. 18A shows the time travel tools applicable to the calendar, recordings, meetings, and transcriptions. FIG. 18B shows the optional screen view, keyword search, and transcription file download. FIG. 18C shows the activities and usage for each sync, as well as actions per frame.

Figure 19:
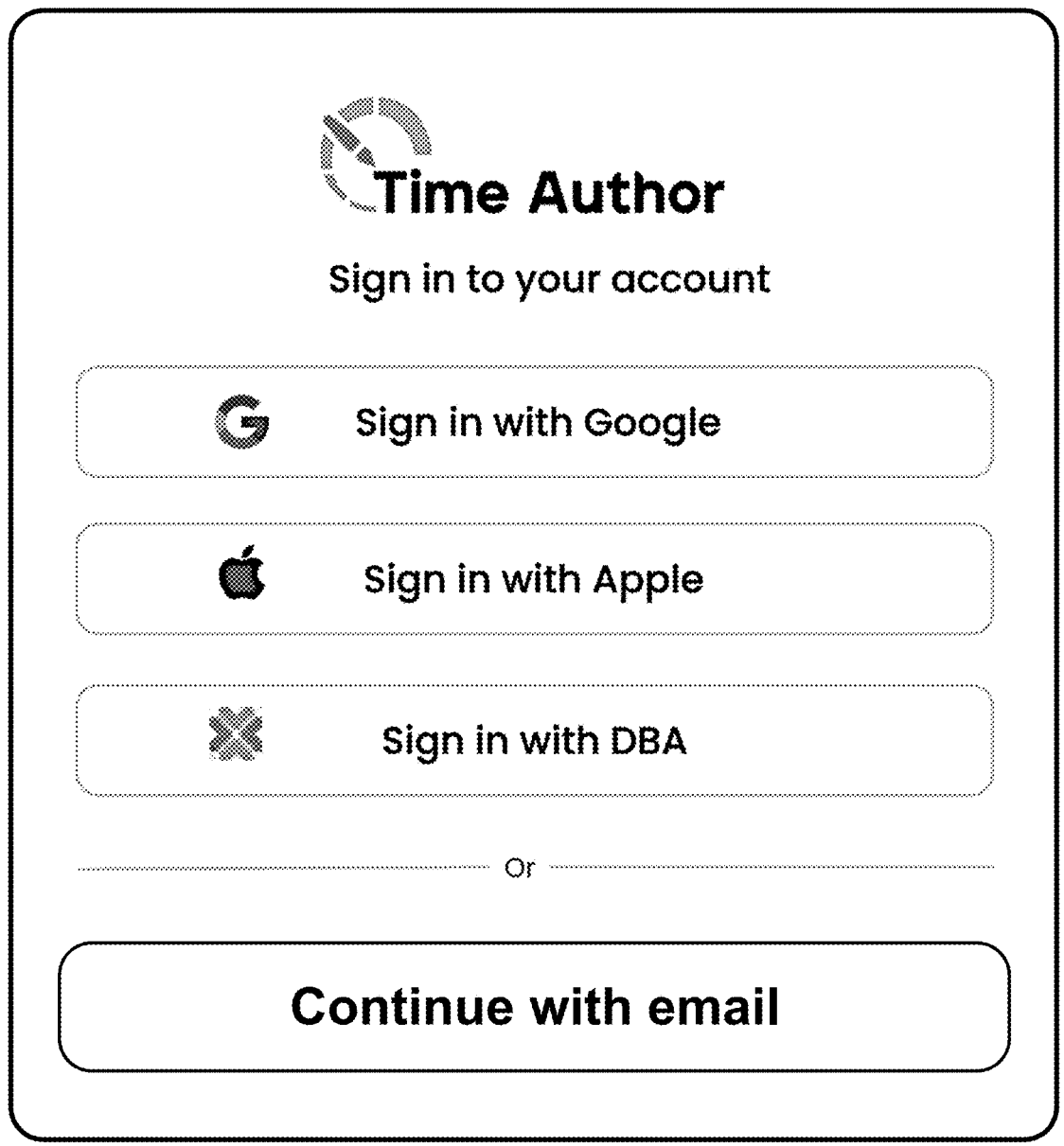
FIG. 19 shows the initial login and account creation options of the present invention.

FIG. 19 shows the initial login and account creation options of the present invention. The user is able to sign into their account using an email, apple account ID, or organization details (DBA). The user also has the option to create an account by signing up with an email address.

Figure 20A:
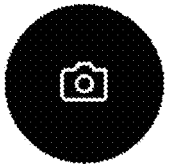
Figure 20B:
Figure 20C:
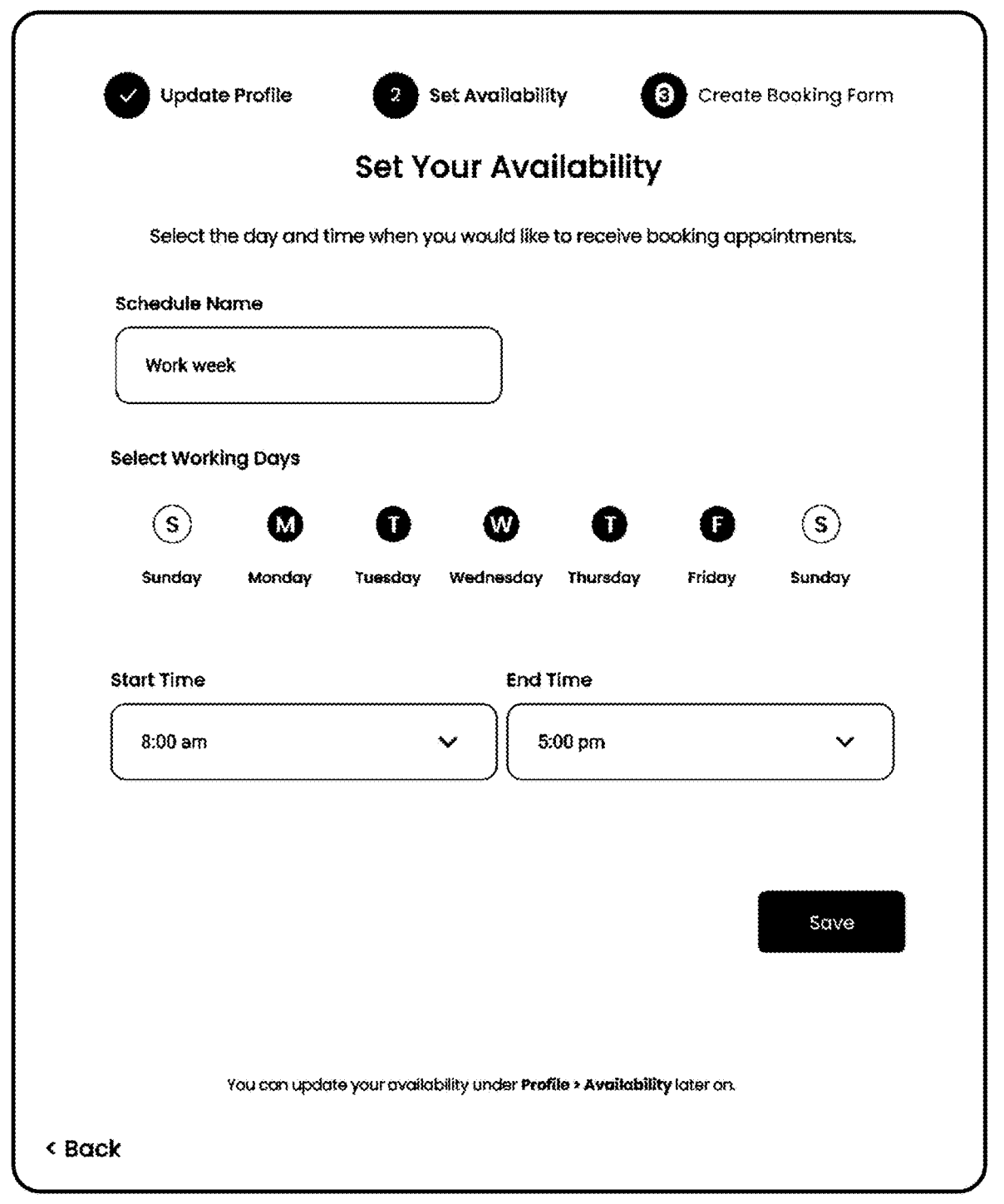
Figure 20D:
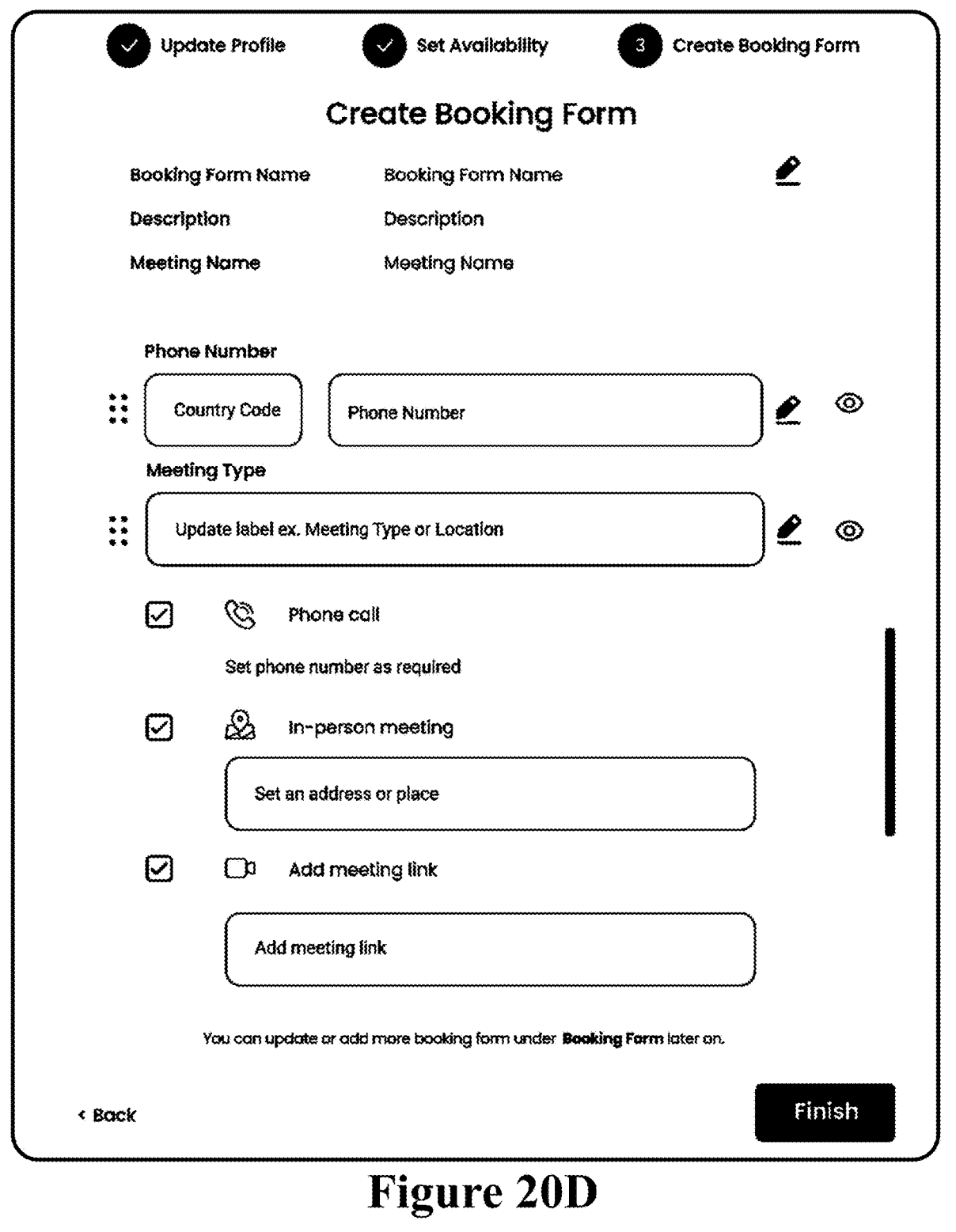

FIGS. 20A-D show the user onboarding process of the present invention. FIG. 20A shows the user profile update and management interface. FIG. 20B shows the user availability overview. FIG. 20C shows the user availability settings and editing interface. FIG. 20D shows the meeting booking form creation interface.

Figure 21A:
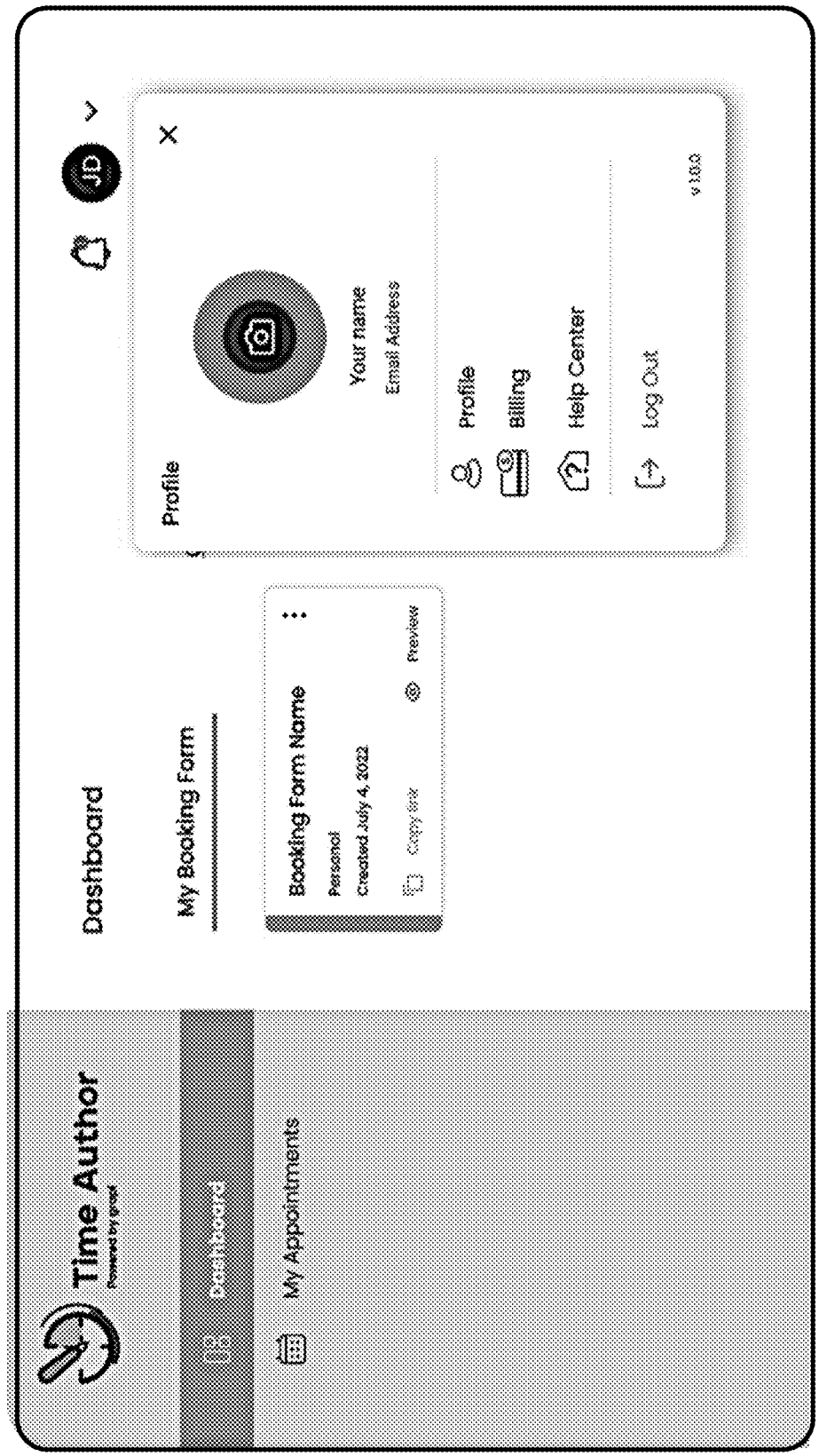
Figure 21B:
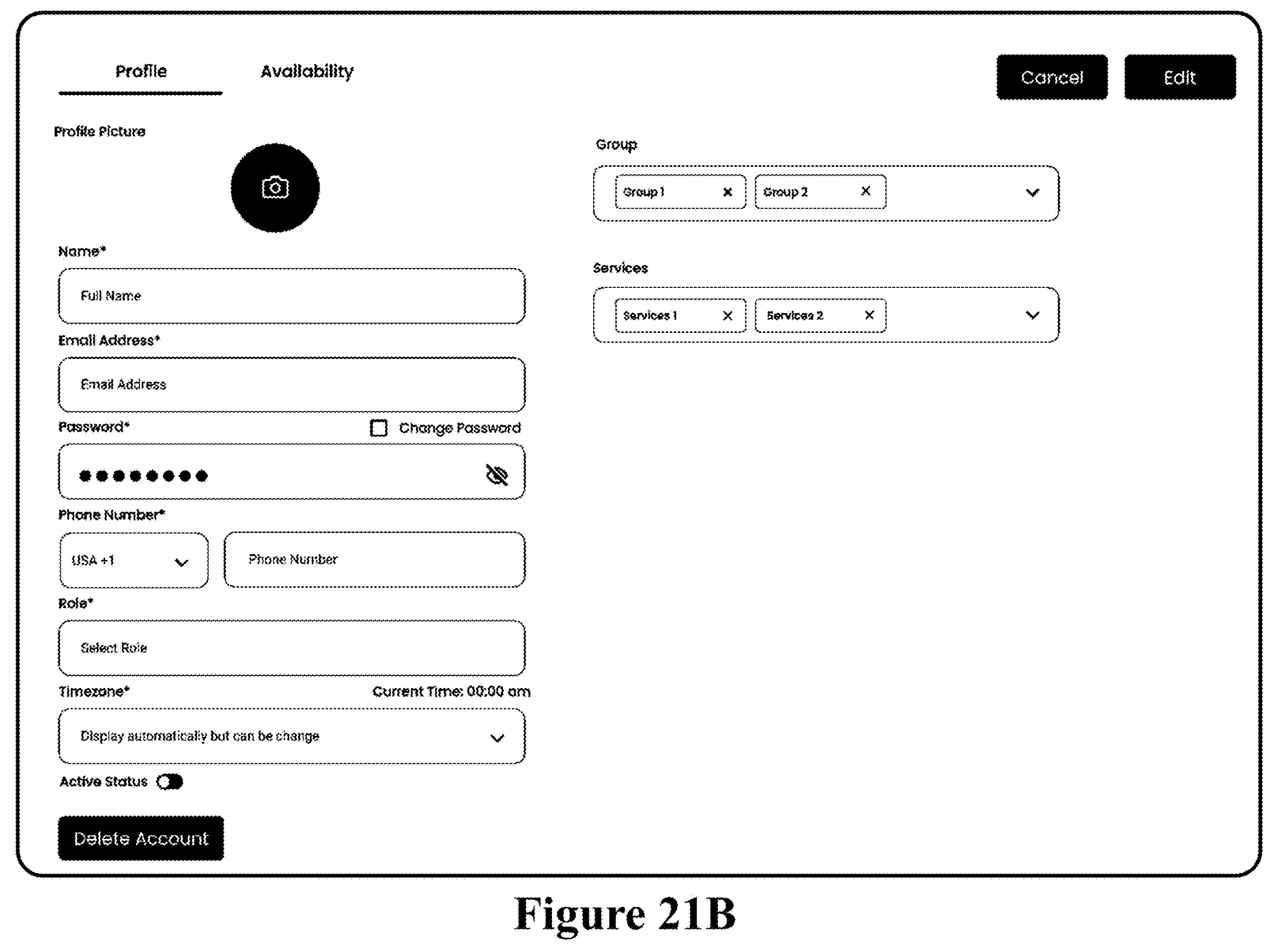

FIGS. 21A-B show the dashboard and user account of the present invention. FIG. 21A shows the user dashboard overview. FIG. 21B shows the user profile account editor interface, with the ability to update personal information, role, time zone, user groups and services data.

Figure 22A:
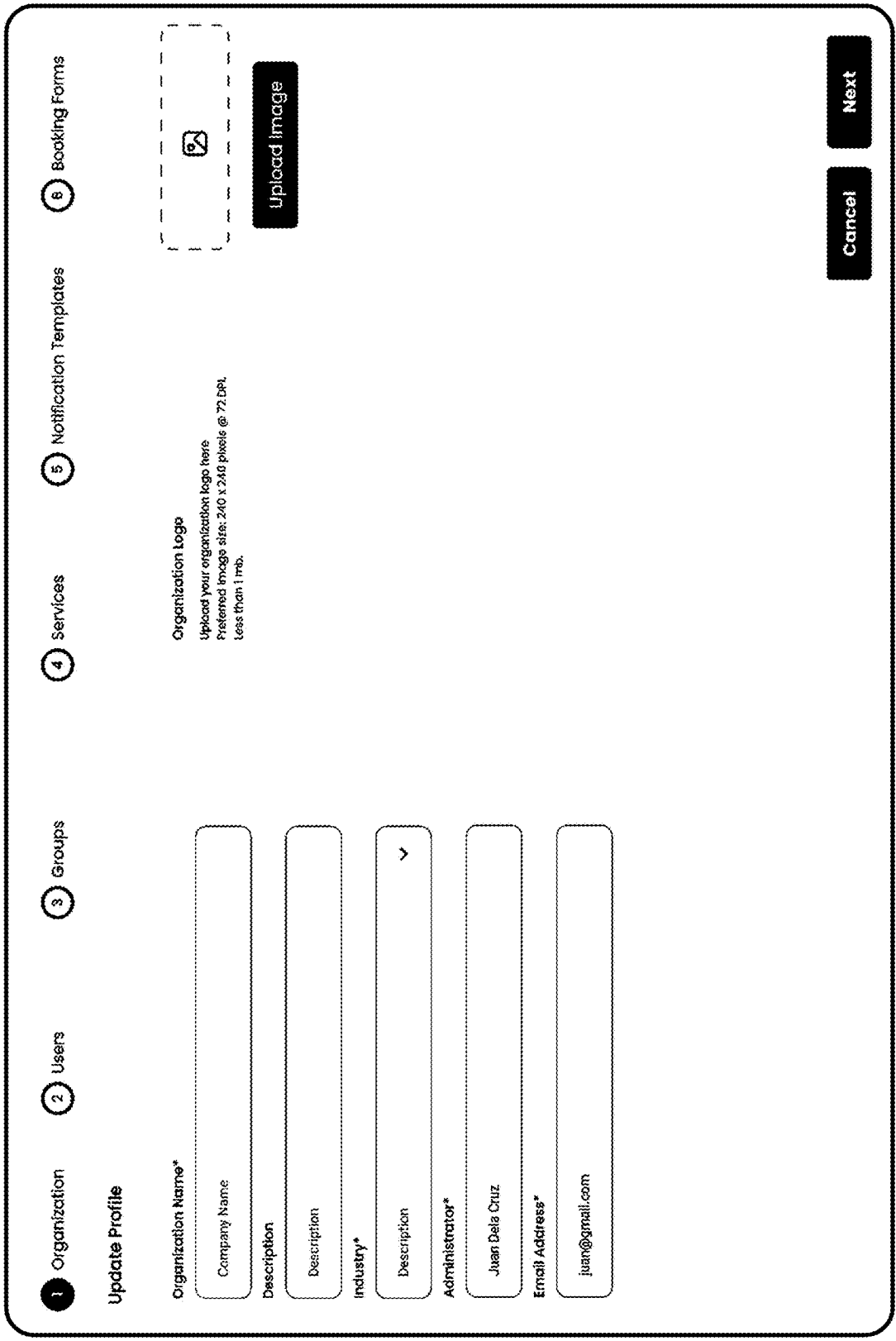
Figure 22C:
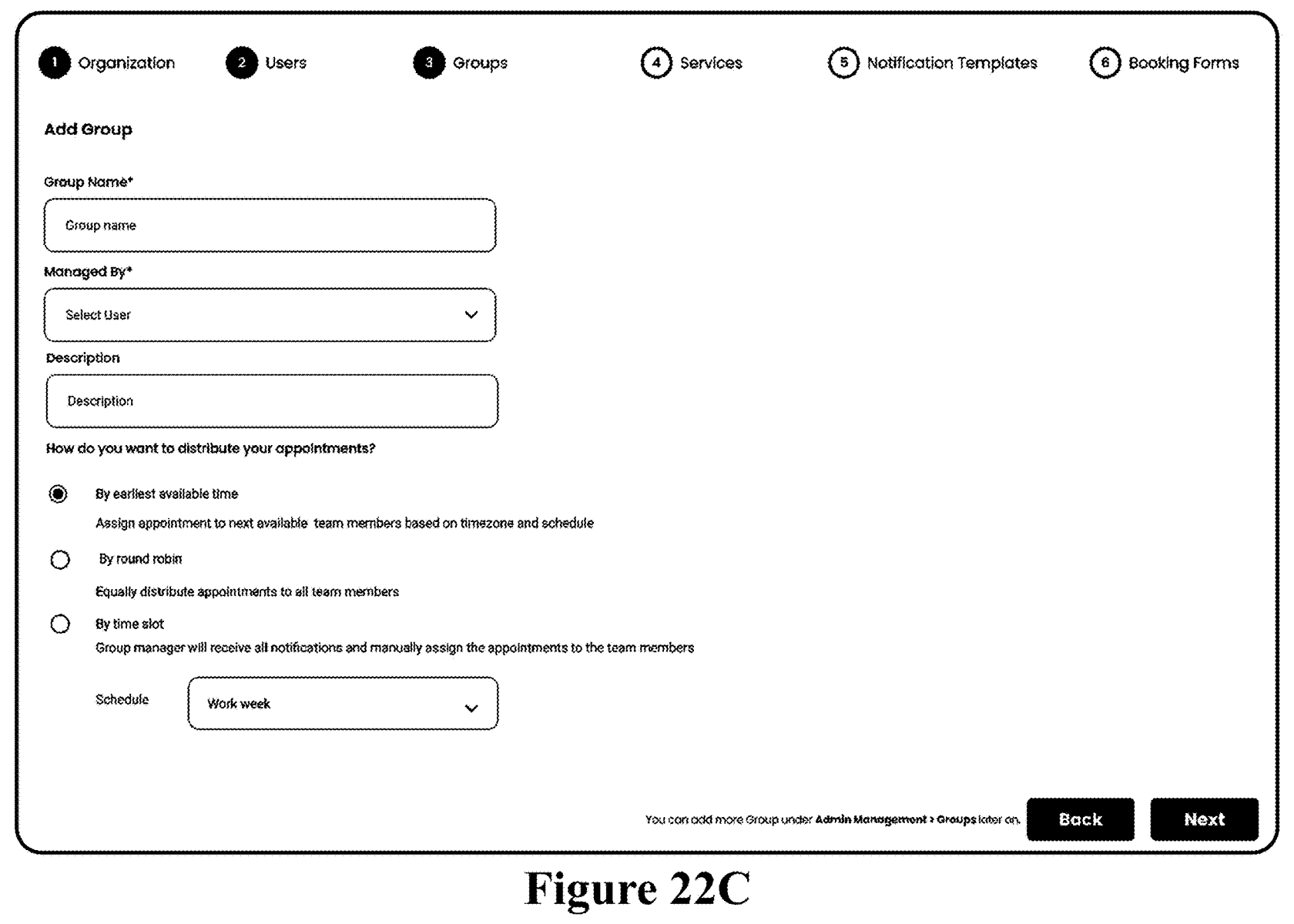
Figure 22D:
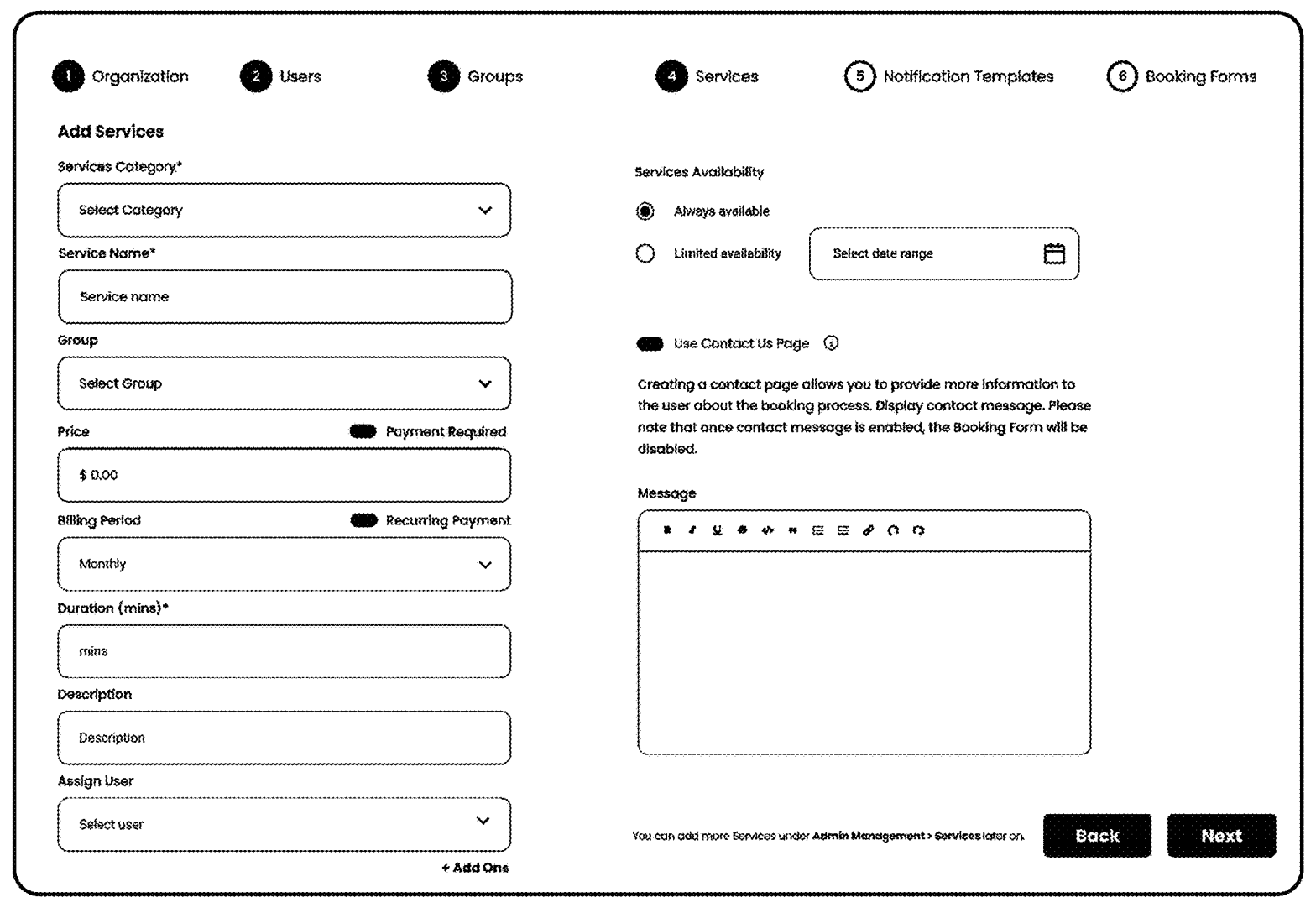

FIGS. 22A-D show the organization management interface of the present invention. FIG. 22A shows the organization data update interface. FIG. 22B shows the new user interface, allowing for new user data to be entered at the organization's management level. FIG. 22C shows the new group interface, allowing for new group data to be entered. In this interface, multiple groups can be created, the booking page placeholder can be updated, managers can be assigned, and time slots and appointments can be edited and managed. FIG. 22D shows the new services interface, allowing for new services data to be entered. In this interface, multiple services can be created, with groups assigned to those services. Multiple users can also be assigned. There are templates available for default service selections. Other features that can be modified within the services interface include billing and payments, durations, date ranges and contacts.

Figure 23A:
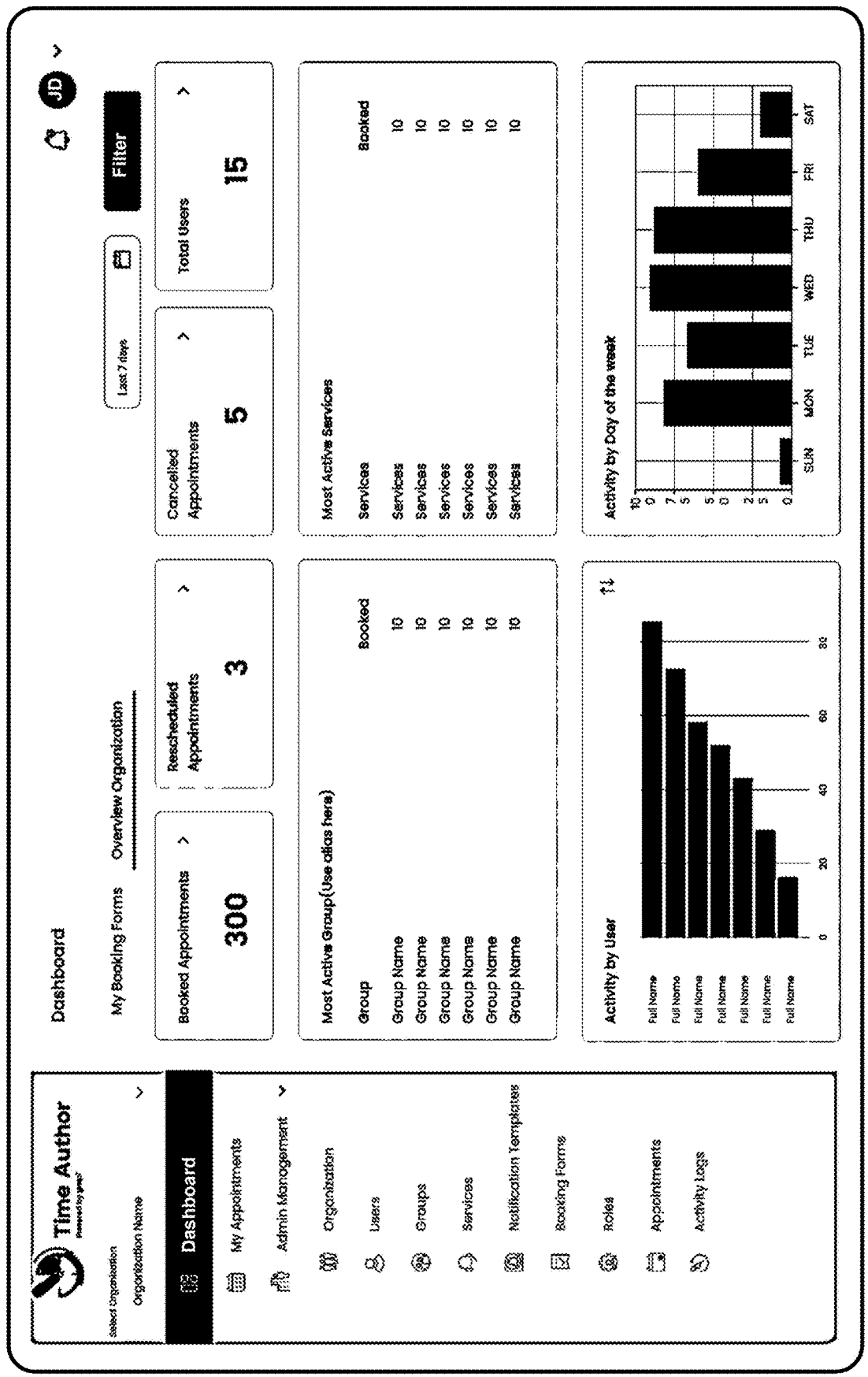
Figure 23B:
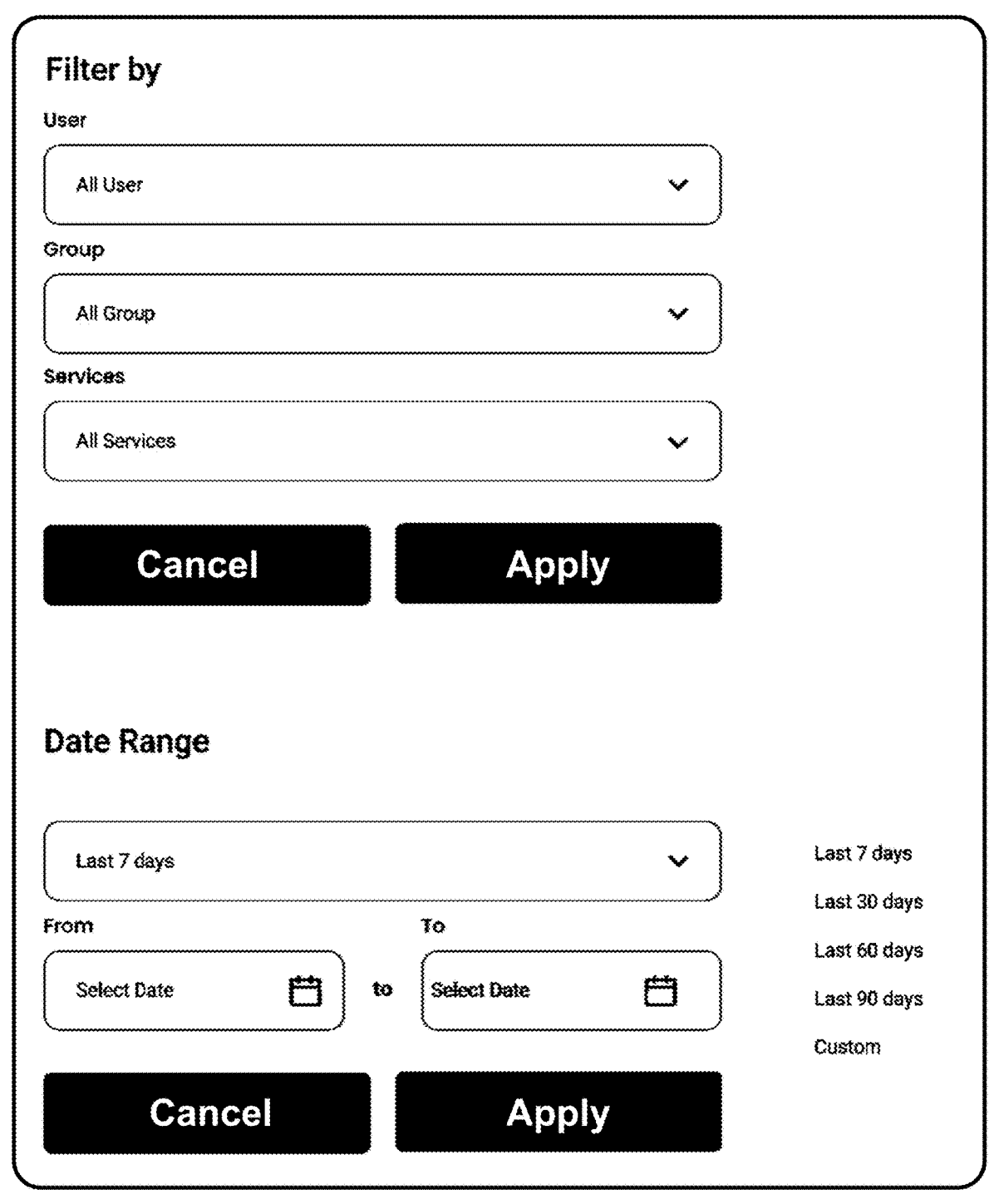

FIGS. 23A-B show the admin management dashboard of the present invention. FIG. 23A shows the admin management dashboard overview. The admin management dashboard allows for control of appointments, organization data, users, groups, services, notification templates, booking forms, roles, appointments, and activity logs. FIG. 23B shows the admin search and filter interface, as well as the date range filter. The admin is able to search by suer, group, or services from within the dashboard.

Figure 24A:
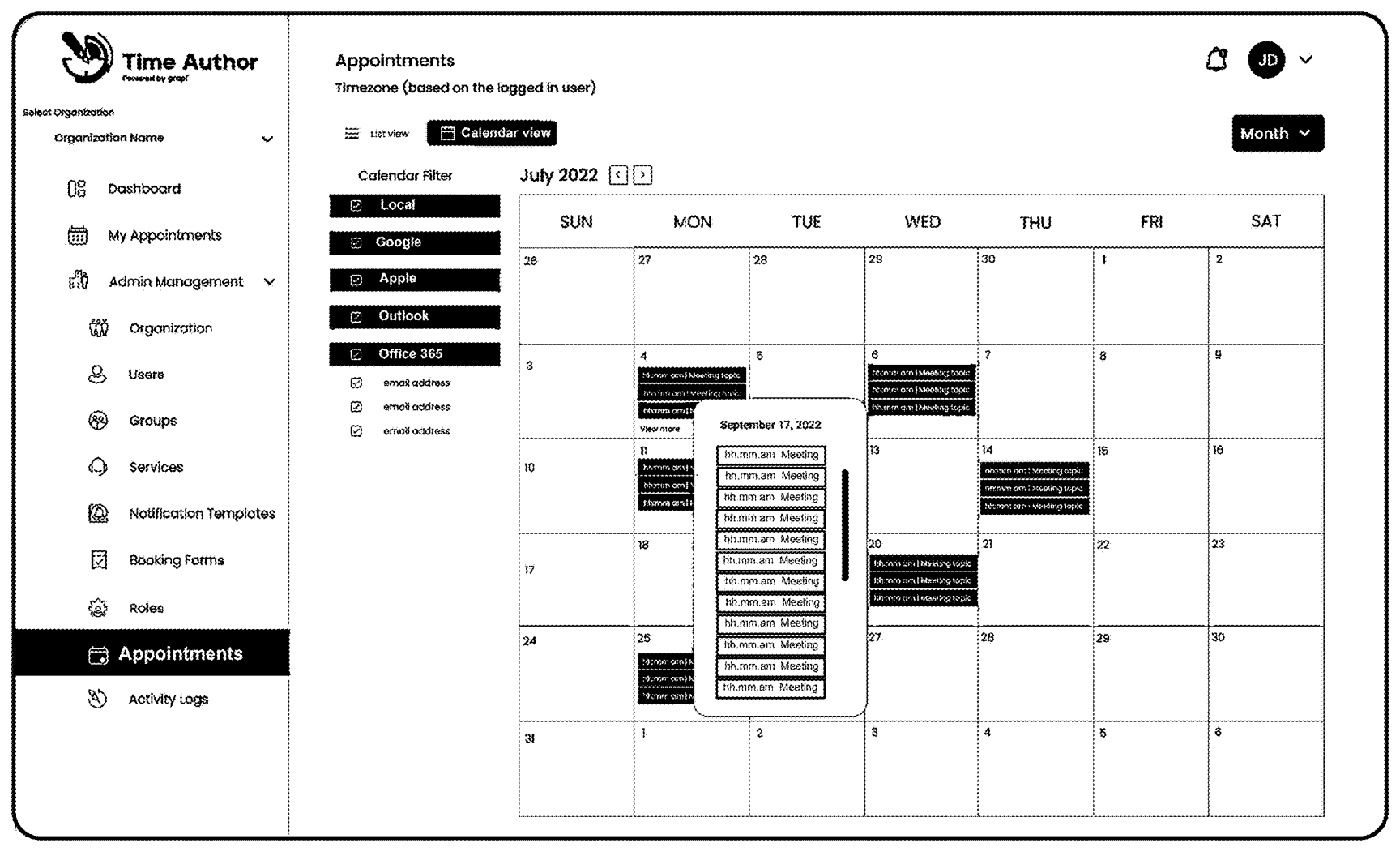
Figure 24B:
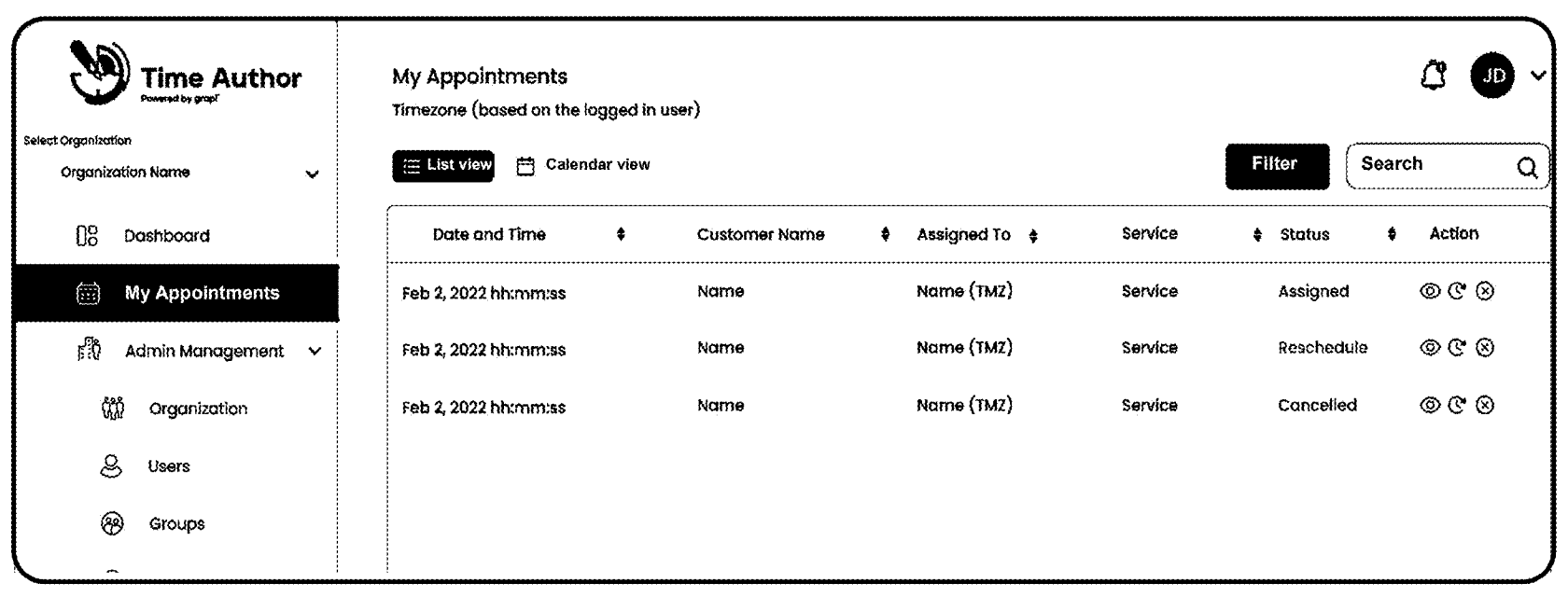

FIGS. 24A-D show the admin management appointments calendar interface of the present invention. FIG. 24A shows the overall appointments calendar view, with the ability to differentiate between all synced calendars by way of color coding. Within this overview, the user is able to handle multiple appointments with the single booking. Users can be assigned (for example, personnel, agent, representative or specialist) automatically or manually based on the setup of the group. The status of the appointment can be set automatically (for example, assigned, rescheduled, or canceled), and appointments are synced to all connected calendars. FIG. 24B shows an overview of all user appointments. FIG. 24C is an example of scheduled group service meeting data viewable to the user. FIG. 24D is an example of scheduled user meeting data viewable to the user.

Figure 25A:
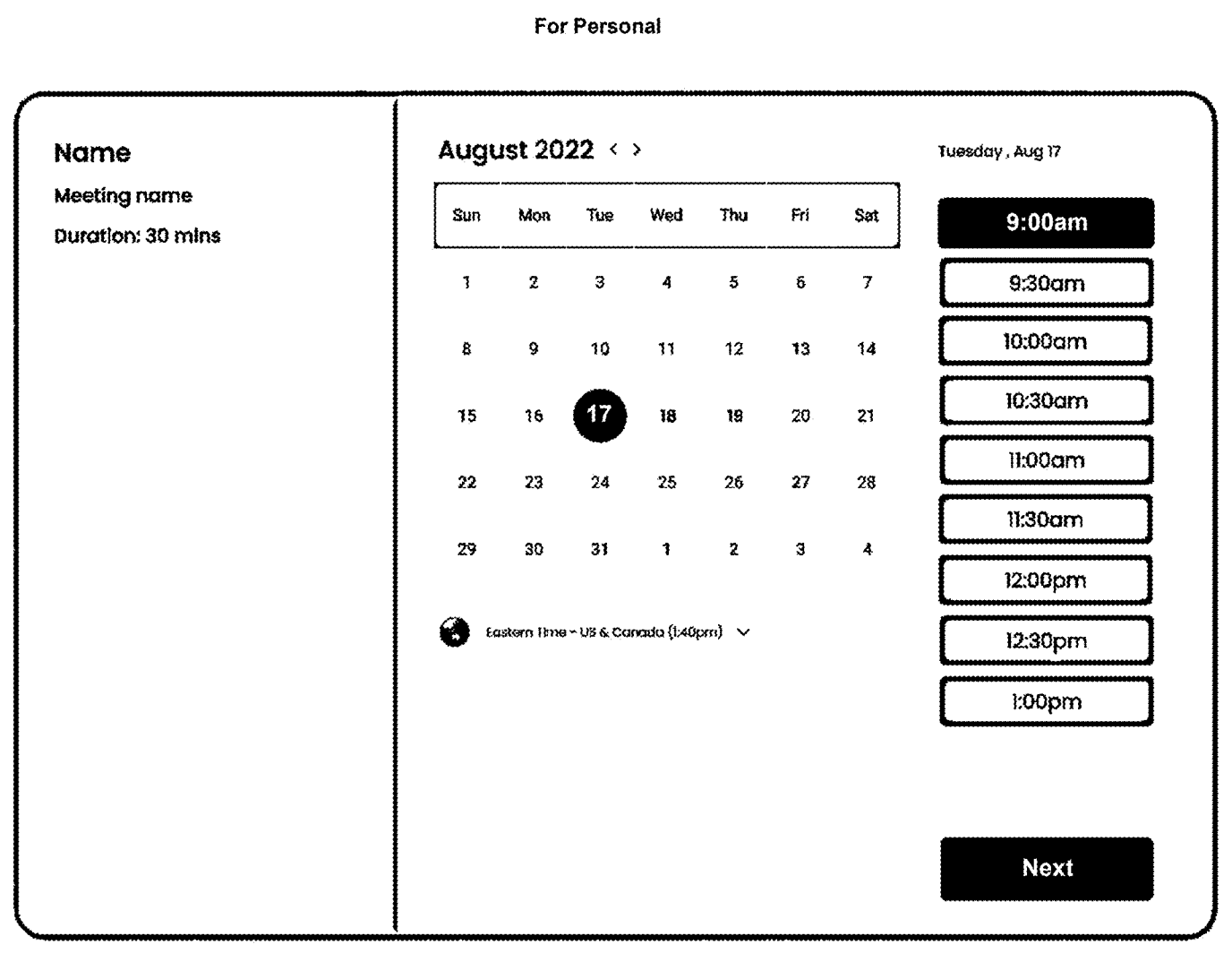
Figure 25B:
Figure 25C:
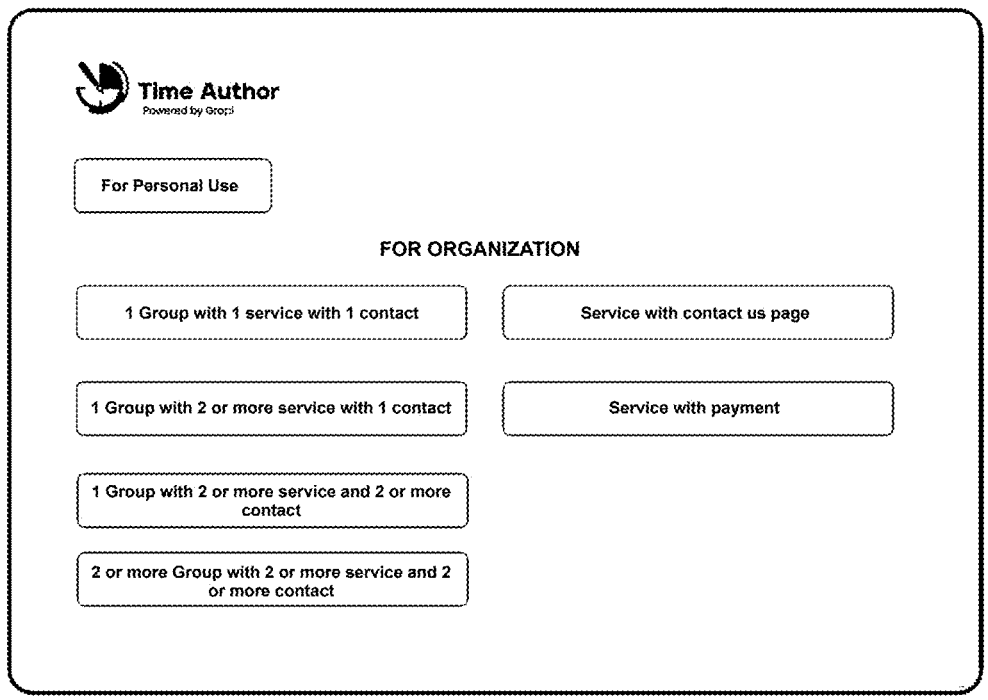
Figure 25D:
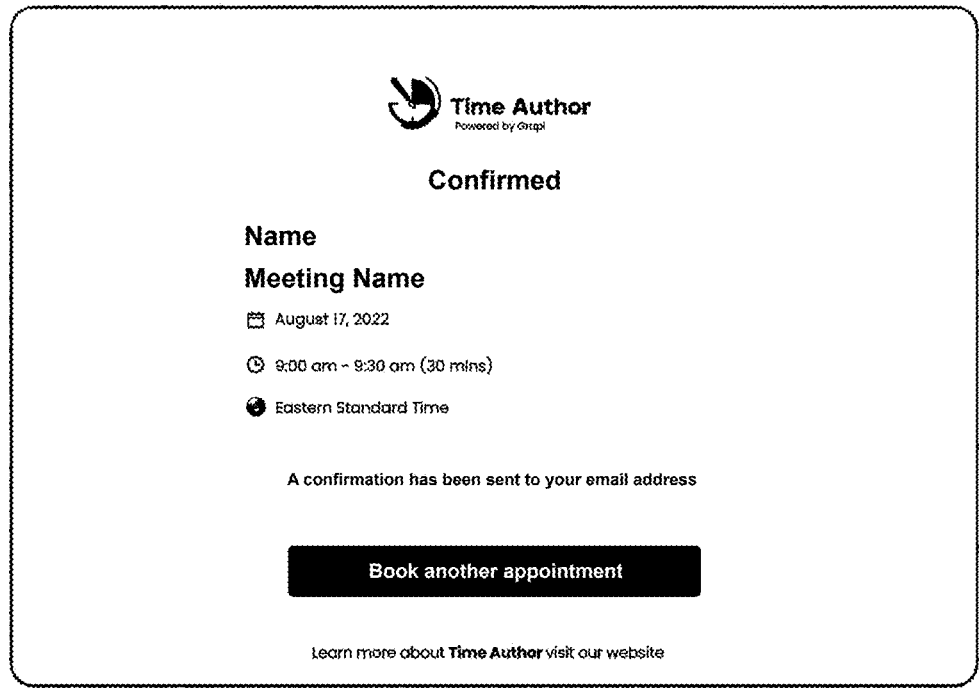

FIGS. 25A-D show the personal user account interface of the present invention. FIG. 25A shows the user meeting interface for scheduling a calendar appointment, as well as the duration of the appointment. FIG. 25B shows the meeting details interface to add or edit relevant appointment scheduling information, as well as captcha verification capability. FIG. 25C shows the user group organization tool. FIG. 25D shows a booked appointment confirmation as viewable by the user. Users may also opt out of notifications, but it is strongly recommended that Users select notifications from the system to maximize efficiency and provide push, calendar, and/or email notifications. Users may also receive notifications through text. Lastly, users are required to confirm a meeting and a confirmation pop up appears upon doing so.

Figure 26A:
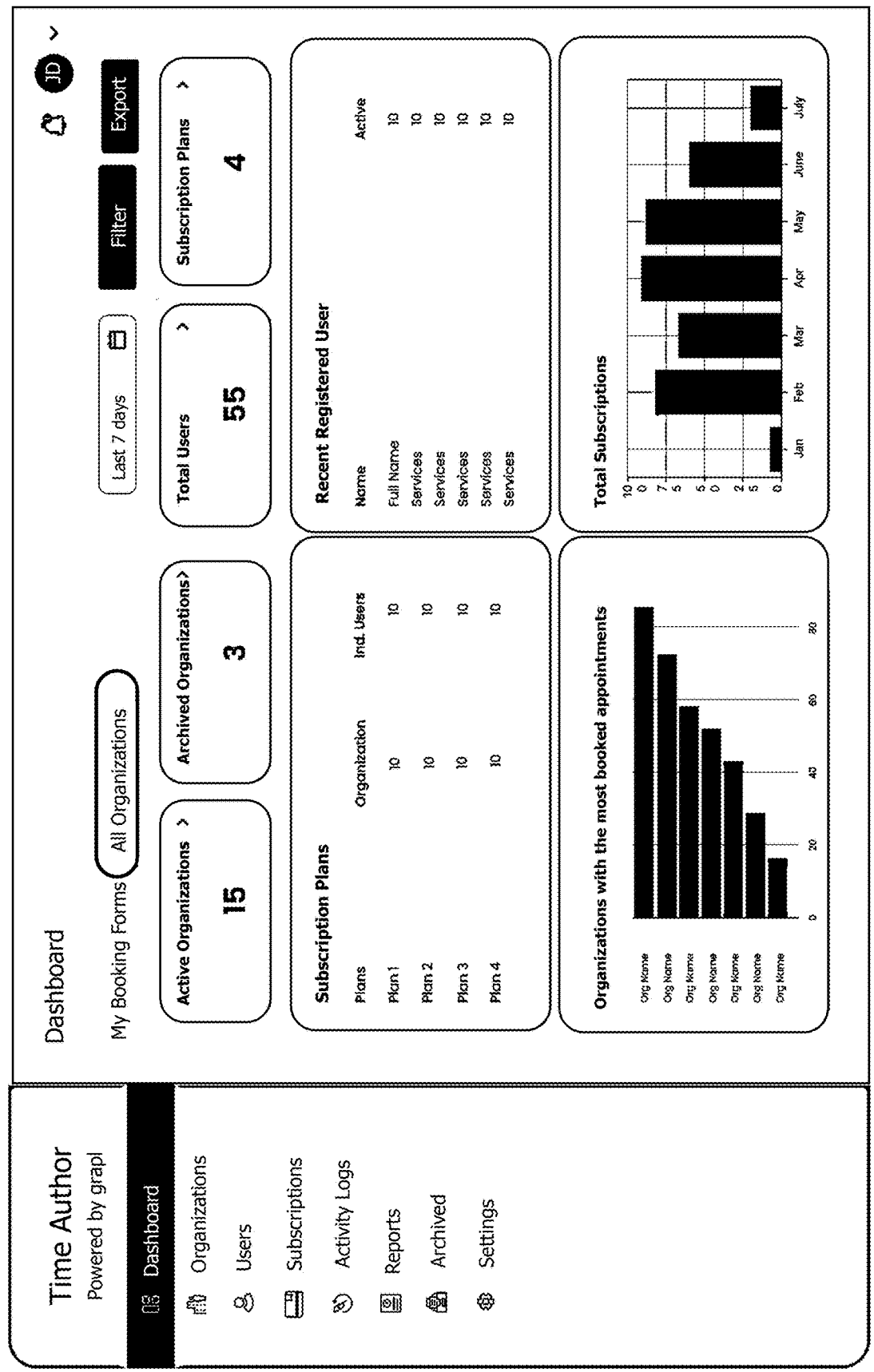
Figure 26B:
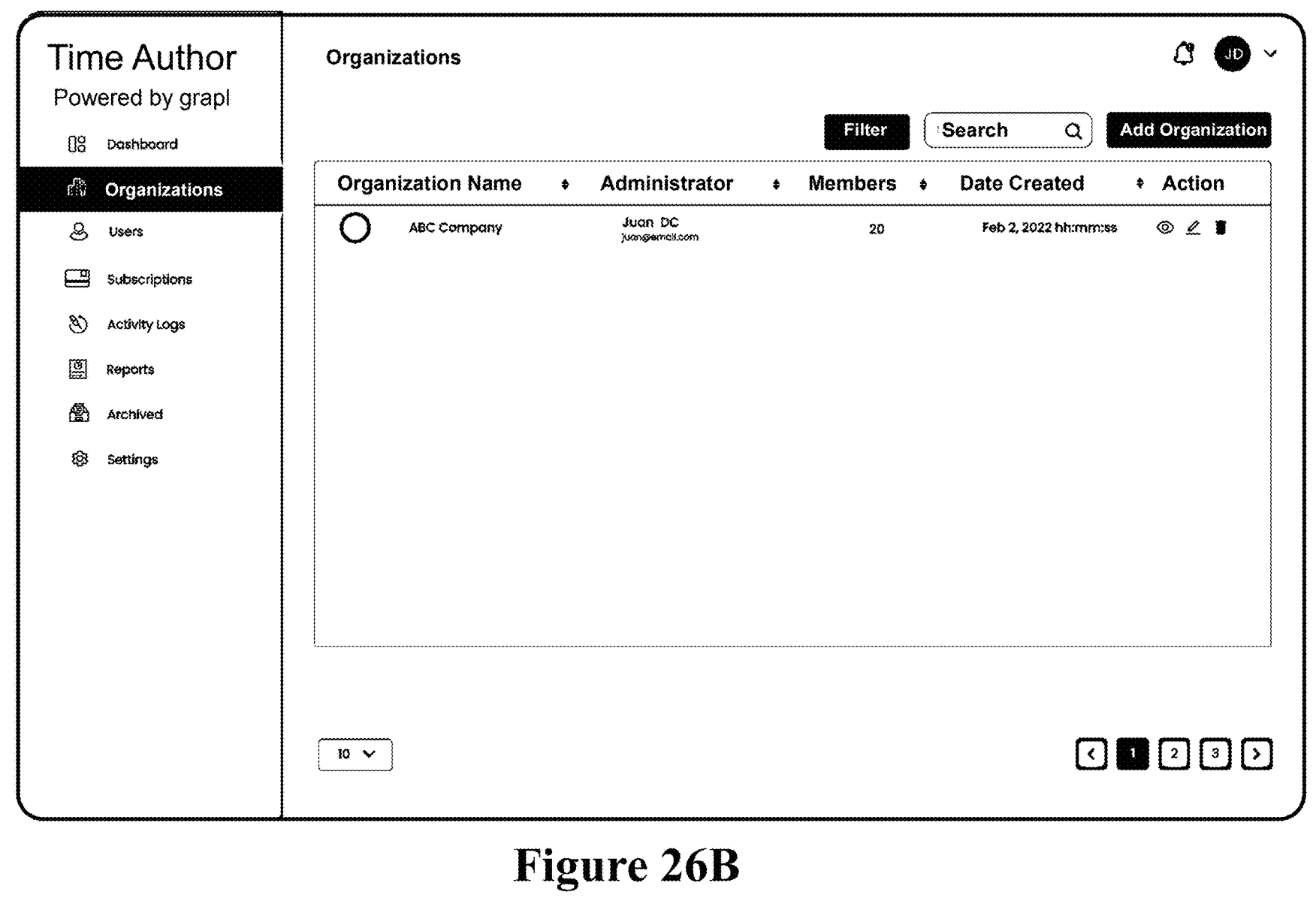
Figure 26D:
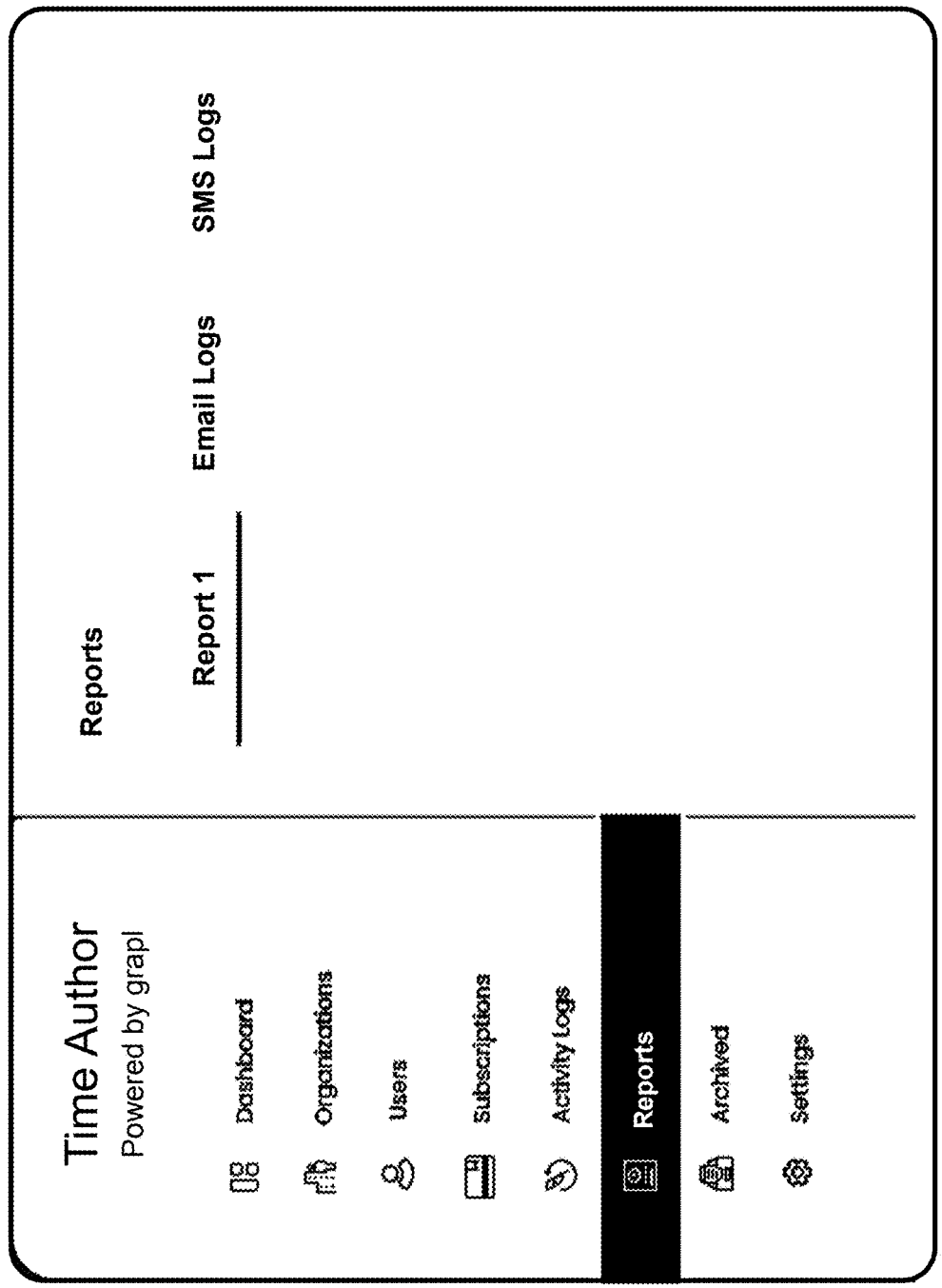
Figure 26E:
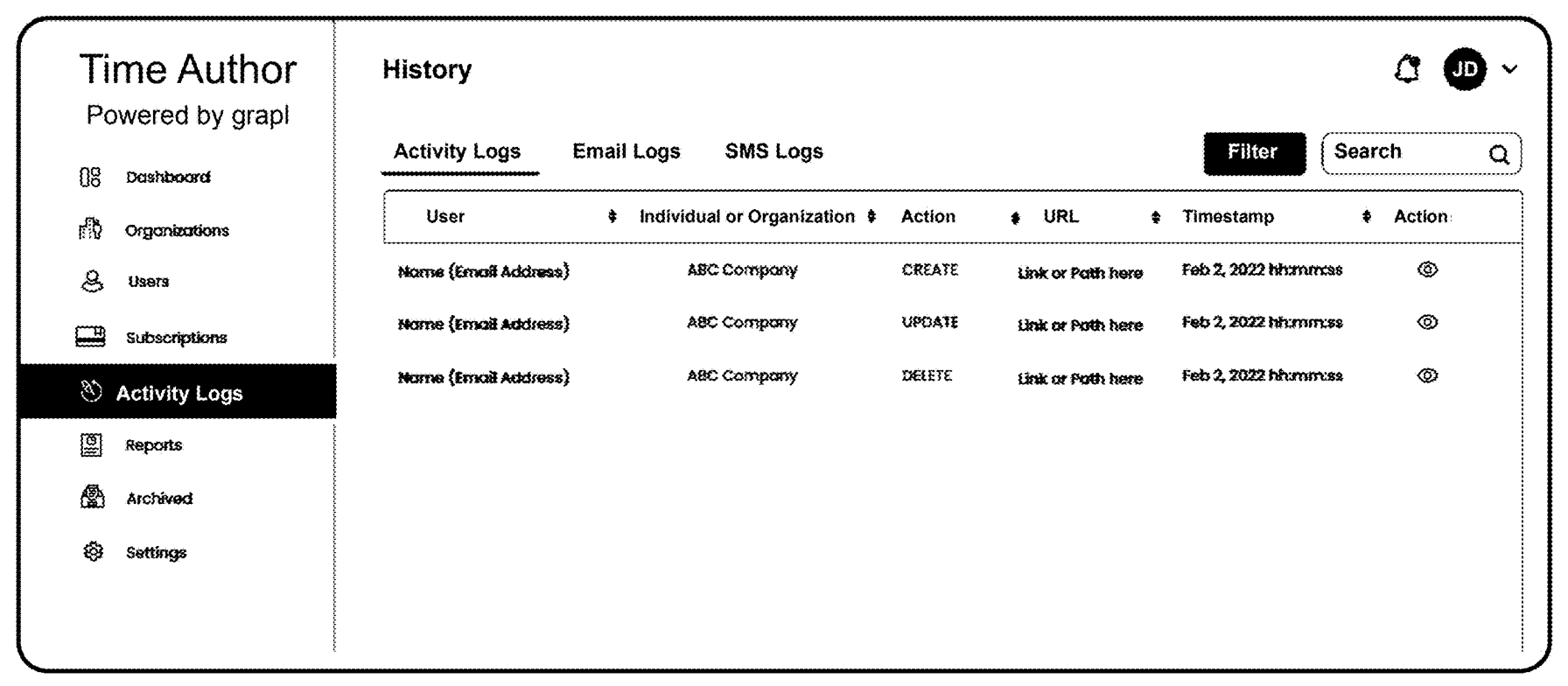
Figure 26F:
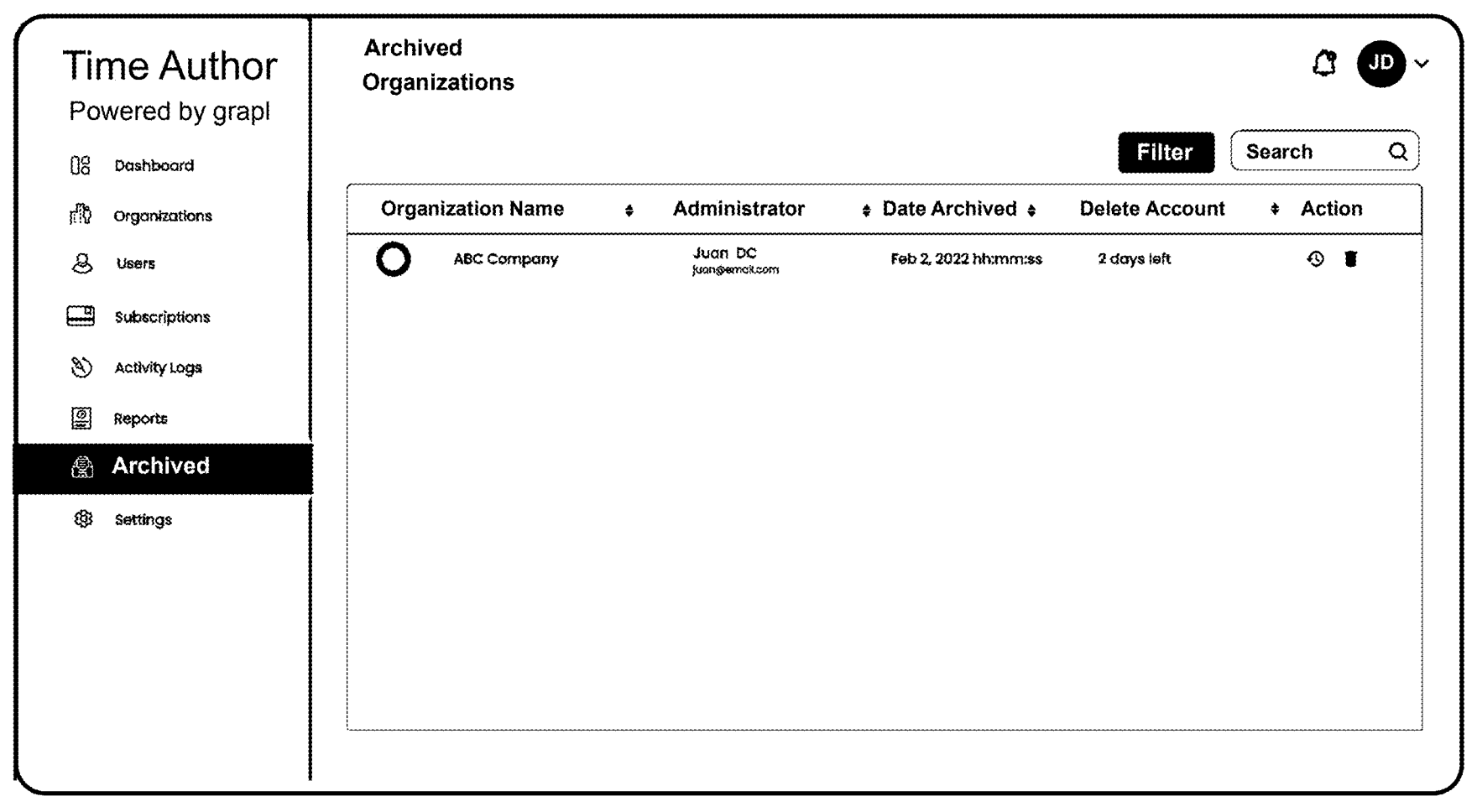
Figure 26G:
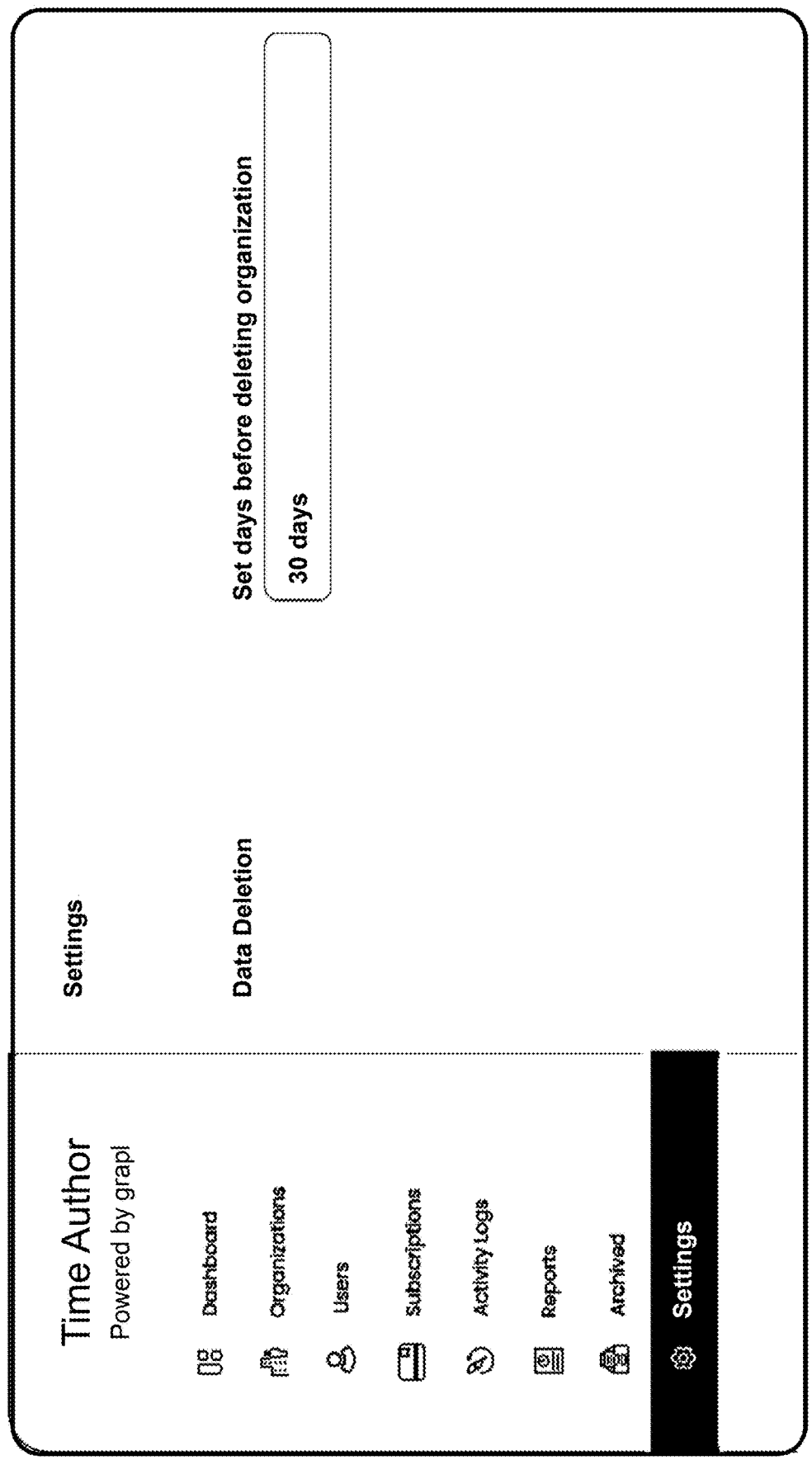

FIGS. 26A-G show the super admin interface of the present invention. FIG. 26A shows the super admin dashboard of the present invention. This dashboard allows for the organization's super admin user to access and manage all assigned organizations, users, subscriptions, activity logs, reports, data archives and account settings. FIG. 26B shows the organization data profile update interface. FIG. 26C shows the subscriptions management interface. FIG. 26D shows the reports interface. FIG. 26E shows the history interface for all user activity logs. FIG. 26F shows the archived data interface for each organization. FIG. 26G shows the super admin back-end settings.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A computer readable storage medium having stored therein instructions executable by a processor, which when executed, implement a calendar and time management application software component to automatically manage an event within an electronic calendar and time keeping application, the event being a data object in an electronic calendar of the calendar and time keeping application, the calendar application being operable to send and receive e-mails, wherein a calendar application dependent software component is operable to automatically specify a required calendar event by:

facilitating real-time audio and video meetings, via a calling state system configured with recording and transcription capability, synchronized navigation, managed content sharing, and real-time offline user collaboration;

providing a data repository, cloud storage and file sharing;

creating assigned user spaces;

providing virtual rooms for user groups via a room management interface;

generating a unique uniform resource locator link for personal use of a user;

synchronization with third-party applications;

creating at least one widget via a widget patching system stored on a server, wherein said at least one widget is customized based on user need;

synchronizing calendar data from multiple calendars for each user;

synchronizing multiple user calendars for scheduling events or appointments between multiple user groups;

calculating a user's availability based on all available time slots across all of their connected calendars;

presenting a user's available time slots for scheduling availability based on the synchronized calendars;

checking all connected calendars associated with an appointment for conflicts;

analyzing the events and recurring events within the electronic calendar;

determining a time for an event via round robin distribution of appointments, wherein said round robin distribution comprises prioritizing booking appointments a for a user with a lowest number of previously booked appointments prior to other users;

assigning a service to the event;

uploading data relating to the service assigned to the event and presenting customizable service features to a user;

transferring a user to one of said third-party applications upon selection of said one of said third-party applications via a user interface;

synchronizing said third-party applications with said calendar and time management application software component in order to provide seamless transfer of user data;

returning an update request by the service, the update request comprising a result generated by the requested service, the update request being an e-mail sent to the e-mail address used by the calendar application for sending the service request, the update request e-mail being a meeting request response e-mail or a second meeting request e-mail;

wherein the calendar application dependent software component is a software program being interoperable with the calendar program and being selected from the group consisting of a software implemented as calculating a user's availability based on all available time slots across all of their connected calendars for presenting a user's available time slots for scheduling availability based on the synchronized calendars;

checking all connected calendars associated with an appointment for conflicts; and for being registered as event listener with a calendar event and an independent service program searching the calendar application for new calendar entries on a regular basis.

\* \* \* \* \*